(12) United States Patent
Yoshino et al.

(10) Patent No.: US 8,391,816 B2
(45) Date of Patent: Mar. 5, 2013

(54) POWER SUPPLY DEVICE, POWER CABLE, AND RECEPTION DEVICE

(75) Inventors: Yoshitaka Yoshino, Tokyo (JP); Chisato Komori, Ishikawa (JP); Koichi Mukai, Ishikawa (JP)

(73) Assignee: Sony Corporation, Tokyo (JP)

( * ) Notice: Subject to any disclaimer, the term of this patent is extended or adjusted under 35 U.S.C. 154(b) by 547 days.

(21) Appl. No.: 12/631,186

(22) Filed: Dec. 4, 2009

(65) Prior Publication Data

US 2010/0144293 A1 Jun. 10, 2010

(30) Foreign Application Priority Data

Dec. 5, 2008 (JP) .................................. 2008-310695
Dec. 5, 2008 (JP) .................................. 2008-310840
Sep. 28, 2009 (JP) .................................. 2009-223406

(51) Int. Cl.
*H04B 1/18* (2006.01)

(52) U.S. Cl. .................. 455/150.1; 455/343.1; 455/572; 455/269

(58) Field of Classification Search .................. 455/269, 455/270, 150.1, 572, 575.7, 343.1, 556.1, 455/343.5, 77, 277.1; 343/720, 793, 702
See application file for complete search history.

(56) References Cited

U.S. PATENT DOCUMENTS

| | | | | |
|---|---|---|---|---|
| 2,915,627 A | | 12/1959 | Spindler | |
| 6,104,920 A | * | 8/2000 | Llewellyn et al. | 455/269 |
| 2010/0194468 A1 | * | 8/2010 | Kumamaru | 327/535 |

FOREIGN PATENT DOCUMENTS

| | | |
|---|---|---|
| JP | 04-015078 | 1/1992 |
| JP | 2002-151932 A | 5/2002 |
| JP | 2005-341067 A | 12/2005 |
| WO | WO 2007/138669 A1 | 12/2007 |
| WO | WO 2007/138670 A1 | 12/2007 |

* cited by examiner

*Primary Examiner* — John J Lee
(74) *Attorney, Agent, or Firm* — Wolf, Greenfield & Sacks, P.C.

(57) ABSTRACT

A power supply device includes: a power supply unit configured to output the power of a mainframe; and a power transmission cable configured to supply the power output from the power supply unit to the mainframe via a connector; with the power transmission cable including a mainframe side high-frequency cutoff portion disposed between the power supply terminal of the connector, a power supply unit side high-frequency cutoff portion, which is disposed on the power supply unit side at a predetermined length from the connector, configured to restrict the length of a portion serving as an antenna, a first transmission line used for power supply to the mainframe via the mainframe side high-frequency cutoff portion, and a second transmission line to be connected to a tuner of the mainframe via the connector.

31 Claims, 73 Drawing Sheets

|  | VERTICAL POLARIZATION |  |  |  |  |  |  |  |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −14.20 | −12.50 | −8.85 | −8.64 | −4.52 | −3.52 | −3.77 | −4.60 |

|  | HORIZONTAL POLARIZATION |  |  |  |  |  |  |  |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −17.40 | −17.10 | −14.05 | −15.96 | −13.72 | −12.09 | −12.09 | −12.20 |

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −9.88 | −14.10 | −8.45 | −10.37 | −7.47 | −7.29 | −7.64 | −8.31 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −16.72 | −21.70 | −17.25 | −23.63 | −9.92 | −9.69 | −10.32 | −11.90 |

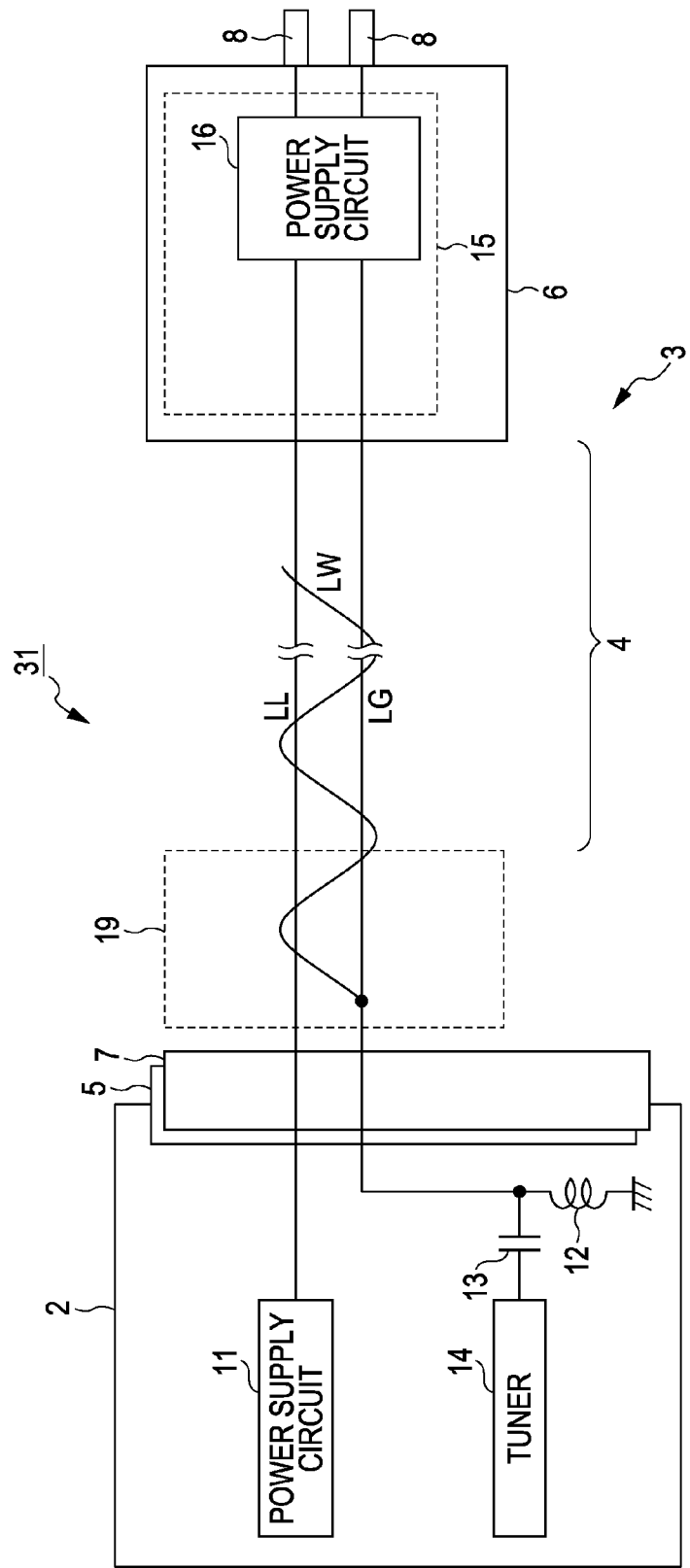

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −14.68 | −15.70 | −11.45 | −8.97 | −7.37 | −6.49 | −6.29 | −6.00 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −18.72 | −21.30 | −17.85 | −15.17 | −18.57 | −16.58 | −15.93 | −14.90 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −15.40 | −13.10 | −9.65 | −8.57 | −5.92 | −5.29 | −5.49 | −5.40 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −18.08 | −19.90 | −16.45 | −15.44 | −12.72 | −11.72 | −11.97 | −12.31 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | -8.40 | -5.80 | -11.24 | -11.48 | -12.52 | -10.15 | -12.85 | -5.08 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | -8.20 | -4.98 | -5.13 | -6.28 | -5.52 | -1.35 | -5.65 | -2.58 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −6.80 | −5.49 | −9.33 | −10.14 | −12.16 | −11.15 | −14.85 | −8.08 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.33 | −5.09 | −5.44 | −8.01 | −6.36 | −1.95 | −6.05 | −2.38 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −14.52 | −16.70 | −13.85 | −11.57 | −7.32 | −6.49 | −6.49 | −6.40 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −19.72 | −22.10 | −19.25 | −17.37 | −19.92 | −18.72 | −18.69 | −18.00 |

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −12.72 | −15.50 | −13.85 | −11.90 | −7.32 | −6.49 | −6.69 | −6.60 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −19.68 | −21.90 | −19.65 | −16.70 | −12.37 | −11.49 | −11.49 | −11.40 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −11.33 | −10.80 | −6.95 | −13.01 | −8.76 | −6.18 | −12.65 | −4.68 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −13.93 | −12.00 | −5.64 | −16.74 | −8.52 | −7.98 | −9.65 | −4.88 |

| | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −12.13 | −9.31 | −6.95 | −14.08 | −11.52 | −6.73 | −11.25 | −4.43 |

| | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −12.33 | −11.20 | −7.15 | −16.14 | −10.27 | −8.35 | −9.85 | −6.08 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −20.83 | −25.50 | −20.85 | −17.63 | −15.87 | −15.85 | −16.37 | −16.71 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −26.86 | −33.90 | −29.85 | −27.03 | −13.81 | −13.85 | −14.24 | −15.00 |

|  | VERTICAL POLARIZATION | | | | | | |
|---|---|---|---|---|---|---|---|
| FREQUENCY [MHz] | 76 | 86 | 95 | 107 | 188.5 | 192.5 | 194.5 | 198.5 |
| PEAK GAIN [dBd] | −13.40 | −14.10 | −14.05 | −11.10 | −6.07 | −5.69 | −5.77 | −5.60 |

|  | HORIZONTAL POLARIZATION | | | | | | |
|---|---|---|---|---|---|---|---|
| FREQUENCY [MHz] | 76 | 86 | 95 | 107 | 188.5 | 192.5 | 194.5 | 198.5 |
| PEAK GAIN [dBd] | −17.48 | −18.90 | −19.05 | −15.90 | −12.01 | −11.85 | −11.97 | −11.91 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −11.40 | −12.60 | −12.55 | −15.01 | −12.47 | −7.98 | −12.85 | −4.83 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −11.40 | −11.78 | −12.06 | −13.54 | −8.47 | −6.35 | −5.25 | −6.08 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −6.53 | −4.78 | −1.75 | −5.88 | −2.87 | −1.55 | −5.05 | 0.32 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −4.40 | −5.29 | −2.04 | −6.14 | −4.92 | −3.20 | −6.25 | 2.77 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −13.64 | −15.90 | −10.65 | −11.24 | −6.72 | −6.29 | −6.37 | −6.91 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −19.08 | −20.90 | −17.25 | −18.64 | −14.87 | −13.89 | −13.89 | −13.91 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −14.80 | −16.50 | −10.85 | −11.90 | −6.92 | −6.49 | −6.57 | −6.91 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −19.48 | −21.50 | −19.45 | −21.57 | −13.92 | −13.32 | −13.57 | −13.91 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.40 | −2.89 | −1.33 | −4.88 | −2.32 | 2.65 | −2.65 | −1.18 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −8.00 | −6.20 | −2.44 | −4.68 | −3.07 | −1.35 | −5.85 | −3.28 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −4.20 | −2.00 | −0.53 | −4.28 | −2.27 | 2.85 | −2.45 | −1.03 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.33 | −5.20 | −3.24 | −4.88 | −2.72 | −0.95 | −5.85 | −2.63 |

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −12.96 | −12.50 | −14.25 | −15.17 | −6.92 | −6.29 | −6.29 | −6.20 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −14.24 | −15.50 | −17.85 | −19.10 | −14.12 | −12.72 | −12.61 | −12.20 |

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −38.11 | −35.70 | −34.45 | −33.97 | −18.77 | −17.89 | −17.81 | −17.40 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −35.43 | −28.50 | −25.65 | −25.03 | −9.17 | −8.29 | −8.29 | −7.50 |

| | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.40 | −2.89 | −1.33 | −4.88 | −2.32 | 2.65 | −2.65 | −1.18 |

| | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −8.00 | −6.20 | −2.44 | −4.68 | −3.07 | −1.35 | −5.85 | −3.28 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −19.20 | −17.60 | −15.24 | −16.81 | −19.85 | −15.20 | −17.45 | −12.18 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.00 | −3.31 | −2.06 | −3.21 | −3.36 | −0.98 | −2.85 | −3.63 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −15.76 | −12.70 | −12.25 | −13.24 | −5.92 | −5.49 | −5.64 | −6.31 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −17.44 | −15.30 | −15.85 | −17.70 | −14.12 | −13.49 | −13.69 | −14.20 |

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −18.99 | −13.90 | −15.45 | −15.43 | −7.87 | −7.09 | −7.17 | −7.60 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −18.40 | −17.30 | −18.05 | −17.17 | −15.32 | −13.92 | −13.89 | −13.71 |

| | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −13.32 | −17.10 | −17.65 | −16.90 | −9.61 | −9.69 | −9.77 | −9.60 |

| | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −15.12 | −19.90 | −20.85 | −21.17 | −17.41 | −17.29 | −17.61 | −17.60 |

|  | VERTICAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −11.80 | −12.70 | −12.65 | −13.24 | −8.01 | −8.05 | −8.17 | −8.20 |

|  | HORIZONTAL POLARIZATION | | | | | | | |
|---|---|---|---|---|---|---|---|---|
| FREQUENCY [MHz] | 76 | 86 | 95 | 107 | 188.5 | 192.5 | 194.5 | 198.5 |
| PEAK GAIN [dBd] | −15.24 | −18.30 | −17.25 | −14.77 | −16.81 | −16.69 | −16.41 | −15.50 |

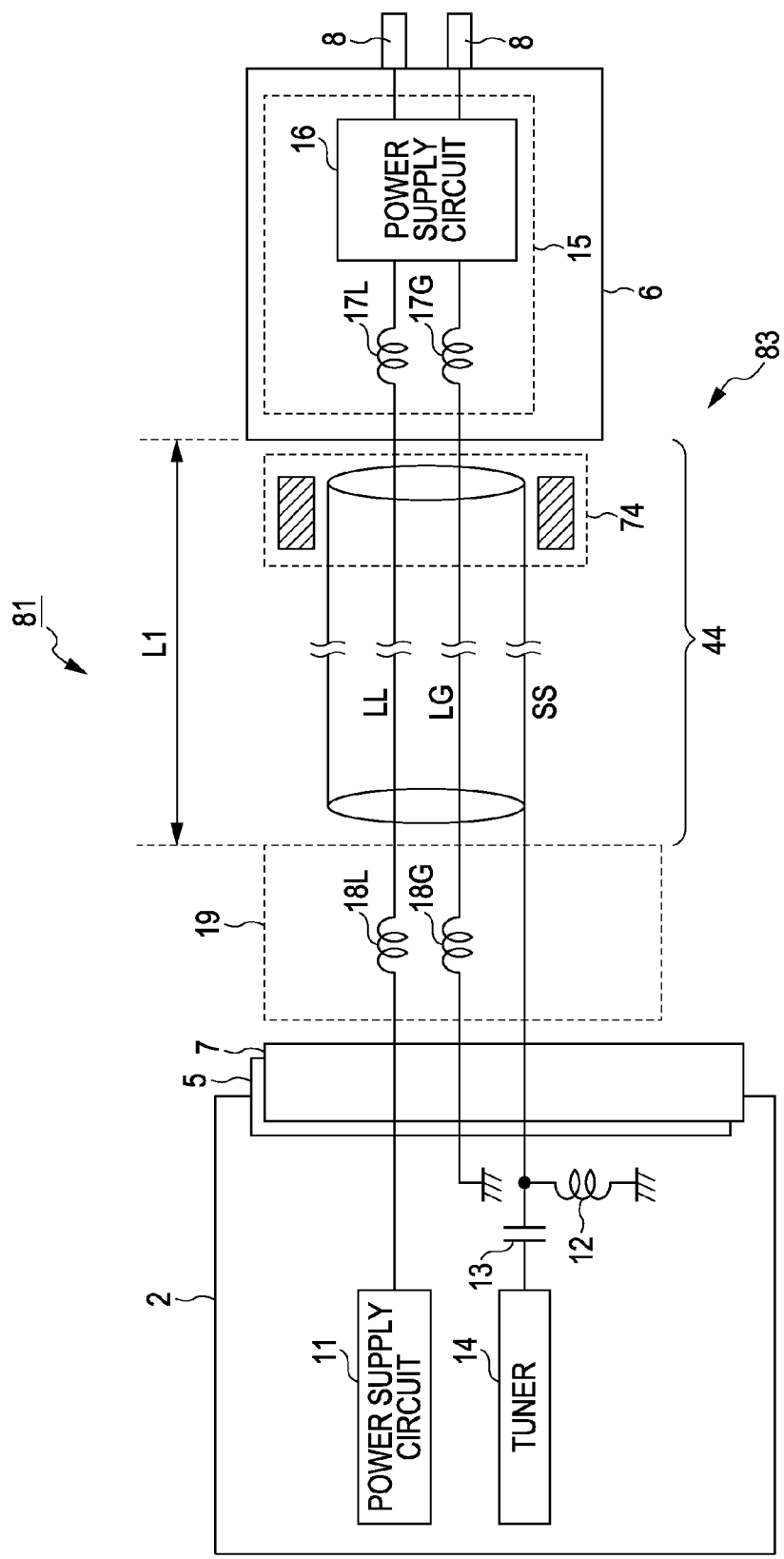

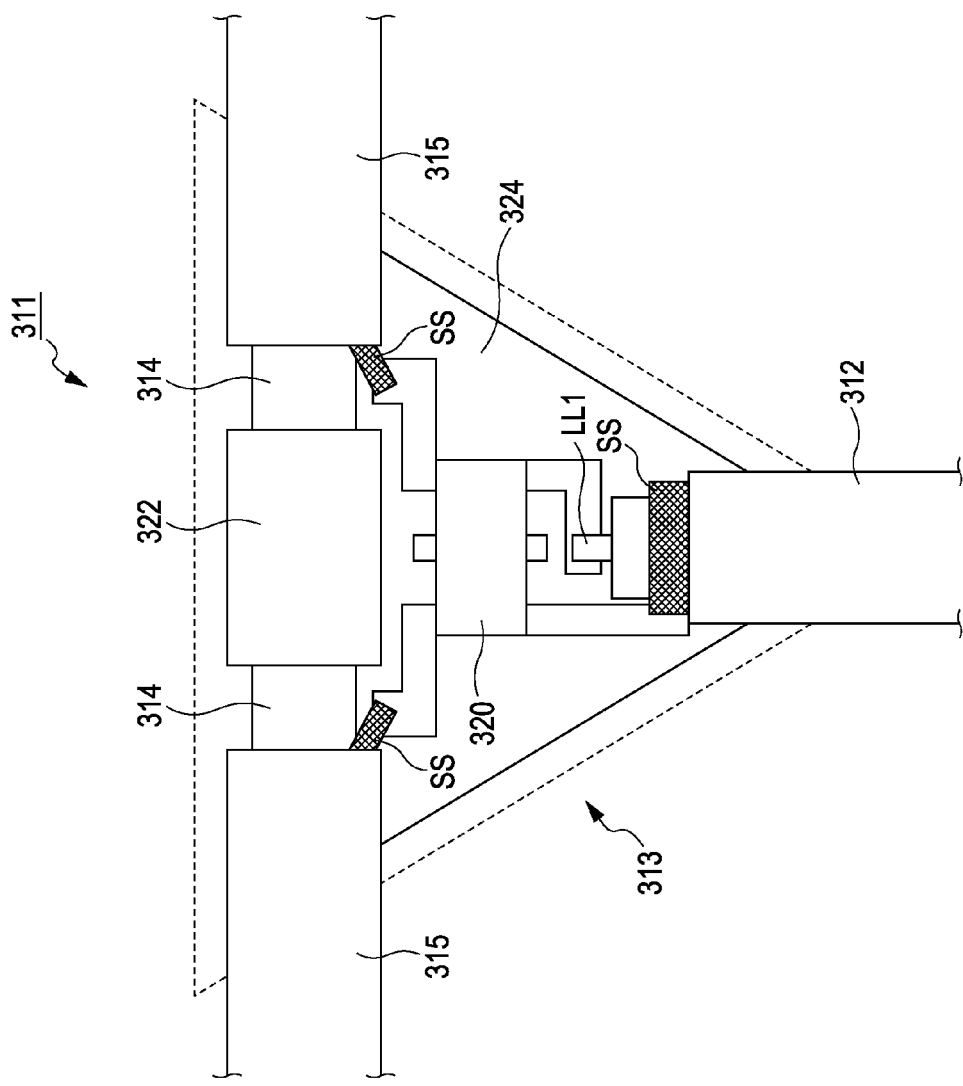

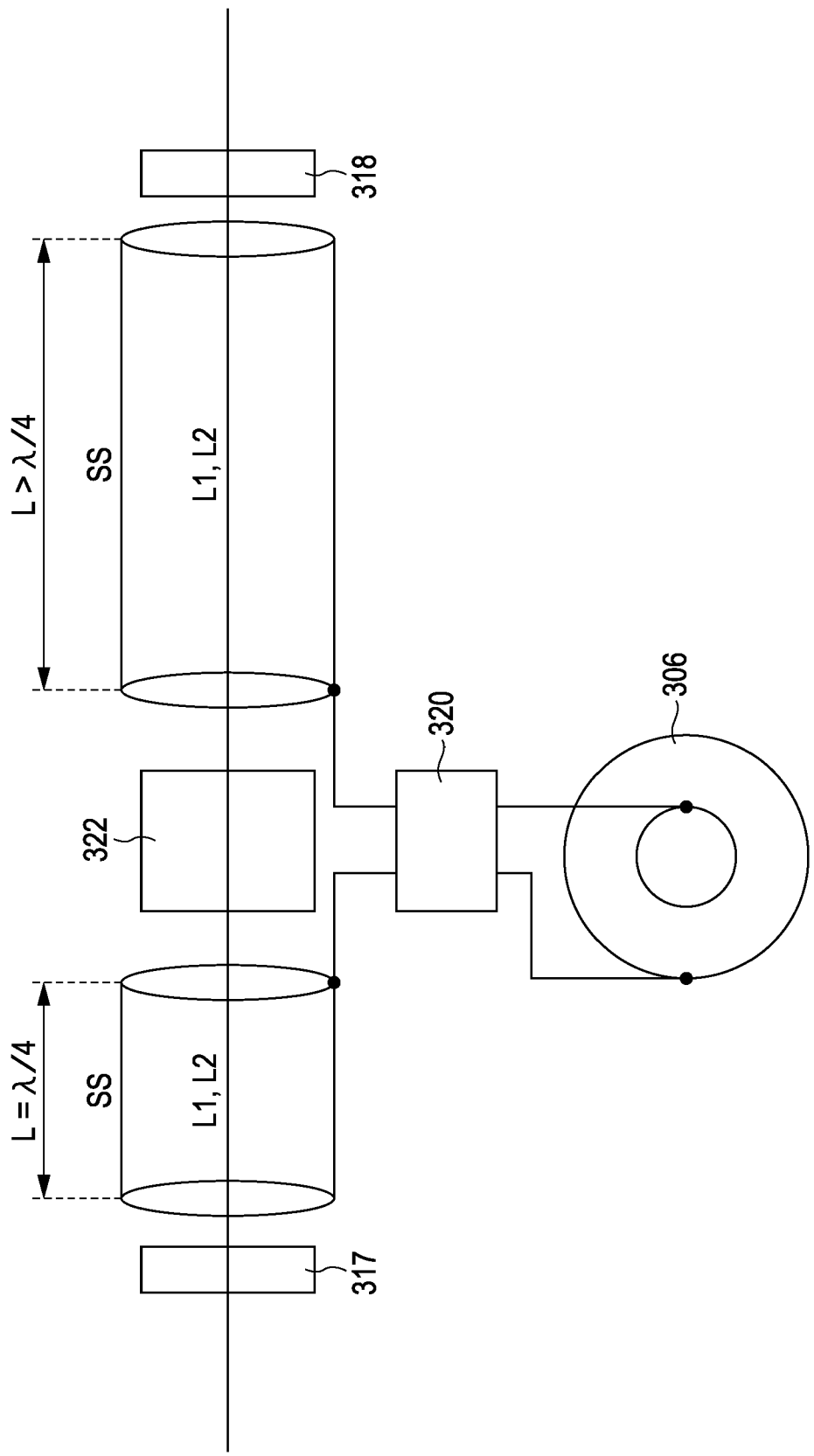

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −18.54 | −2.58 | −13.04 | −5.08 | −7.92 | −4.93 | −13.05 | −0.12 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −17.12 | −0.40 | −11.15 | −7.48 | −9.12 | −2.93 | −10.05 | 0.68 |

| | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.07 | −5.89 | −1.84 | −7.08 | −4.72 | −4.60 | −16.25 | −6.78 |

| | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −4.60 | −4.69 | −0.75 | −0.28 | −1.76 | −1.40 | −6.65 | −5.32 |

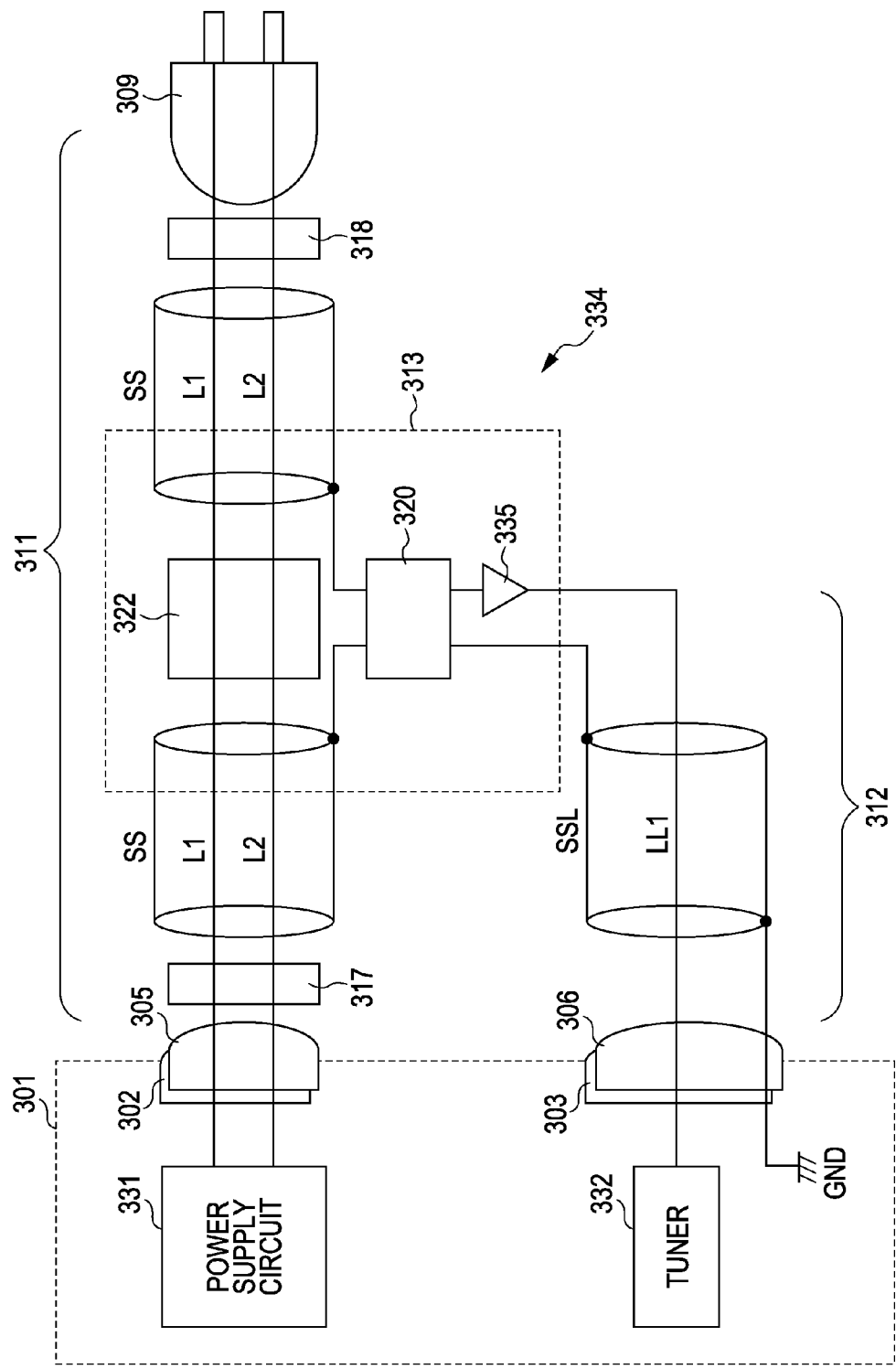

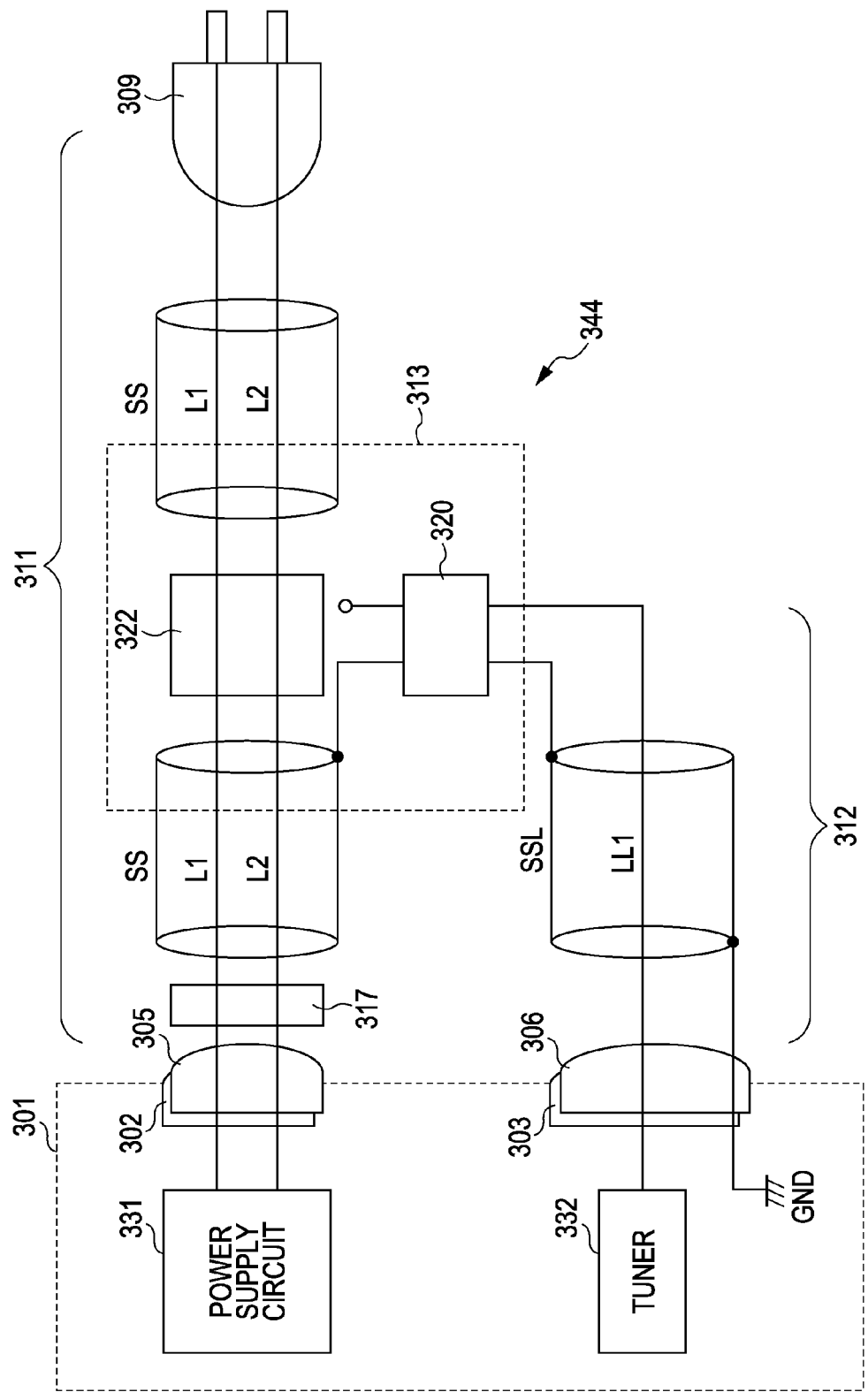

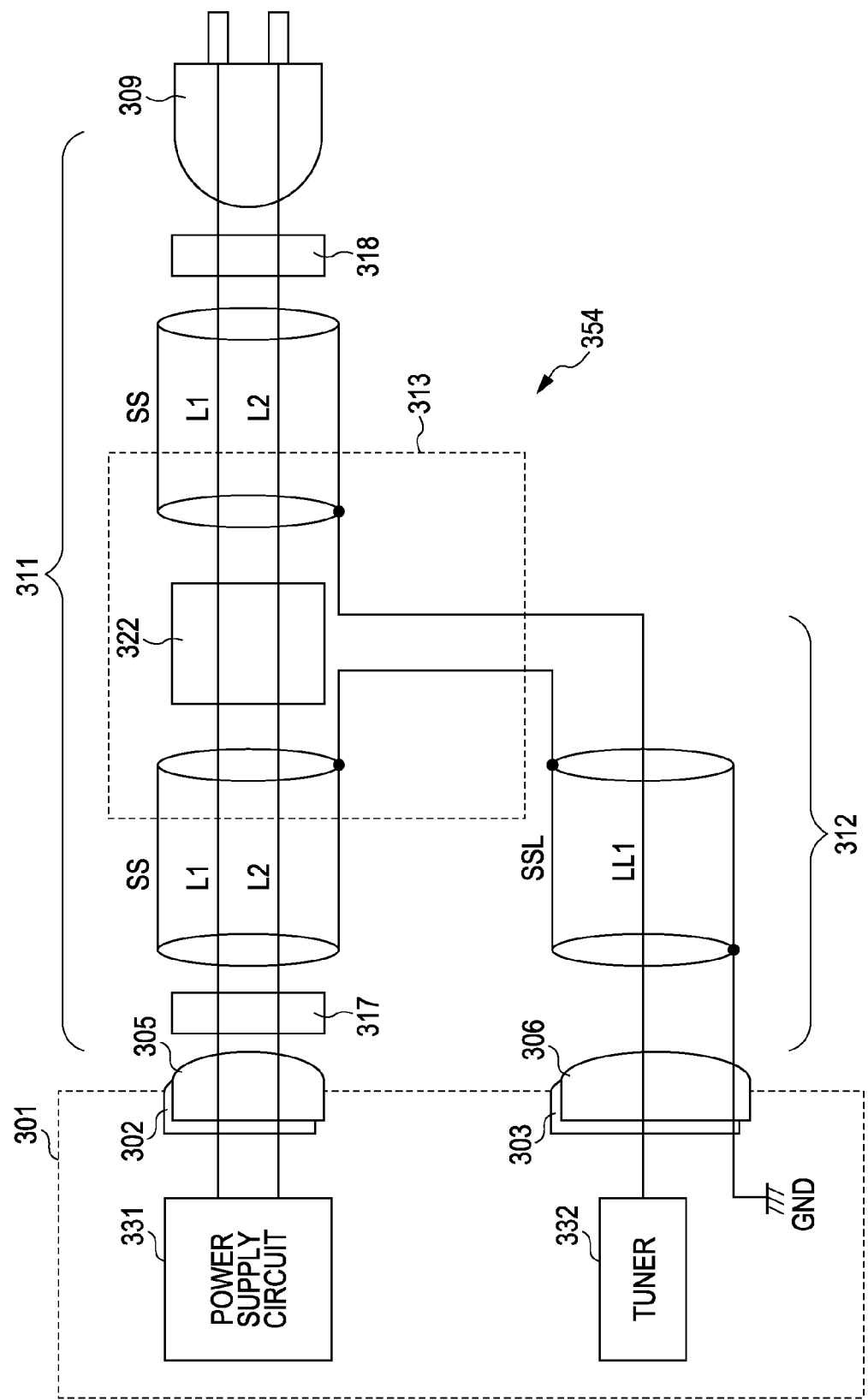

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −15.92 | −14.14 | −11.02 | −11.12 | −8.72 | −10.16 | −15.60 | −9.48 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −2.21 | −4.85 | −2.57 | −4.12 | −4.18 | −4.90 | −8.94 | −7.34 |

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −5.73 | −4.91 | −6.95 | −8.01 | −4.27 | −1.95 | −4.05 | 1.28 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −13.33 | −11.29 | −13.33 | −15.54 | −11.47 | −10.38 | −11.85 | −5.28 |

A RAW MATERIAL IS USED WHEREBY THE SHAPE OF A BOARD OR THE LIKE IS STABILIZED, WHICH PREVENTS DETERIORATION IN GAIN DUE TO CHANGE IN SHAPE FROM OCCURRING

|  | VERTICAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −6.13 | −4.38 | −8.84 | −8.88 | −6.32 | −6.35 | −10.65 | −5.08 |

|  | HORIZONTAL POLARIZATION | | | | | | | |
|---|---|---|---|---|---|---|---|---|
| FREQUENCY [MHz] | 470 | 520 | 570 | 620 | 670 | 720 | 770 | 906 |
| PEAK GAIN [dBd] | −3.73 | −4.60 | −2.26 | −2.54 | −1.36 | −1.58 | −5.25 | −2.32 |

POWER SUPPLY DEVICE, POWER CABLE, AND RECEPTION DEVICE

BACKGROUND OF THE INVENTION

1. Field of the Invention

The present invention relates to a power supply device, a power cable, and a reception device, which can be applied to electronic equipment such as a cellular phone, a television receiver, or the like which can receive broadcast waves.

2. Description of the Related Art

In general, cellular phones capable of receiving digital television broadcasting or the like receive broadcast waves at a built-in antenna or external antenna. Built-in antennas have an advantage in that the appearance of the cellular phone is not ruined due to an unsightly antenna, but have a drawback in being inferior to external antennas regarding sensitivity, and tend to be influenced by internal noise.

On the other hand, examples of external antennas include rod antennas. Rod antennas have a feature of excellent sensitivity or the like as compared to built-in antennas, but have drawbacks such as ruining the appearance of the cellular phone, protruding antennas, and so forth. With regard to external antennas, Japanese Unexamined Patent Application Publication Nos. 2005-341067 and 2002-151932 and the like have proposed that a power cable (power cord) be used as an antenna.

Television receivers operate according to commercial power supply, and receive broadcast waves via an outdoor antenna.

Therefore, television receivers input commercial power supply by the power cable extended from the back being connected to a home power outlet. Also, with television receivers, a connector for antennas is provided to the back thereof, and this connector for antennas is connected to an outdoor antenna by a coaxial cable to receive broadcast waves.

Note that an antenna for reception using a rod antenna is provided to some television receivers. With regard to such an antenna of a reception device, the above Japanese Unexamined Patent Application Publication No. 2002-151932 and Japanese Patent No. 4105078 have disclosed an arrangement wherein a cable for antennas is laid alongside or wound around a power cable (power cord) to receive broadcast waves at this cable for antennas.

Also, Japanese Unexamined Patent Application Publication No. 2005-341067 has disclosed an arrangement wherein an LC resonance circuit is provided partway along a power cord to restrict the electric length of the power cord, and broadcast waves are received at a portion where this electric length is restricted.

SUMMARY OF THE INVENTION

Incidentally, some users of cellular phones receive various types of broadcast waves indoors and record the contents thereof, and then view/listen to the recorded contents some other later time. Note however, broadcast waves have are not readily received indoors due to various types of shielding objects. Accordingly, sensitivity is markedly deteriorated in the case of receiving broadcast waves indoors by an internal antenna.

Now, an arrangement can be conceived wherein an existing arrangement, in which a power cable is used as an antenna, is applied to a power transmission cable for supplying power for charging to a cellular phone, thereby receiving broadcast waves. Note however, this case involves a disadvantage in that broadcast waves are not readily received with a sufficiently wide frequency band and sufficient gain.

Also, there are more portable television receivers due to reduction in size and reduction in weight, and these are used at variable places. Note however, for example, in the case that a television receiver is used at a place where no home antenna power outlet for antenna connection is provided, such as a kitchen or the like, the coaxial cable of the television receiver has to be extended from a room where a home antenna power outlet is provided so as to be connected to a home antenna power outlet.

Also, even in the case of using a television receiver within a room where a home antenna power outlet is provided, the coaxial cable thereof has to be laid and connected again.

As a result thereof, television receivers have a disadvantage in that portability is severely restricted regarding antennas in spite of improvement in portability due to reduction in size, and reduction in weight.

Also, notebook-type personal computers (PCs) having a reception function of television broadcasting are subject to the same restriction in portability due to the issue of antennas as with the case of receiving television broadcasting with a television receiver.

A method for providing an indoor antenna separately can be conceived as one method for solving this problem. Note however, with this method, the indoor antenna has to be transported along with the television receiver, and accordingly, there is still a disadvantage wherein portability is restricted due to antennas.

Also, an arrangement can be conceived wherein broadcast waves are received with a built-in antenna. Note however, in the case of a built-in antenna, the size of the device increases by an amount equivalent to the size of the built-in antenna to be included, and consequently, portability is restricted.

Also, this leads to constraint on design, and accordingly, design is complicated. In particular, in the case of receiving a low frequency, the antenna itself increases in size, and accordingly, there are disadvantages such as markedly increased size of the device, and so forth.

On the other hand, it can also be conceived to apply an existing arrangement wherein a power cable is used as an antenna. Note however, this case has a disadvantage in that sufficient gain is not readily secured with a sufficient wide frequency band.

It has been found to be desirable to provide a power supply device, a power cable, and a reception device whereby portability regarding antennas can be improved sufficiently, and broadcast waves can be received with a sufficient wide frequency band and sufficient gain.

According to an embodiment of the present invention, a power supply device includes: a power supply unit configured to output the power of a mainframe; and a power transmission cable configured to supply the power output from the power supply unit to the mainframe via a connector; with the power transmission cable including a mainframe side high-frequency cutoff portion disposed between the power supply terminal of the connector, a power supply unit side high-frequency cutoff portion, which is disposed on the power supply unit side at a predetermined length from the connector, configured to restrict the length of a portion serving as an antenna, a first transmission line used for power supply to the mainframe via the mainframe side high-frequency cutoff portion, and a second transmission line to be connected to a tuner of the mainframe via the connector.

According to an embodiment of the present invention, a reception device includes: a mainframe, which includes a connector to be connected to a power supply device, configured to receive desired broadcast waves using a built-in tuner; and the power supply device, which is connected to the mainframe via the connector, configured to supply the power of the mainframe to the mainframe; with the power supply device including a power supply unit configured to output the power of the mainframe, and a power transmission cable configured to transmit the power to be output from the power supply unit to the mainframe via a connector disposed on one end thereof; with the power transmission cable including a plurality of transmission cables configured to transmit the power of the mainframe, connected to the mainframe via the power supply terminal of the connector; with the plurality of transmission cables, a mainframe side high-frequency cutoff portion being disposed between the power supply terminal corresponding to each thereof; with the power transmission cable, a power supply unit side high-frequency cutoff portion configured to restrict the length of a portion serving as an antenna being disposed on the power supply unit side at a predetermined length from the connector; and with at least one of the transmission cables being connected to a turner of the mainframe via the connector.

According to an embodiment of the present invention, a power cable includes: a power transmission cable configured to transmit power between a mainframe and an external device; a mainframe side connector, which is disposed on one end side of the power transmission cable, configured to connect the power transmission cable to the mainframe; and an external device side connector, which is disposed on the other end side of the power transmission cable, configured to connect the power transmission cable to the external device; with the power transmission cable including a plurality of transmission cables, which are connected to the mainframe via the power supply terminal of the mainframe side connector, configured to transmit the power of the mainframe; with the plurality of transmission cables, a mainframe side high-frequency cutoff portion being disposed between the power supply terminal corresponding to each thereof; with the power transmission cable, an external device side high-frequency cutoff portion configured to restrict the length of a portion serving as an antenna being disposed on the external device side at a predetermined length from the mainframe side connector; and with at least one of the transmission cables being connected to the antenna input end of a built-in tuner of the mainframe via the mainframe side connector.

According to an embodiment of the present invention, a reception device includes: a power cable configured to supply power; and a built-in tuner configured to receive broadcast waves; with the power cable including a power transmission cable including a plurality of transmission cables configured to transmit the power; with at least one of the transmission cables included in the power transmission cable being separated into a first portion and a second portion at a partway relay portion in a high-frequency manner; and with at least one of the transmission cables included in the power transmission cable, the side opposite to the relay portion side of the first portion, and the side opposite to the relay portion side of the second portion being insulated from other portions in a high-frequency manner, and at least one of the relay portion side of the first portion, and the relay portion side of the second portion being connected to the tuner via a coaxial cable or parallel cable.

According to an embodiment of the present invention, a reception device includes: a power cable configured to supply power; and a built-in tuner configured to receive broadcast waves; with the power cable including a power transmission cable including a plurality of core wire cables configured to transmit the power, and a covered wire configured to cover the plurality of core wire cables; with the covered wire being separated into a first portion and a second portion at a partway relay portion of the power transmission cable; and with the covered wire, the side opposite to the relay portion side of the first portion, and the side opposite to the relay portion side of the second portion being formed as an open end, at least one of the relay portion side of the first portion, and the relay portion side of the second portion being connected to the tuner via a coaxial cable or parallel cable.

According to an embodiment of the present invention, a reception device includes: a power cable configured to supply power; and a built-in tuner configured to receive broadcast waves; with the power cable including a first cable and a second cable which are configured to transmit the power; with at least one of the first cable and the second cable being separated into a first portion and a second portion at a partway relay portion in a high-frequency manner; and with at least one of the first cable and the second cable, at least one of the relay portion side of the first portion, and the relay portion side being connected to the tuner via a coaxial cable or parallel cable.

According to an embodiment of the present invention, a power cable includes: a power transmission cable including a plurality of transmission cables configured to transmit power to a mainframe; with at least one of the plurality of transmission cables included in the power transmission cable being separated into a first portion and a second portion at a partway relay portion in a high-frequency manner; and with at least one of the plurality of transmission cables included in the power transmission cable, the side opposite to the relay portion side of the first portion, and the side opposite to the relay portion side of the second portion being insulated from other portions in a high-frequency manner, and at least one of the relay portion side of the first portion, and the relay portion side of the second portion being connected to a tuner of the mainframe via a coaxial cable or parallel cable.

According to an embodiment of the present invention, a power cable includes: a power transmission cable including a plurality of core wire cables configured to transmit the power, and a covered wire configured to cover the plurality of core wire cables; with the covered wire being separated into a first portion and a second portion at a partway relay portion of the power transmission cable; and with the covered wire, the side opposite to the relay portion side of the first portion, and the side opposite to the relay portion side of the second portion being formed as an open end, and at least one of the relay portion side of the first portion, and the relay portion side of the second portion being connected to a tuner of the mainframe via a coaxial cable or parallel cable.

According to an embodiment of the present invention, a power cable includes: first and second cables configured to transmit power to a mainframe; with at least one of the first and second cables being separated into a first portion and a second portion at a partway relay portion in a high-frequency manner; and with at least one of the relay portion side of the first portion, and the relay portion side of the second portion being connected to a tuner of the mainframe via a coaxial cable or parallel cable.

According to an embodiment of the present invention, a power supply device includes: a power supply unit configured to generate the power of a mainframe; and a power transmission cable including a plurality of transmission cables configured to transmit the power of the power supply unit to the mainframe; with at least one of the plurality of cables included in the power transmission cable being separated into a first portion and a second portion at a partway relay portion in a high-frequency manner; and with at least one of the plurality of cables included in the power transmission cable, the side opposite to the relay portion side of the first portion, and the side opposite to the relay portion side of the second portion being insulated from other portions in a high-frequency manner, and at least one of the relay portion side of the first portion, and the relay portion side of the second portion being connected to a tuner of the mainframe via a coaxial cable or parallel cable.

According to an embodiment of the present invention, a power supply device includes: a power supply unit configured to generate the power of a mainframe; and a power transmission cable including a plurality of core wire cables configured to transmit the power source of the power supply unit to the mainframe, and a covered wire configured to cover the plurality of core wire cables; with the covered wire being separated into a first portion and a second portion at a partway relay portion of the power transmission cable; and with the covered wire, the side opposite to the relay portion side of the first portion, and the side opposite to the relay portion side of the second portion being formed as an open end, and at least one of the relay portion side of the first portion, and the relay portion side of the second portion being connected to a tuner of the mainframe via a coaxial cable or parallel cable.

According to an embodiment of the present invention, a power supply device includes: a power supply unit configured to generate the power of a mainframe; and first and second cables configured to transmit the power of the power supply unit to the mainframe; with at least one of the first cable and the second cable being separated into a first portion and a second portion at a partway relay portion in a high-frequency manner; and with at least one of the first cable and the second cable, at least one of the relay portion side of the first portion, and the relay portion side of the second portion being connected to a tuner of the mainframe via a coaxial cable or parallel cable.

According to an embodiment of the present invention, a power cable includes: a power transmission cable including a plurality of transmission cables configured to transmit power to a framework; and a board portion disposed so as to fix the plurality of transmission cables at an intermediate portion of the power transmission cable; with the board portion, a high-frequency cutoff portion being disposed in the transmission cables, and one of the transmission cables cut off at the high-frequency cutoff portion in a high-frequency manner being connected to a tuner of the mainframe via a coaxial cable or parallel cable so as to form a dipole antenna.

According to an embodiment of the present invention, a power supply device includes: a power supply unit configured to generate the power of a mainframe; a power transmission cable including a plurality of transmission cables configured to transmit the power of the power supply unit to the mainframe; and a board portion disposed so as to fix the plurality of transmission cables at an intermediate portion of the power transmission cable; with the board portion, a high-frequency cutoff portion being disposed in the transmission cable, and one of the transmission cables cut off by the high-frequency cutoff portion in a high-frequency manner being connected to a tuner of the mainframe via a coaxial cable or parallel cable so as to form a dipole antenna.

According to an embodiment of the present invention, a reception device includes: a power cable configured to supply power; and a built-in tuner configured to receive broadcast waves; with the power cable including a power transmission cable including a plurality of transmission cables configured to transmit the power of the power supply unit to the mainframe, and a board portion disposed so as to fix the plurality of transmission cables at an intermediated portion of the power transmission cable; with the board portion, a high-frequency cutoff portion being disposed in the transmission cable, and one of the transmission cables cut off by the high-frequency cutoff portion in a high-frequency manner being connected to a tuner of the mainframe via a coaxial cable or parallel cable so as to form a dipole antenna.

According to the above configurations, portability regarding antennas can be improved sufficiently, and broadcast waves can be received with a sufficient wide frequency band and sufficient gain by a simple configuration.

BRIEF DESCRIPTION OF THE DRAWINGS

FIGS. 8A through 8C are diagrams illustrating the antenna properties of the VHF band in the case that, with the reception system in FIG. 7, no extension cord is connected, wherein FIG. 8A is a diagram illustrating the antenna gain property of the VHF band of the reception system in FIG. 7, FIG. 8B is a diagram illustrating the vertical polarization property in the property diagram in FIG. 8A, and FIG. 8C is a diagram illustrating the horizontal polarization property in the property diagram in FIG. 8A;

FIGS. 9A through 9C are diagrams illustrating the antenna properties of the VHF band in the case that, with the reception system in FIG. 7, an extension cord is connected, wherein FIG. 9A is a diagram illustrating the antenna gain property of the VHF band of the reception system in FIG. 7, FIG. 9B is a diagram illustrating the vertical polarization property in the property diagram in FIG. 9A, and FIG. 9C is a diagram illustrating the horizontal polarization property in the property diagram in FIG. 9A;

FIG. 10 is a diagram illustrating a reception system in the case of disposing an antenna cable along a power cable, for example;

FIGS. 11A through 11C are diagrams illustrating the antenna properties of the VHF band in the case that, with the reception system in FIG. 3, no extension cord is connected, wherein FIG. 11A is a diagram illustrating the antenna gain property of the VHF band of the reception system in FIG. 3, FIG. 11B is a diagram illustrating the vertical polarization property in the property diagram in FIG. 11A, and FIG. 11C is a diagram illustrating the horizontal polarization property in the property diagram in FIG. 11A;

FIGS. 12A through 12C are diagrams illustrating the antenna properties of the VHF band in the case that, with the reception system in FIG. 3, an extension cord is connected, wherein FIG. 12A is a diagram illustrating the antenna gain property of the VHF band of the reception system in FIG. 3, FIG. 12B is a diagram illustrating the vertical polarization property in the property diagram in FIG. 12A, and FIG. 12C is a diagram illustrating the horizontal polarization property in the property diagram in FIG. 12A;

FIGS. 13A through 13C are diagrams illustrating the antenna properties of the UHF band in the case that, with the reception system in FIG. 3, no extension cord is connected, wherein FIG. 13A is a diagram illustrating the antenna gain property of the UHF band of the reception system in FIG. 3, FIG. 13B is a diagram illustrating the vertical polarization property in the property diagram in FIG. 13A, and FIG. 13C is a diagram illustrating the horizontal polarization property in the property diagram in FIG. 13A;

FIGS. 14A through 14C are diagrams illustrating the antenna properties of the UHF band in the case that, with the reception system in FIG. 3, an extension cord is connected, wherein FIG. 14A is a diagram illustrating the antenna gain property of the UHF band of the reception system in FIG. 3, FIG. 14B is a diagram illustrating the vertical polarization property in the property diagram in FIG. 14A, and FIG. 14C is a diagram illustrating the horizontal polarization property in the property diagram in FIG. 14A;

FIGS. 15A through 15C are diagrams illustrating the antenna properties of the VHF band in the case that, with an reception system wherein only an inductor on the power supply unit side is provided without providing an inductor on the mainframe side, no extension cord is connected, wherein FIG. 15A is a diagram illustrating the antenna gain property of the VHF band of the reception system wherein only an inductor on the power supply unit side is provided, FIG. 15B is a diagram illustrating the vertical polarization property in the property diagram in FIG. 15A, and FIG. 15C is a diagram illustrating the horizontal polarization property in the property diagram in FIG. 15A;

FIGS. 16A through 16C are diagrams illustrating the antenna properties of the VHF band in the case that, with an reception system wherein only an inductor on the power supply unit side is provided without providing an inductor on the mainframe side, an extension cord is connected, wherein FIG. 16A is a diagram illustrating the antenna gain property of the VHF band of the reception system wherein only an inductor on the power supply unit side is provided, FIG. 16B is a diagram illustrating the vertical polarization property in the property diagram in FIG. 16A, and FIG. 16C is a diagram illustrating the horizontal polarization property in the property diagram in FIG. 16A;

FIGS. 18A through 18C are diagrams illustrating the antenna properties of the UHF band in the case that, with the reception system in FIG. 17, no extension cord is connected, wherein FIG. 18A is a diagram illustrating the antenna gain property of the UHF band of the reception system in FIG. 17, FIG. 18B is a diagram illustrating the vertical polarization property in the property diagram in FIG. 18A, and FIG. 18C is a diagram illustrating the horizontal polarization property in the property diagram in FIG. 18A;

FIGS. 19A through 19C are diagrams illustrating the antenna properties of the UHF band in the case that, with the reception system in FIG. 17, an extension cord is connected, wherein FIG. 19A is a diagram illustrating the antenna gain property of the UHF band of the reception system in FIG. 17, FIG. 19B is a diagram illustrating the vertical polarization property in the property diagram in FIG. 19A, and FIG. 19C is a diagram illustrating the horizontal polarization property in the property diagram in FIG. 19A;

FIGS. 20A through 20C are diagrams illustrating the antenna properties of the VHF band in the case that, with an reception system wherein no inductor is provided in both ends of a power transmission cable, an extension cord is connected, wherein FIG. 20A is a diagram illustrating the antenna gain property of the VHF band of the reception system wherein no inductor is provided in both ends of a power transmission cable, FIG. 20B is a diagram illustrating the vertical polarization property in the property diagram in FIG. 20A, and FIG. 20C is a diagram illustrating the horizontal polarization property in the property diagram in FIG. 20A;

FIGS. 21A through 21C are diagrams illustrating the antenna properties of the VHF band with the reception system in FIG. 3 according to contrast with FIGS. 20A through 20C, wherein FIG. 21A is a diagram illustrating the antenna gain property of the VHF band of the reception system in FIG. 3, FIG. 21B is a diagram illustrating the vertical polarization property in the property diagram in FIG. 21A, and FIG. 21C is a diagram illustrating the horizontal polarization property in the property diagram in FIG. 21A;

FIGS. 22A through 22C are diagrams illustrating the antenna properties of the UHF band in the case that, with an reception system wherein no inductor is provided in both ends of a power transmission cable, an extension cord is connected, wherein FIG. 22A is a diagram illustrating the antenna gain property of the UHF band of the reception system wherein no inductor is provided in both ends of a power transmission cable, FIG. 22B is a diagram illustrating the vertical polarization property in the property diagram in FIG. 22A, and FIG. 22C is a diagram illustrating the horizontal polarization property in the property diagram in FIG. 22A;

FIGS. 23A through 23C are diagrams illustrating the antenna properties of the UHF band with the reception system in FIG. 3 according to contrast with FIGS. 22A through 22C, wherein FIG. 23A is a diagram illustrating the antenna gain property of the UHF band of the reception system in FIG. 3, FIG. 23B is a diagram illustrating the vertical polarization property in the property diagram in FIG. 23A, and FIG. 23C is a diagram illustrating the horizontal polarization property in the property diagram in FIG. 23A;

FIGS. 27A through 27C are diagrams illustrating the antenna properties of the VHF band in the case that, with the reception system in FIG. 24, no extension cord is connected, wherein FIG. 27A is a diagram illustrating the antenna gain property of the VHF band of the reception system in FIG. 24, FIG. 27B is a diagram illustrating the vertical polarization property in the property diagram in FIG. 27A, and FIG. 27C is a diagram illustrating the horizontal polarization property in the property diagram in FIG. 27A;

FIGS. 28A through 28C are diagrams illustrating the antenna properties of the VHF band in the case that, with the reception system in FIG. 24, an extension cord is connected, wherein FIG. 28A is a diagram illustrating the antenna gain property of the VHF band of the reception system in FIG. 24, FIG. 28B is a diagram illustrating the vertical polarization property in the property diagram in FIG. 28A, and FIG. 28C is a diagram illustrating the horizontal polarization property in the property diagram in FIG. 28A;

FIGS. 29A through 29C are diagrams illustrating the antenna properties of the UHF band in the case that, with the reception system in FIG. 24, no extension cord is connected, wherein FIG. 29A is a diagram illustrating the antenna gain property of the UHF band of the reception system in FIG. 24, FIG. 29B is a diagram illustrating the vertical polarization property in the property diagram in FIG. 29A, and FIG. 29C is a diagram illustrating the horizontal polarization property in the property diagram in FIG. 29A;

FIGS. 30A through 30C are diagrams illustrating the antenna properties of the UHF band in the case that, with the reception system in FIG. 24, an extension cord is connected, wherein FIG. 30A is a diagram illustrating the antenna gain property of the UHF band of the reception system in FIG. 24, FIG. 30B is a diagram illustrating the vertical polarization property in the property diagram in FIG. 30A, and FIG. 30C is a diagram illustrating the horizontal polarization property in the property diagram in FIG. 30A;

FIGS. 31A through 31C are diagrams illustrating the antenna properties of the VHF band in the case that, with the reception system in FIG. 24, an extension cord is connected in a state in which the cables of the power supply device are drooped vertically, wherein FIG. 31A is a diagram illustrating the antenna gain property of the VHF band of the reception system in FIG. 24, FIG. 31B is a diagram illustrating the vertical polarization property in the property diagram in FIG. 31A, and FIG. 31C is a diagram illustrating the horizontal polarization property in the property diagram in FIG. 31A;

FIGS. 32A through 32C are diagrams illustrating the antenna properties of the VHF band in the case that, with the reception system in FIG. 24, an extension cord is connected in a state in which the cables of the power supply device are bundled, wherein FIG. 32A is a diagram illustrating the antenna gain property of the VHF band of the reception system in FIG. 24, FIG. 32B is a diagram illustrating the vertical polarization property in the property diagram in FIG. 32A, and FIG. 32C is a diagram illustrating the horizontal polarization property in the property diagram in FIG. 32A;

FIGS. 33A through 33C are diagrams illustrating the antenna properties of the UHF band in the case that, with the reception system in FIG. 24, an extension cord is connected in a state in which the cables of the power supply device are drooped vertically, wherein FIG. 33A is a diagram illustrating the antenna gain property of the UHF band of the reception system in FIG. 24, FIG. 33B is a diagram illustrating the vertical polarization property in the property diagram in FIG. 33A, and FIG. 33C is a diagram illustrating the horizontal polarization property in the property diagram in FIG. 33A;

FIGS. 34A through 34C are diagrams illustrating the antenna properties of the UHF band in the case that, with the reception system in FIG. 24, an extension cord is connected in a state in which the cables of the power supply device are bundled, wherein FIG. 34A is a diagram illustrating the antenna gain property of the UHF band of the reception system in FIG. 24, FIG. 34B is a diagram illustrating the vertical polarization property in the property diagram in FIG. 34A, and FIG. 34C is a diagram illustrating the horizontal polarization property in the property diagram in FIG. 34A;

FIGS. 39A through 39C are diagrams illustrating the antenna properties of the VHF band in the case that, with the reception system in FIG. 37, no extension cord is connected, wherein FIG. 39A is a diagram illustrating the antenna gain property of the VHF band of the reception system in FIG. 37, FIG. 39B is a diagram illustrating the vertical polarization property in the property diagram in FIG. 39A, and FIG. 39C is a diagram illustrating the horizontal polarization property in the property diagram in FIG. 39A;

FIGS. 40A through 40C are diagrams illustrating the antenna properties of the VHF band in the case that, with the reception system in FIG. 37, an extension cord is connected, wherein FIG. 40A is a diagram illustrating the antenna gain property of the VHF band of the reception system in FIG. 37, FIG. 40B is a diagram illustrating the vertical polarization property in the property diagram in FIG. 40A, and FIG. 40C is a diagram illustrating the horizontal polarization property in the property diagram in FIG. 40A;

FIGS. 41A through 41C are diagrams illustrating the antenna properties of the VHF band in the case that, with the reception system in FIG. 37, the cable lengths differ from those in the example in FIG. 39, and no extension cord is connected, wherein FIG. 41A is a diagram illustrating the antenna gain property of the VHF band of the reception system in FIG. 37, FIG. 41B is a diagram illustrating the vertical polarization property in the property diagram in FIG. 41A, and FIG. 41C is a diagram illustrating the horizontal polarization property in the property diagram in FIG. 41A;

FIGS. 42A through 42C are diagrams illustrating the antenna properties of the VHF band in the case that, with the reception system in FIG. 37, the cable lengths differ from those in the example in FIG. 40, and an extension cord is connected, wherein FIG. 42A is a diagram illustrating the antenna gain property of the VHF band of the reception system in FIG. 37, FIG. 42B is a diagram illustrating the vertical polarization property in the property diagram in FIG. 42A, and FIG. 42C is a diagram illustrating the horizontal polarization property in the property diagram in FIG. 42A;

FIG. 43 is a diagram illustrating the configurations and connection relationship of the principal portions of the reception system according to a sixth embodiment in detail;

FIG. 50 is a diagram illustrating a configuration example of a relay portion (branch portion) according to the present tenth embodiment;

FIG. 51 is a diagram for describing the length of a portion serving as an antenna;

FIGS. 52A through 52C are diagrams illustrating the antenna properties of an arrangement wherein an LC resonance circuit is provided partway along a transmission cable to restrict the electric length of the power code periodically, and broadcast waves are received at a portion where this electric length is restricted, wherein FIG. 52A is a diagram illustrating the antenna gain property of the UHF band, FIG. 52B is a diagram illustrating the vertical polarization property in the property diagram in FIG. 52A, and FIG. 52C is a diagram illustrating the horizontal polarization property in the property diagram in FIG. 52A;

FIGS. 53A through 53C are diagrams illustrating the antenna properties of the power cable according to the tenth embodiment, wherein FIG. 53A is a diagram illustrating the antenna gain property of the UHF band, FIG. 53B is a diagram illustrating the vertical polarization property in the property diagram in FIG. 53A, and FIG. 53C is a diagram illustrating the horizontal polarization property in the property diagram in FIG. 53A;

FIG. 54 is a diagram illustrating the configurations and connection relationship of the principal portions of the television receiver and power cable according to an eleventh embodiment of the present invention in detail;

FIG. 55 is a diagram illustrating the configurations and connection relationship of the principal portions of the television receiver and power cable according to a twelfth embodiment of the present invention in detail;

FIG. 56 is a diagram illustrating the configurations and connection relationship of the principal portions of the television receiver and power cable according to a thirteenth embodiment of the present invention in detail;

FIGS. 66A through 66C are diagrams illustrating the antenna properties of the UHF band in a state in which the power cable in the case of including no board portion is extended straightly (ideal state), wherein FIG. 66A is a diagram illustrating the antenna gain property of the UHF band, FIG. 66B is a diagram illustrating the vertical polarization property in the property diagram in FIG. 66A, and FIG. 66C is a diagram illustrating the horizontal polarization property in the property diagram in FIG. 66A;

FIGS. 67A through 67C are diagrams illustrating the antenna properties of the UHF band in a state in which the power cable in the case of including no board portion is folded by half, wherein FIG. 67A is a diagram illustrating the antenna gain property of the UHF band, FIG. 67B is a diagram illustrating the vertical polarization property in the property diagram in FIG. 67A, and FIG. 67C is a diagram illustrating the horizontal polarization property in the property diagram in FIG. 67A;

FIGS. 68A through 68C are diagrams illustrating the antenna properties of the UHF band of the power cable according to the eighteenth embodiment including a board portion, wherein FIG. 68A is a diagram illustrating the antenna gain property of the UHF band, FIG. 68B is a diagram illustrating the vertical polarization property in the property diagram in FIG. 68A, and FIG. 68C is a diagram illustrating the horizontal polarization property in the property diagram in FIG. 68A;

DESCRIPTION OF THE PREFERRED EMBODIMENTS

Embodiments of the present invention will be described below in a manner correlated with the drawings.

Figure 1:
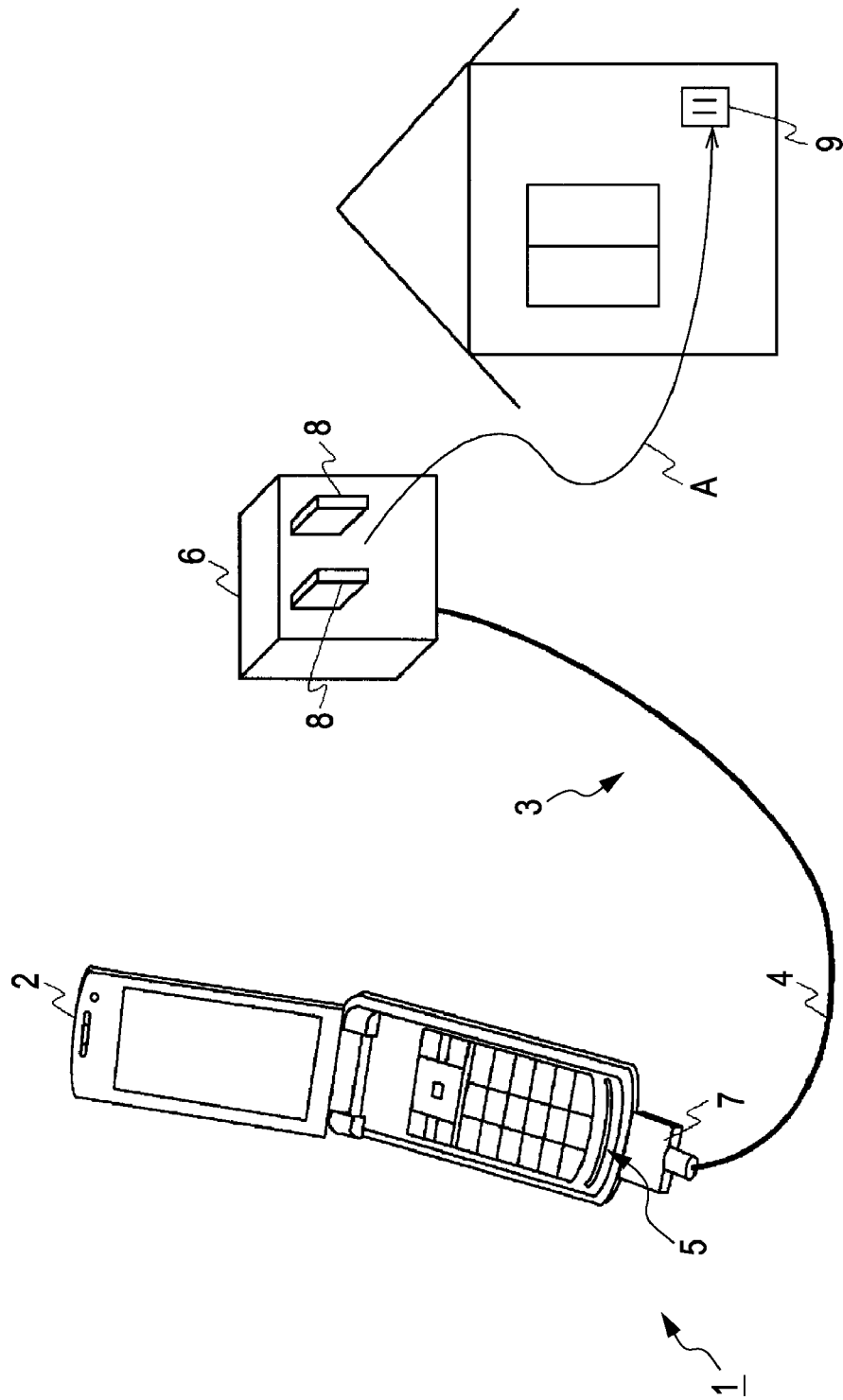
FIG. 1 is a diagram illustrating a reception system according to a first embodiment of the present invention.
Figure 2:
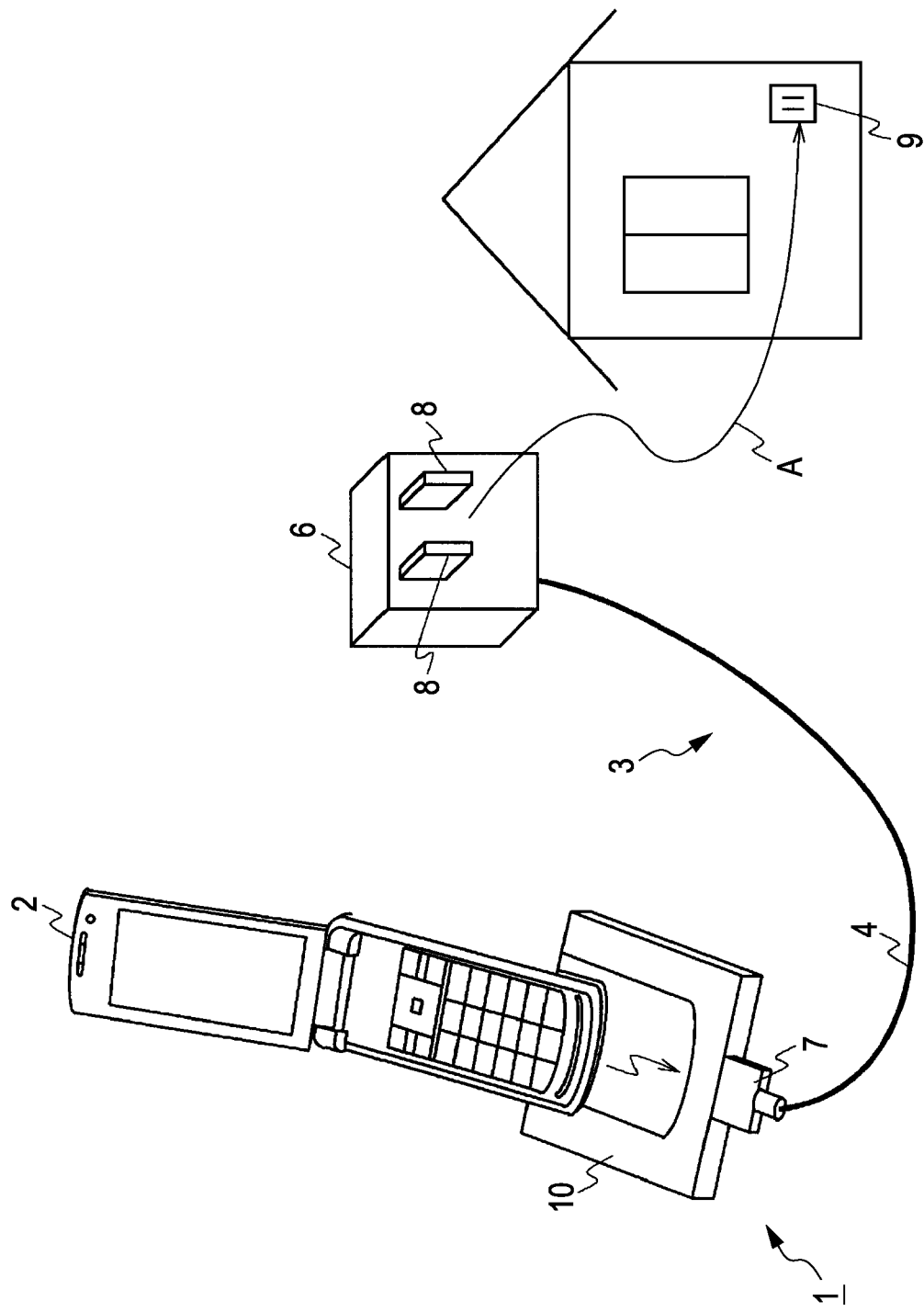
FIG. 2 is a diagram illustrating a case where the power supply device in FIG. 1 is connected to a cellular phone via a charging stand.

Note that description will be made in accordance with the following sequence.
1. First Embodiment
2. Second Embodiment
3. Third Embodiment
4. Fourth Embodiment 5. Fifth Embodiment
6. Sixth Embodiment
7. Seventh Embodiment
8. Eighth Embodiment
9. Ninth Embodiment
10. Tenth Embodiment
11. Eleventh Embodiment
12. Twelfth Embodiment
13. Thirteenth Embodiment
14. Fourteenth Embodiment
15. Fifteenth Embodiment
16. Sixteenth Embodiment
17. Seventeenth Embodiment
18. Eighteenth Embodiment
19. Nineteenth Embodiment
20. Twentieth Embodiment
21. Twenty First Embodiment
22. Twenty Second Embodiment
23. Twenty Third Embodiment
24. Twenty Fourth Embodiment
25. Twenty Fifth Embodiment
1. First Embodiment
Arrangement of Embodiment FIG. 1 is a diagram illustrating an arrangement example of a reception system according to a first embodiment of the present invention, and FIG. 2 is a diagram illustrating a case where the power supply device in FIG. 1 is connected to a cellular phone via a charging stand. This reception system 1 supplies power for charging from a power supply device 3 to a cellular phone 2. This reception system 1 controls a power transmission cable 4 for transmitting this power for charging to serve as an antenna, and receives the broadcast waves of digital television broadcasting, the broadcast waves of a download service, and the like at the cellular phone 2. Note that the broadcast waves of a download service are, for example, the broadcast waves of MediaFLO (registered trademark) that is a service for downloading video contents using broadcast waves.

Here, the cellular phone 2 is a cellular phone having a recording/playback function of various types of contents, and a connector 5 is provided to the side face thereof.

The power supply device 3 includes a power supply unit 6 which generates the power for charging of the cellular phone 2 which is a mainframe from commercial power supply, and transmits the power generated at this power supply unit 6 to the cellular phone 2 using the power transmission cable 4. With the power supply device 3, a connector 7 is provided to one end of the power transmission cable 4, and the connector 7 is connected to the connector 5 of the cellular phone 2, and is connected to the cellular phone 2.

The power supply unit 6 is formed in a general rectangular shape, wherein a terminal 8 for inputting commercial power supply from a commercial power supply power outlet is provided on one face thereof. Thus, such as shown by an arrow A in FIG. 1, the power supply unit 6 generates 5 V DC power for charging (voltage) from an AC commercial power source of AC 100 V by this terminal 8 being inserted into an indoor power outlet.

Note that, with the reception system 1, as shown in FIG. 2 in contrast with FIG. 1, the power supply device 3 may be connected to the cellular phone 2 via a charging stand 10.

Figure 3:
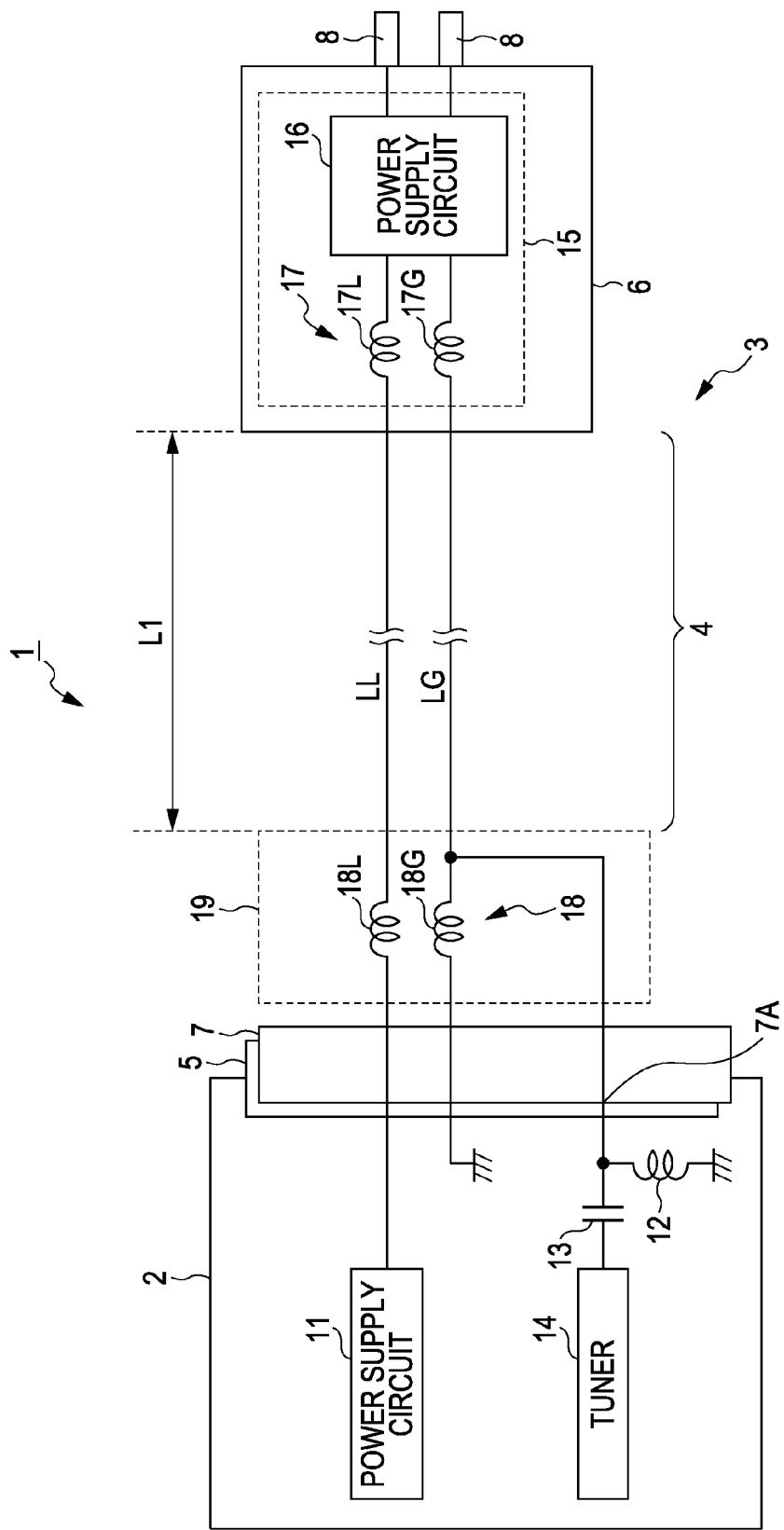
FIG. 3 is a diagram illustrating the configurations and connection relationship of the principal portions of the reception system according to the present first embodiment in detail.

FIG. 3 is a diagram illustrating the configurations and connection relationship of the principal portions of this reception system 1 in detail.

With the cellular phone 2, a power supply terminal on the hot side of the connector 5 is connected to a power supply circuit 11 for charging, and a power supply terminal on the cold side of the connector 5 is grounded. With the cellular phone 2, an antenna input terminal of the connector 5 is grounded by an inductor 12, and is connected to an antenna input end of a tuner 14 via a capacitor 13. This tuner 14 is a tuner capable of receiving the above broadcast waves. Note that the inductor 12 makes up a matching circuit, and is set to 18 nH with the present embodiment.

With the power supply unit 6, a power supply circuit 16 which generates power for charging from commercial power supply is provided onto a wiring board 15. The power supply unit 6 outputs the hot side power supply and the cold side power supply generated at the power supply circuit 16 to a power transmission cable 4 via inductors 17L and 17G making up a high-frequency cutoff circuit 17, respectively.

Note that the inductors 17L and 17G are made up of, for example, a ferrite bead, prevent noise and a high-frequency signal from the commercial power source side from contamination, and set the electric length of the power transmission cable 4 serving as an antenna.

Figure 4:
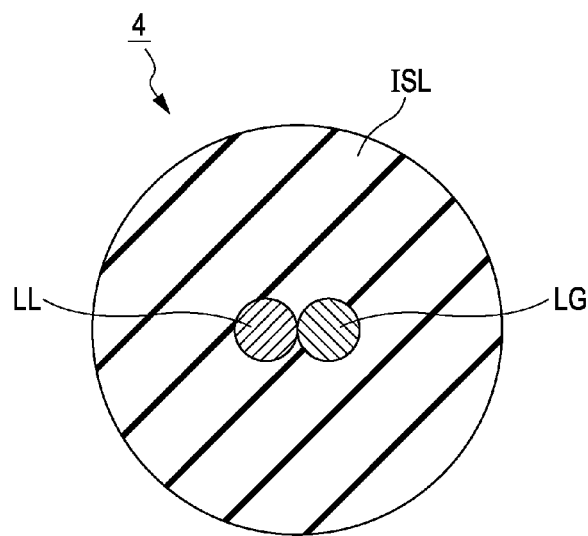
FIG. 4 is a schematic cross-sectional view illustrating a configuration example of a power transmission cable according to the present embodiment.
Figure 5:
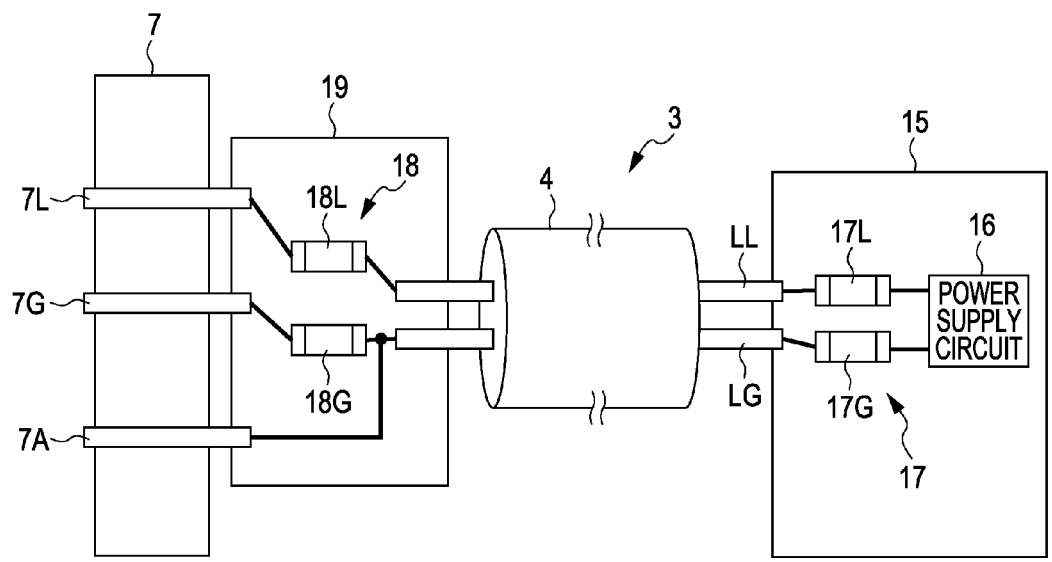
FIG. 5 is a diagram illustrating the power supply device in FIG. 3 in detail.

FIG. 4 is a schematic cross-sectional view illustrating a configuration example of the power transmission cable 4 according to the present embodiment, and FIG. 5 is a diagram illustrating the power supply device in FIG. 1 in detail.

The power transmission cable 4 is, such as shown in FIG. 4 by taking the cross section thereof, a multi-core cable wherein two cables LL and LG are covered with an insulator and are held integrally. With the power transmission cable 4, the two cables LL and LG are assigned to the hot side power supply and the cold side power supply respectively, and such as shown in FIG. 5, the power supply unit 6 side ends of the cables LL and LG are connected to the inductors 17L and 17G on the wiring board 15. Note that hereinafter, the cables LL and LG will be referred to as power cables.

The transmission cables LL and LG are each fabricated by being covered with a twist wire including an aramid fiber. Note that, in FIG. 3 and the like, the transmission cables LL and LG are illustrated in a case of being held integrally by parallel two wires, but may be held integrally in a twisted state.

With the power transmission cable 4, such as shown in FIG. 5, the connector 7 side ends of the transmission cables LL and LG are connected to the power supply terminals 7L and 7G via inductors 18L and 18G making up a high-frequency cutoff circuit 18, respectively. Here, the high-frequency cutoff circuit is a circuit which selectively suppresses transmission of a high-frequency signal, and the inductors 18L and 18G are applied with the present embodiment.

Note that, with the inductors, in general, impedance Z is $j\omega L$, and the impedance Z increases according to increase in the frequency, whereby a high frequency can be cut off. With the inductors, further self resonance due to an inductor component and a capacitor component included in the inductors is used, whereby impedance can be used to the maximum. The inductors 18L and 18G are made up of, for example, a ferrite bead, prevent a high-frequency signal from mixing in the cellular phone 2, and prevent noise from outflow from the cellular phone 2.

Also, with the power transmission cable 4, the inductor 18G side end of the transmission cable LG assigned to the cold side power supply is connected to the antenna input terminal 7A of the connector 7. Note that, with the power transmission cable 4, such as shown in FIG. 5, the inductors 18L and 18G are mounted on a wiring board 19 where the connector 7 is mounted, and the transmission cables LL and LG are connected to the inductors 18L and 18G on this wiring board 19.

After connection thereof, the back side where the wiring board 19 is disposed is subjected to molding with a resin along with the cellular phone 2 side end of the power transmission cable 4.

Note that the inductors 17L, 17G, 18L, and 18G may be formed of a chip inductor instead of a ferrite bead. With the power transmission cable 4, length L1 from the inductors 17L and 17G to the inductors 18L and 18G is set to odd multiple of ¼ wavelength as to the wavelength of the reception frequency of the reception system 1. More specifically, the length 1100 mm of around ¾ wavelength is set as to the wavelength of the frequency 190 MHz of the reception frequency band of the reception system 1.

Figure 6:
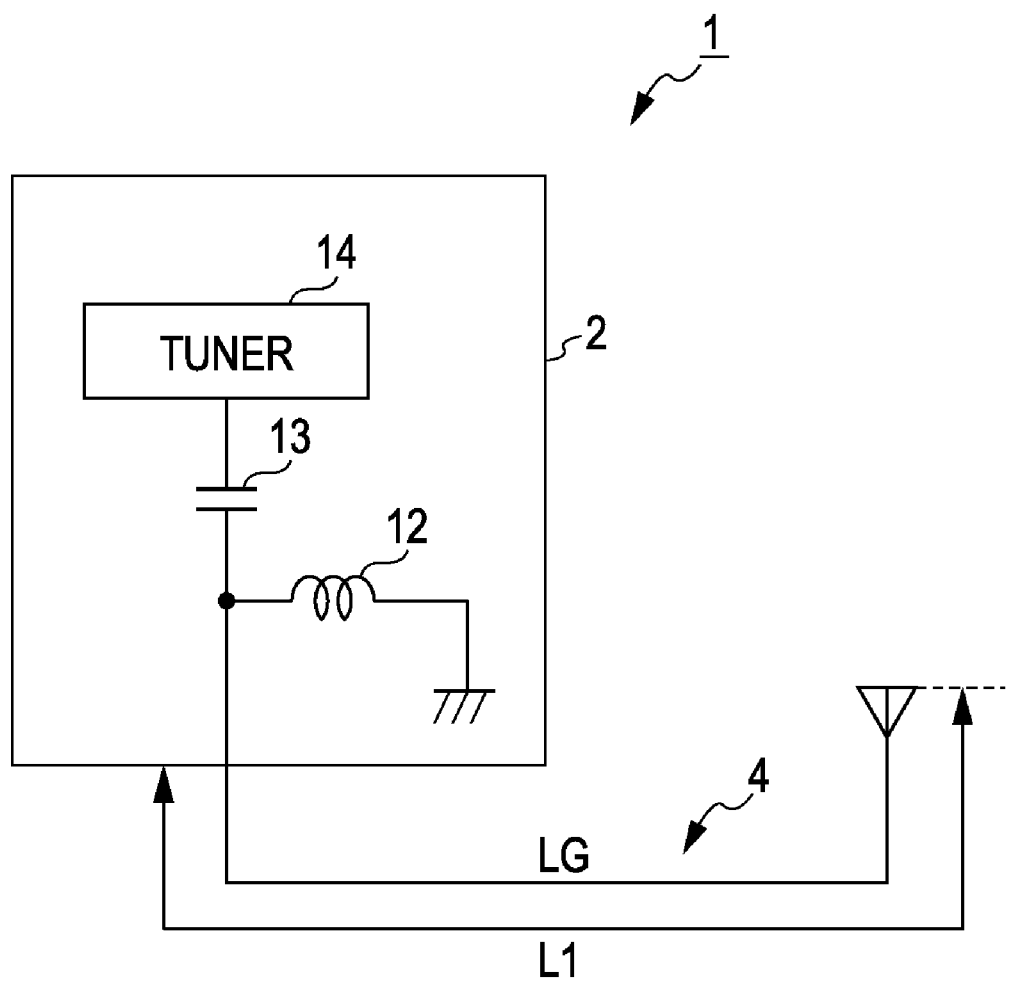
FIG. 6 is a diagram used for describing an antenna.

As a result thereof, such as shown in FIG. 6, with the reception system 1, a monopole antenna of ¾ wavelength is formed by the transmission cable LG. According to this antenna, the band of the fundamental frequency corresponding to ¾ wavelength can be received, and also, the UHF band, e.g., broadcast waves of 470 through 770 MHz of a terrestrial digital TV can be received using the higher harmonic of the fundamental frequency.

Operation of Embodiment

With the above arrangement, with the reception system 1, the power supply device 3 is connected to the cellular phone 2, and the power supply device 3 is connected to a commercial power supply power outlet, thereby generating DC power for charging from the commercial power supply at the power supply device 3. The generated DC power is transmitted to the cellular phone 2, and the cellular phone 2 is charged.

Also, with the reception system 1, after various types of broadcast waves are received at the cellular phone 2 by a user's operations to record the contents thereof, the recorded contents are played at the cellular phone 2 again to provide these to the user.

Here, in the case that broadcast waves are received, upon broadcast waves being received at a built-in antenna, sufficient antenna gain is not secured, and accordingly, a weak electric field area will experience difficulty in receiving broadcast waves satisfactorily.

In particular, in the case of receiving broadcast waves indoors, electric field strength is markedly weakened due to various types of shielding, and as a result thereof, sensitivity is markedly deteriorated. Also, influence of the internal noise of the cellular phone 2 is unavoidable, which also prevents broadcast waves from being received in a stable manner.

Now, an arrangement can be conceived to receive broadcast waves using a rod antenna. However, using a rod antenna adversely affects appearance design. In particular, with the cellular phone 2, antenna length can be set to 10 cm or so at most, and accordingly, even in the case of using a rod antenna, with the VHF band such as FM broadcasting, digital radio broadcasting, or the like, sufficient antenna gain is not secured, and consequently, reception sensitivity is deteriorated.

Therefore, with the reception system 1 according to the present first embodiment, the power transmission cable 4 for supplying the power of the power supply device 3 to the cellular phone 2 is controlled to serve as an antenna, thereby receiving broadcast waves. In this case, influence of internal noise in the case of using a built-in antenna is avoidable effectively, and also sensitivity can be improved as compared to the case of using a built-in antenna. Also, deterioration in design in the case of using a rod antenna can be prevented. However, in the case that the power transmission cable 4 is controlled to serve as an antenna by simply applying an arrangement wherein a power cable is controlled to serve as an antenna, it is difficult to secure sufficient gain with a sufficient wide frequency band.

Figure 7:
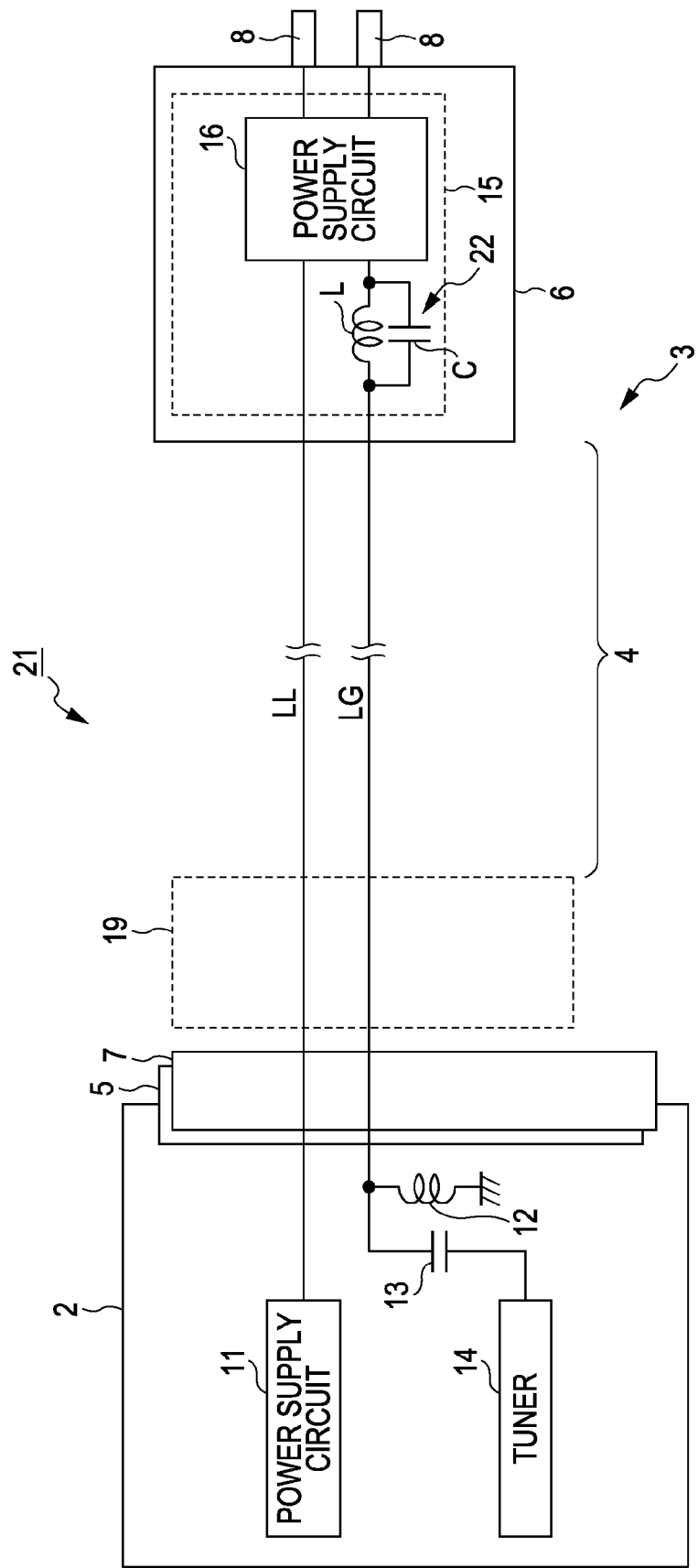
FIG. 7 is a diagram illustrating the configurations and connection relationship of the principal portions of the reception system in the case of providing an LC resonance circuit to a transmission cable LG serving as an antenna, for example.

FIG. 7 is a diagram illustrating a reception system to which a technique disclosed in Japanese Unexamined Patent Application Publication No. 2005-341067 in contrast with FIG. 1. FIG. 7 illustrates a case where an LC resonance circuit is provided to the transmission cable LG serving as an antenna, for example.

Note that, in FIG. 7, in order to facilitate understanding, the same function portions as those in FIG. 3 are denoted with the same reference numerals. With a reception system 21 shown in FIG. 7, on the power supply unit 6 side, the transmission cable LL on the hot side is directly connected to the power circuit 16, and the transmission cable LG on the cold side is connected to the power supply circuit 16 via an LC resonance circuit 22. Also, on the cellular phone 2 side, the transmission cable LL on the hot side is directly connected to the power circuit 11, the transmission cable LG on the cold side is grounded, and is connected to the tuner 14 via the capacitor 13.

With this reception system 21, the LC resonance circuit 22 is provided, and accordingly, there is a drawback wherein sufficient antenna gain is not secured with a wide band. Also, with the reception system 21, the transmission cable LL on the hot side and the transmission cable LG on the cold side are combined in a high-frequency manner, and the LC resonance circuit 22 does not readily function sufficiently, which also leads to a drawback wherein sufficient antenna gain is not secured.

Figures 8A, 8B, 8C:
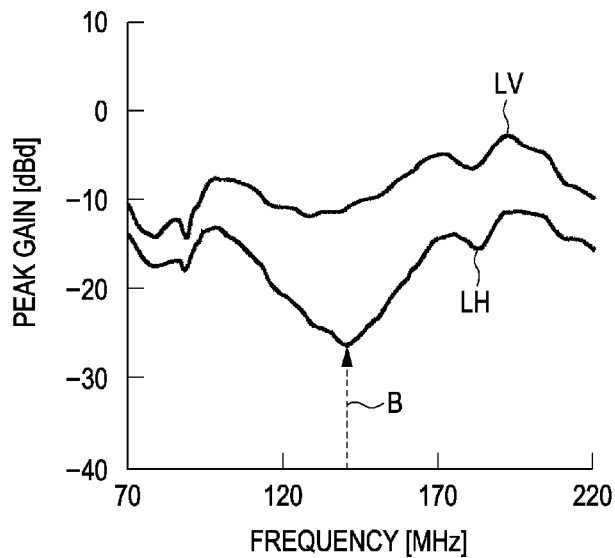

FIGS. 8A through 8C are diagrams illustrating the antenna properties of the VHF band in the case that, with the reception system 21 in FIG. 7, no extension cord is connected.

FIG. 8A is a diagram illustrating the antenna gain property of the VHF band of the reception system 21 in FIG. 7. FIG. 8B is a diagram illustrating the vertical polarization property in the property diagram in FIG. 8A. FIG. 8C is a diagram illustrating the horizontal polarization property in the property diagram in FIG. 8A. In FIG. 8A, the horizontal axis denotes a frequency, and the vertical axis denotes antenna gain.

The property in FIG. 8A is a measurement result in the case that the impedance of the resonance circuit 22 with the reception system 21 is set to infinity, and a terminal 8 of the power supply unit 6 is not connected to any portion. Also, the property of FIG. 8A is a measurement result in the case of connecting the power supply device to an evaluation board of which the ground size is 95×45 mm assuming the cellular phone 2 via a connector.

Note that symbols LH and LV in FIG. 8A denote the horizontal polarization and the vertical polarization, respectively. The length of the power transmission cable 4 in this case is 1100 mm equivalent to ¾ wavelength of a frequency 190 MHz.

Also, FIGS. 8B and 8C illustrates the measurement results shown in FIG. 8A in detail. With these measurement results in FIGS. 8A through 8C, such as shown in a symbol B in FIG. 8A, it can be understood that antenna gain is deteriorated locally. Accordingly, it can be found that sufficient gain is not secured with a sufficient wide frequency band.

Figures 9A, 9B, 9C:
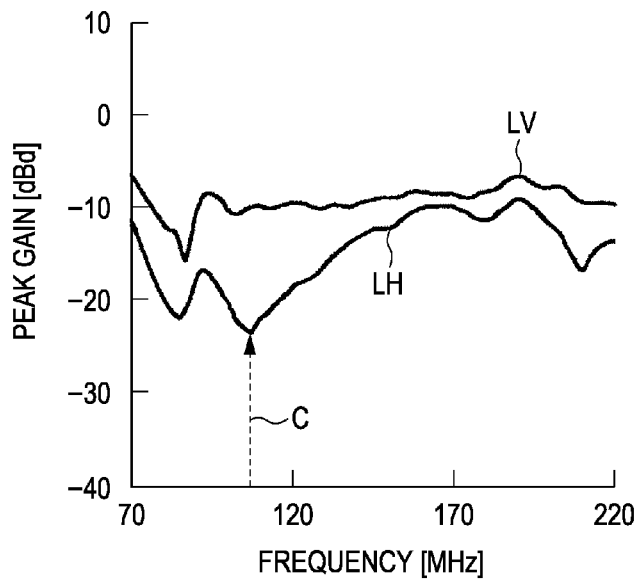

FIGS. 9A through 9C are diagrams illustrating measurement results in the case of connecting the terminal 8 of the power supply unit 6 to an extension cable with a length of 3 m with the reception system 21 in FIG. 7 in contrast with FIGS. 8A through 8C. Note that the conditions of measurement are the same as those in the case of FIGS. 8A through 8C.

According to the measurement results of FIGS. 9A through 9C, in contrast with FIGS. 8A through 8C, it can be found that the frequency of which the gain is deteriorated shown in a reference symbol C in FIG. 9A is displaced to a lower frequency side.

Therefore, with the reception system 21, in the case of having actually connected the power supply unit 6 to a commercial power supply power outlet, the antenna properties are changed variously according to drawing around the commercial power cable.

Also, with the measurement results of FIGS. 9A through 9C, the antenna gain deteriorates around 4 dB around the frequency of 190 MHz corresponding to the length of the power transmission cable 4. According to this as well, it can be found that sufficient gain is not secured with a sufficient wide frequency band.

FIG. 10 is a diagram illustrating a reception system conceived by applying the technique disclosed in Japanese Unexamined Patent Application Publication No. 2002-151932. Note that, in FIG. 10, in order to facilitate understanding, the same function portions as those in FIG. 3 are denoted with the same reference numerals. With a reception system 31 in FIG. 10, on the power supply unit 6 side, the transmission cable LL on the hot side and the transmission cable LG on the cold side are directly connected to the power circuit 16.

Also, on the cellular phone 2 side, the transmission cable LL on the hot side is directly connected to the power circuit 11, the transmission cable LG on the cold side is grounded, and is connected to the tuner 14 via the capacitor 13. Also, a cable LW wound around the transmission cables LL and LV is connected to a connection point of the capacitor 13 and the inductor 12. In this case, Q of the cable LW serving as an antenna markedly increases. As a result thereof, in this case as well, it is difficult to secure sufficient gain with a sufficient wide frequency band.

Also, with the reception system 31 in FIG. 10 as well, the antenna properties are changed variously according to an extension cable. Therefore, with the reception system 1 shown in FIG. 3 according to the present embodiment, the inductors 18L, 18G, 17L, and 17G making up the high-frequency cutoff circuits 18 and 17 are provided to the connectors 5 and 7 side ends of the transmission cables LL and LG, and portions separated from the connectors 5 and 7 by a predetermined length, respectively.

Thus, with the reception system 1, according to the inductors 18L and 18G on the connectors 5 and 7 sides, leakage of internal noise is prevented, and also various types of bad influence of the cellular phone 2 due to a high-frequency signal induced at the transmission cables LL and LG are prevented.

Also, the noise and high-frequency signal from commercial power supply due to the inductors 17L and 17G on the power supply unit 6 side are prevented from contamination. Also, according to the inductors 18L, 18G, 17L, and 17G, the electric length of a portion serving as an antenna is set. Thus, with the reception system 1 in FIG. 3, broadcast waves can be received with a sufficient wide frequency band and sufficient gain. Also, deviations of the antenna properties due to the extension cable can be prevented.

Figures 11A, 11B, 11C:
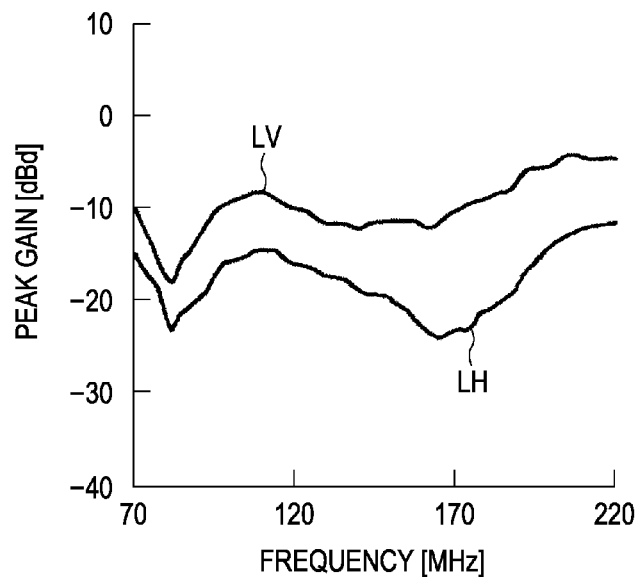
Figures 12A, 12B, 12C:
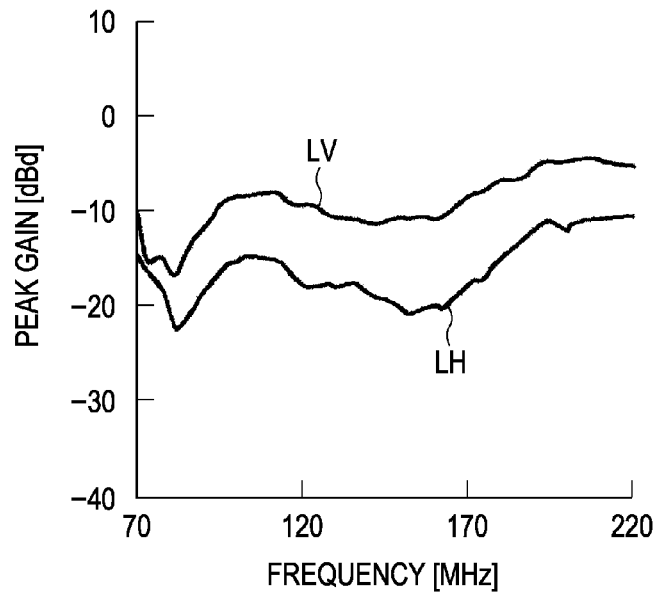

FIGS. 11A through 11C and FIGS. 12A through 12C are diagrams illustrating the measurement results of the VHF band with the reception system 1 in FIG. 3 in contrast with FIGS. 8A through 8C and FIGS. 9A through 9C, respectively. FIGS. 11A through 11C are measurement results in the case of connecting no extension cable, and FIGS. 12A through 12C are measurement results in the case of connecting an extension cable.

According to the measurement results of FIGS. 11A through 11C and FIGS. 12A through 12C, it can be found that broadcast waves can be received with a sufficient wide frequency band and sufficient gain as compared to an existing system. Further, it can be found that deviations of the antenna properties due to connection of an extension cable can be prevented.

FIGS. 13A through 13C and FIGS. 14A through 14C are diagrams illustrating the measurement results of the UHF band with the reception system 1 in FIG. 3 in contrast with FIGS. 11A through 11C and FIGS. 12A through 12C, respectively.

Figures 13A, 13B, 13C:
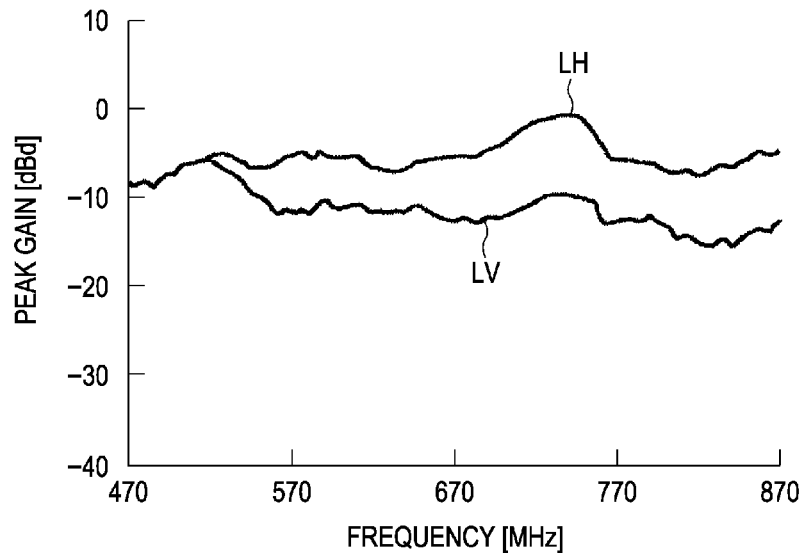
Figures 14A, 14B, 14C:
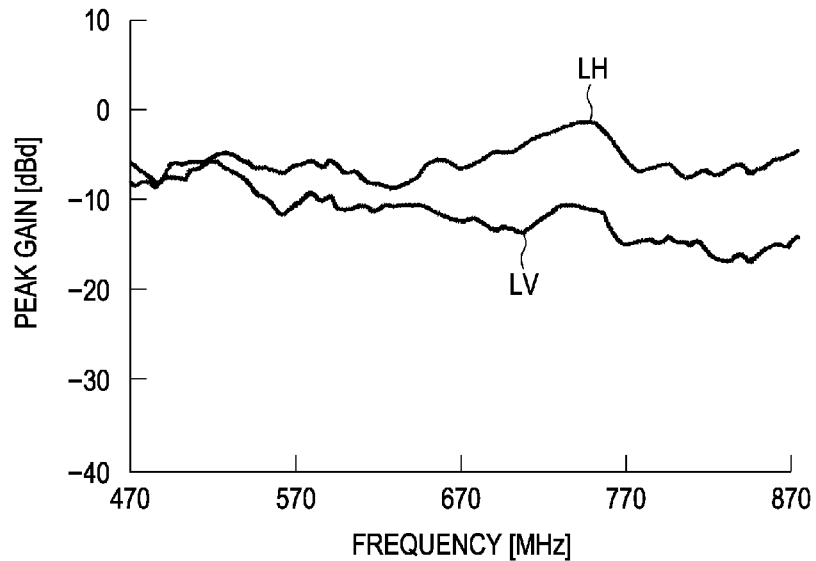

FIGS. 13A through 13C are measurement results in the case of connecting no extension cable, and FIGS. 14A through 14C are measurement results in the case of connecting an extension cable. Note that the measurement conditions thereof are the same as those in FIGS. 8A through 8C.

According to the measurement results of FIGS. 13A through 13C and FIGS. 14A through 14C, the reception system 1 in FIG. 3 can receive broadcast waves with a sufficient wide frequency band and sufficient gain even with the UHF band. Further, according to the reception system 1, it can be found that deviations of the antenna properties due to connection of an extension cable can be prevented.

FIGS. 15A through 15C and FIGS. 16A through 16C are diagrams illustrating measurement results in the case that the inductors 18L and 18G on the connectors 5 and 7 sides are omitted. The measurement conditions thereof are the same as those in FIGS. 8A through 8C.

Figure 17:
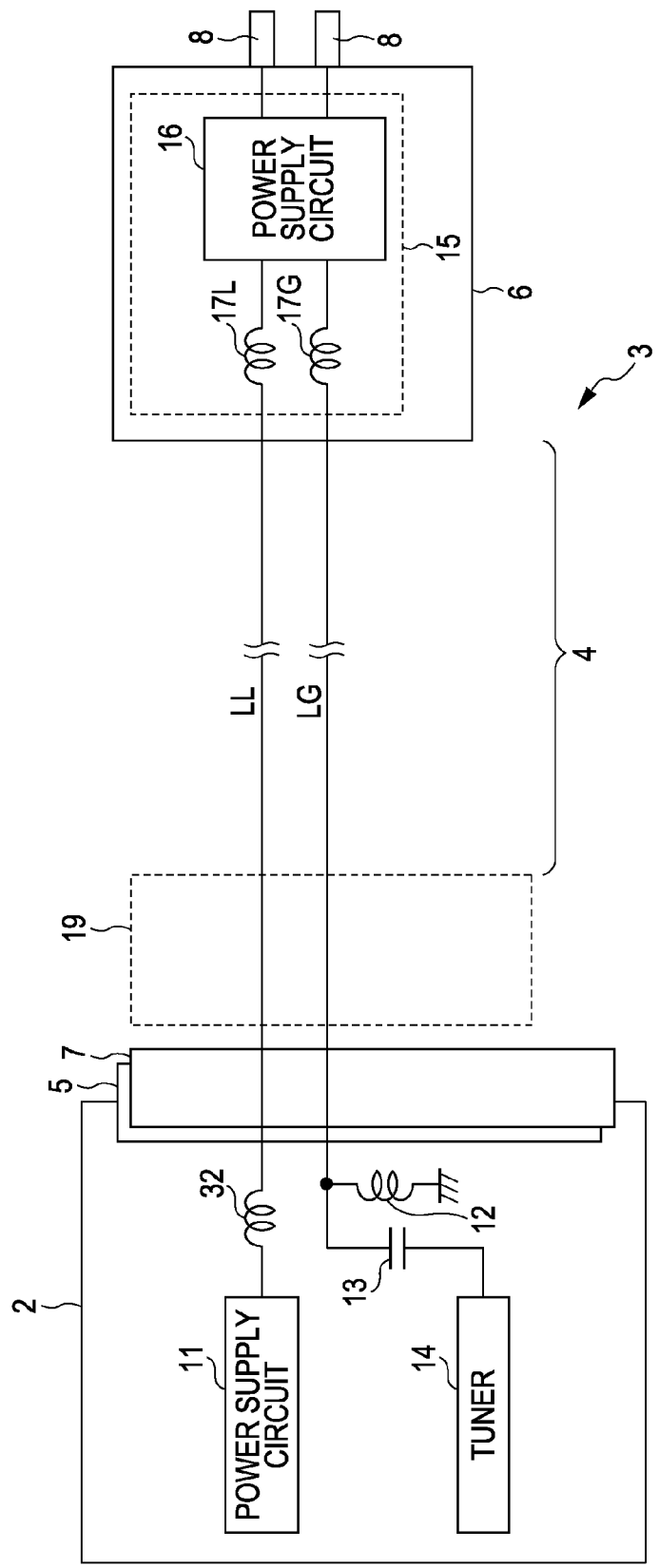
FIG. 17 is a diagram illustrating the configurations and connection relationship of the principal portions of the reception system in the case of providing only an inductor on the power supply unit side without providing an inductor on the mainframe side, for example.

With this measurement, such as shown in FIG. 17 in contrast with FIG. 3, a reception system has been applied wherein the inductors 18L and 18G on the connectors 5 and 7 sides are omitted, and an inductor 32 is disposed in the power line on the hot side within the cellular phone 2. Also, grounding of the power line on the cold side is executed via an inductor 12.

Figures 15A, 15B, 15C:
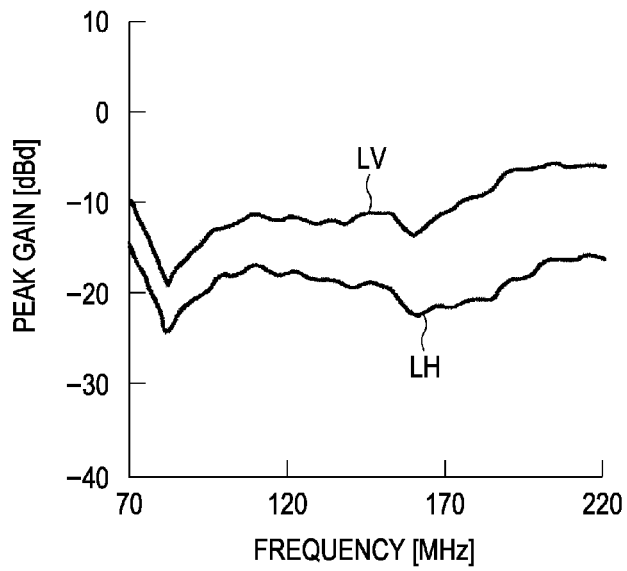
Figures 16A, 16B, 16C:
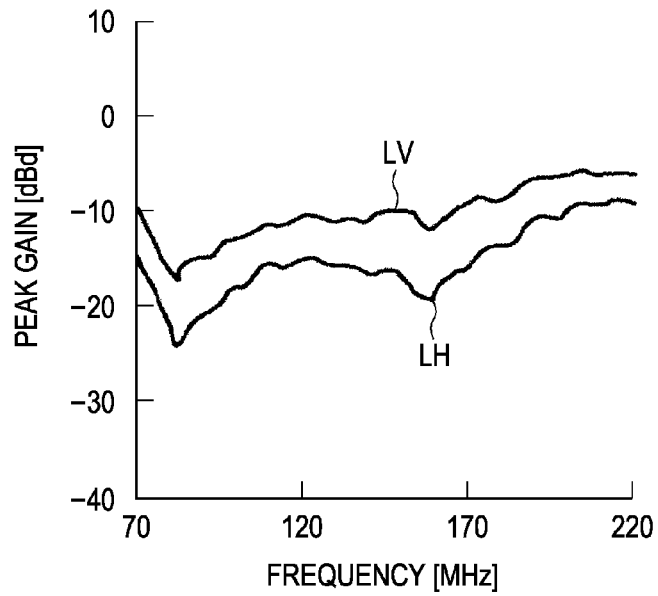

Here, FIGS. 15A through 15C are diagrams illustrating the antenna gain of the VHS band in the case of connecting no extension cable. FIGS. 16A through 16C are diagrams illustrating the antenna gain of the VHS band in the case of connecting an extension cable. Note that the length of the power transmission cable 4 is the same 1100 mm as described above.

Figures 18A, 18B, 18C:
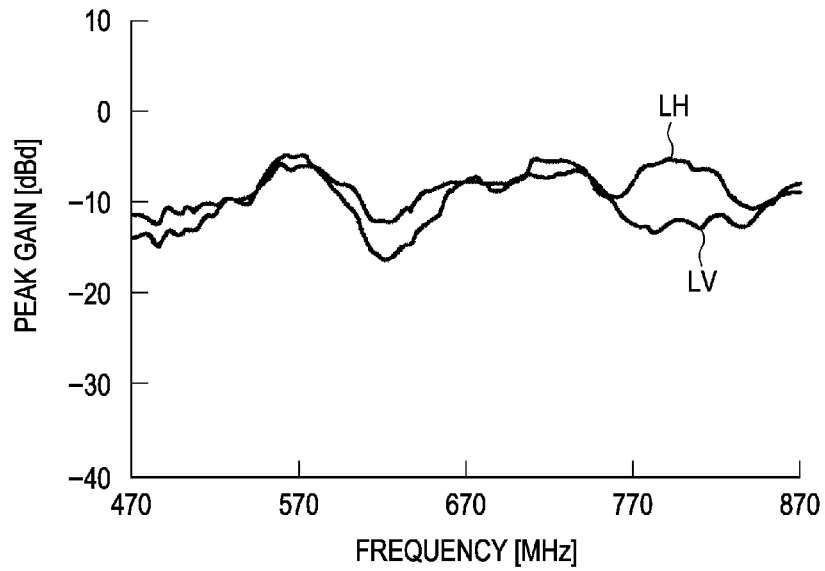
Figures 19A, 19B, 19C:
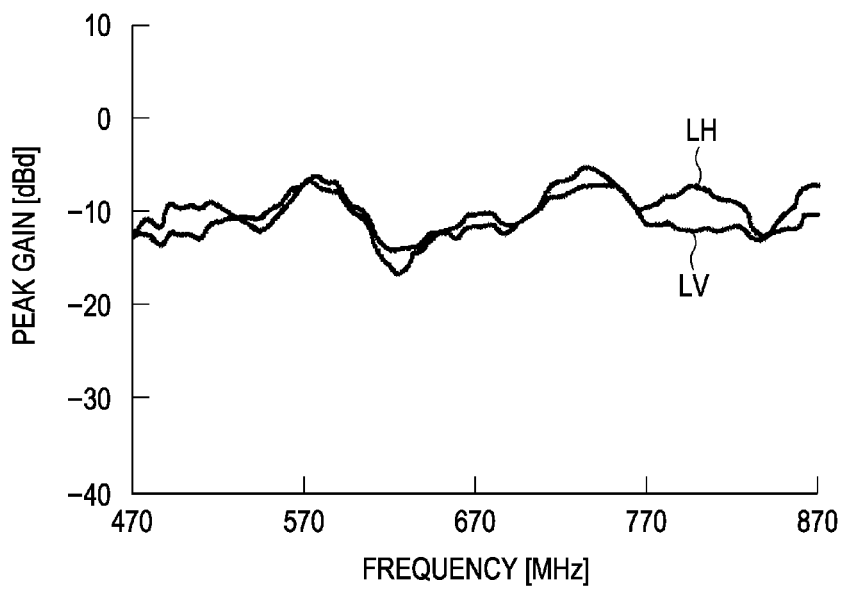
Figures 20A, 20B, 20C:
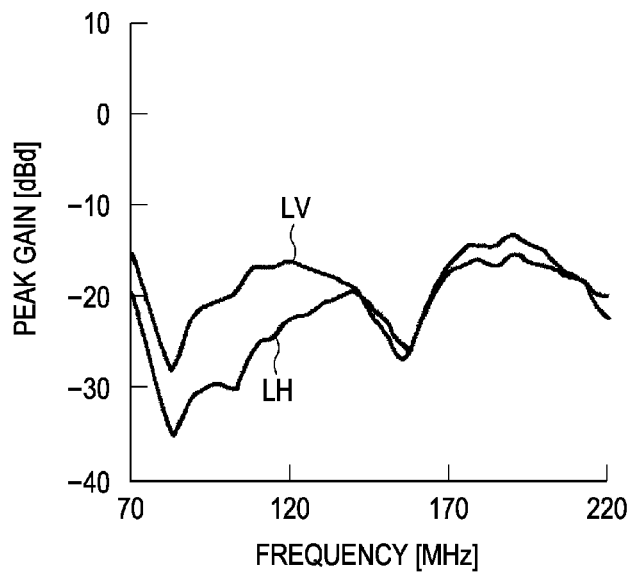
Figures 21A, 21B, 21C:
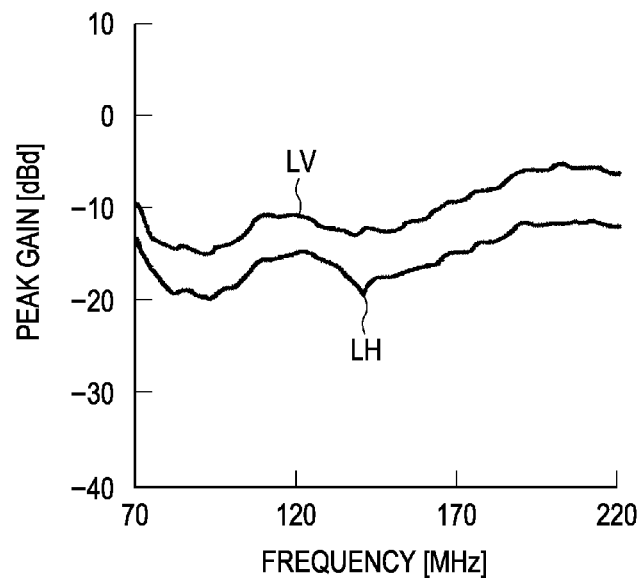
Figures 22A, 22B, 22C:
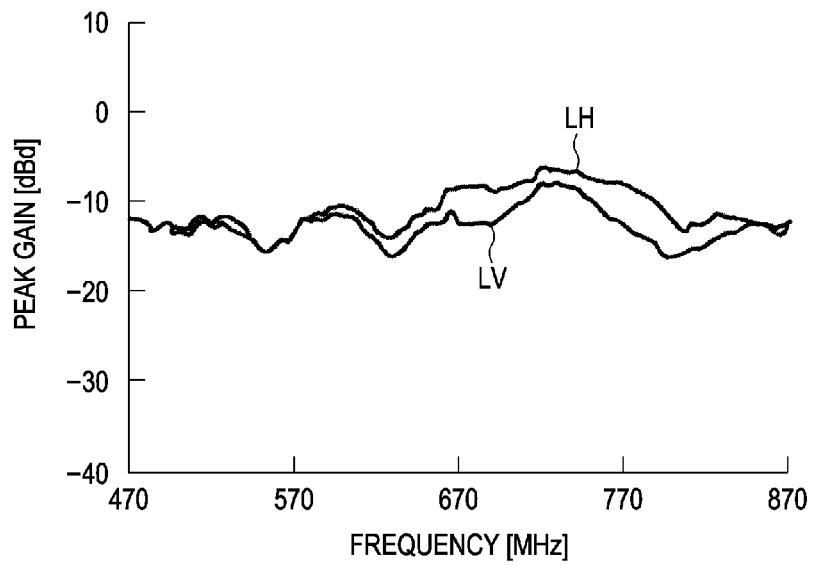
Figures 23A, 23B, 23C:
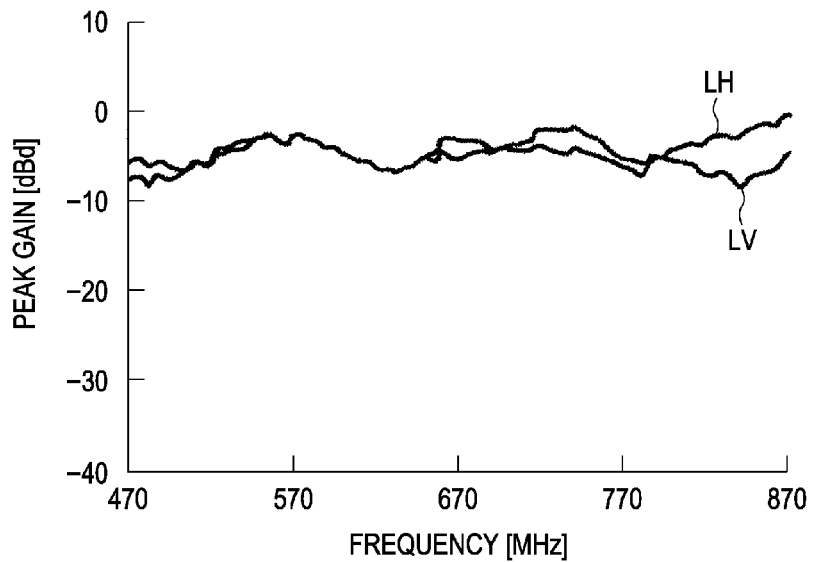

Also, FIGS. 18A through 18C and FIGS. 19A through 19C are diagrams illustrating the antenna properties of the UHF band with the reception system in FIG. 17. The measurement conditions thereof are the same as those in FIGS. 8A through 8C. Note that FIGS. 18A through 18C are measurement results in the case of connecting no extension cable, and FIGS. 19A through 19C are measurement results in the case of connecting an extension cable.

Upon comparing the measurement results of FIGS. 15A, 15B, and 15C through FIGS. 19A, 19B, and 19C, and the measurement results of FIGS. 11A through 11C through FIGS. 12A through 12C, the following can be found. That is to say, with the VHF band, even in the event that the inductors 18L and 18G on the connectors 5 and 7 sides are omitted and an inductor is provided within the cellular phone 2, there is almost no change in the properties.

However, with the UHF band, in the event that the inductors 18L and 18G on the connectors 5 and 7 sides are omitted, and an inductor is provided within the cellular phone 2, antenna gain decreases by an amount equivalent to the loss at the connectors 5 and 7.

This can be confirmed according to contrast between the measurement results of FIGS. 18A through 18C and the measurement results of FIGS. 13A through 13C, and contrast between the measurement results of FIGS. 19A through 19C and the measurement results of FIGS. 14A through 14C. Thus, it can be found that broadcast waves can be received at the reception system 1 in FIG. 3 as compared to the case of providing an inductor within the cellular phone 2.

FIGS. 20A, 20B, and 20C through FIGS. 23A, 23B, and 23C are diagrams illustrating measurement results in the case of using an actual cellular phone instead of the evaluation board. FIGS. 20A through 20C and FIGS. 22A through 22C are measurement results in the case of omitting the inductors 17L, 17G, 18L, and 18G, and directly connecting the power transmission cable to the power supply unit 6 and the connector 7, and illustrate the properties of the VHF band and the UHF band respectively. Also, FIGS. 21A through 21C and FIGS. 23A through 23C illustrate the properties of the VHF band and the UHF band with the reception system 1 in FIG. 3.

Note that FIGS. 20A, 20B, and 20C through FIGS. 23A, 23B, and 23C illustrate the properties in the case of connecting an extension cable. According to FIGS. 20A, 20B, and 20C through FIGS. 23A, 23B, and 23C, the following can be found. That is to say, it can be found that the reception system 1 in FIG. 3 improves the antenna gain as to both of the VHF band and the UHF band 10 dB or more as compared to the case of providing no inductor in the power transmission cable, and accordingly, sufficient antenna gain can be secured with a wide frequency band.

Advantages of Embodiment

As described above, with the present first embodiment, with an arrangement wherein the power transmission cable is used as an antenna, a high-frequency cutoff circuit is provided to each of the connector side end of the power transmission cable, and a portion separated from this connector by a predetermined length. Thus, according to the reception system 1 according to the present first embodiment, broadcast waves can be received with a sufficient wide frequency band and sufficient gain as compared to an existing system.

2. Second Embodiment

Figure 24:
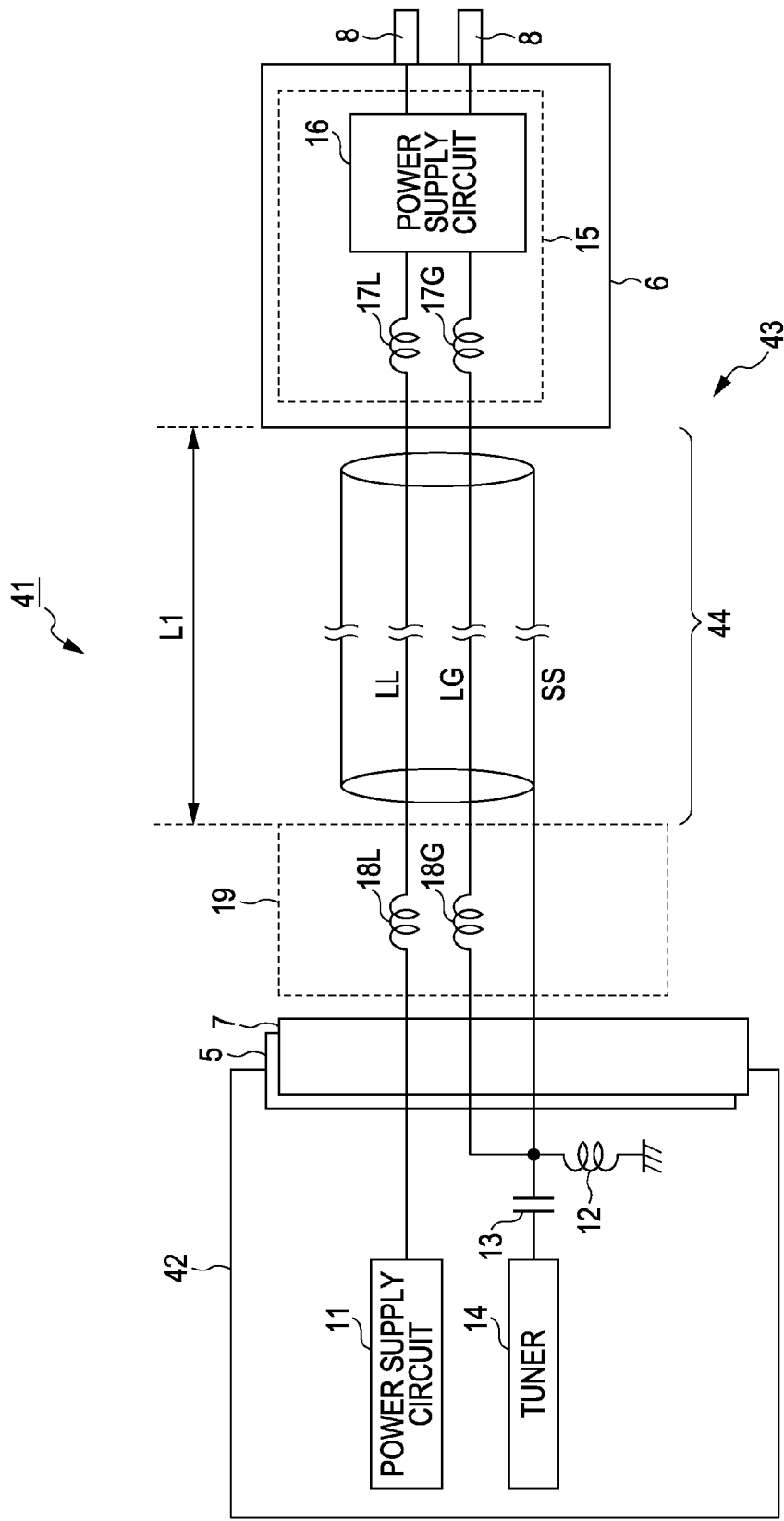
FIG. 24 is a diagram illustrating the configurations and connection relationship of the principal portions of the reception system according to a second embodiment in detail.
Figure 25:
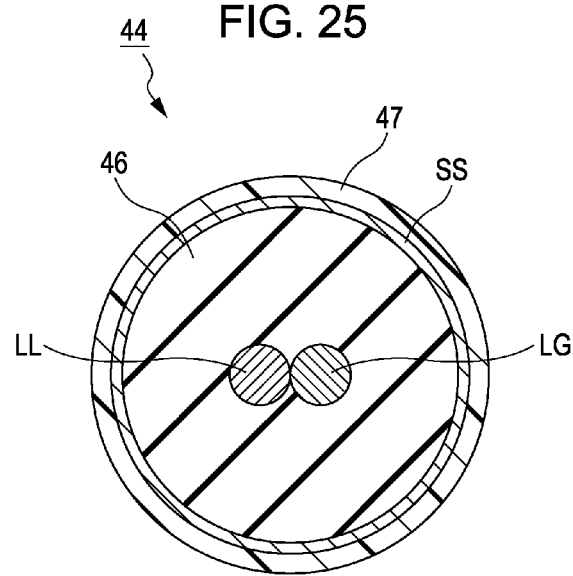
FIG. 25 is a schematic cross-sectional view illustrating a configuration example of a power transmission cable according to the present second embodiment.
Figure 26:
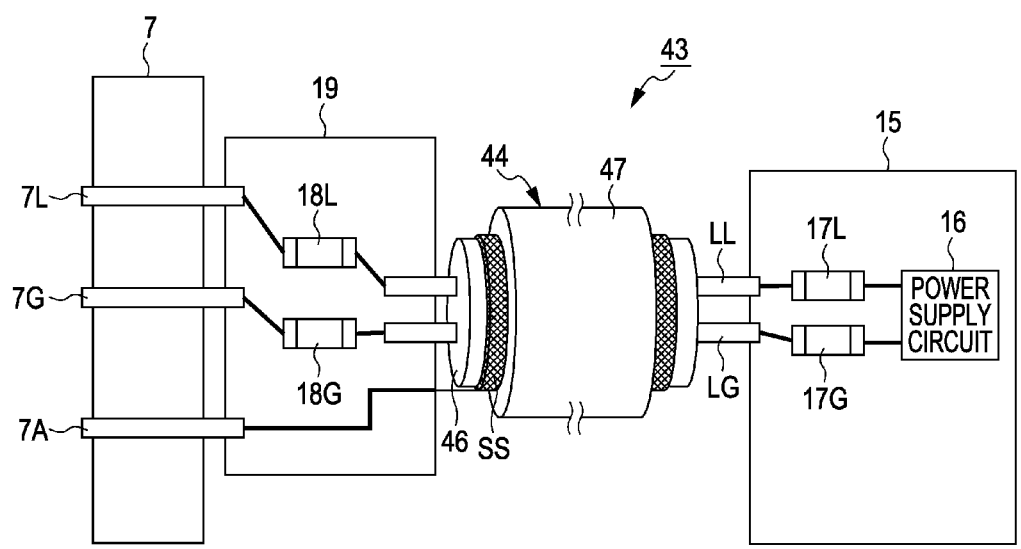
FIG. 26 is a diagram illustrating the power supply device in FIG. 24 in detail.
Figures 27A, 27B, 27C:
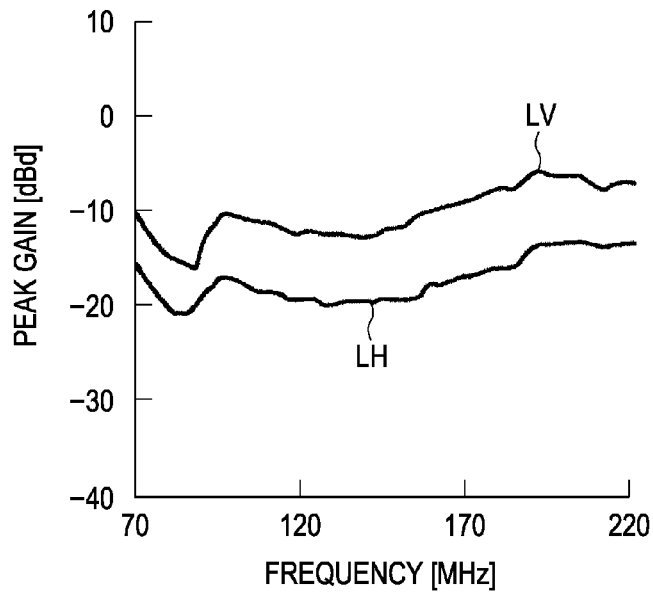
Figures 28A, 28B, 28C:
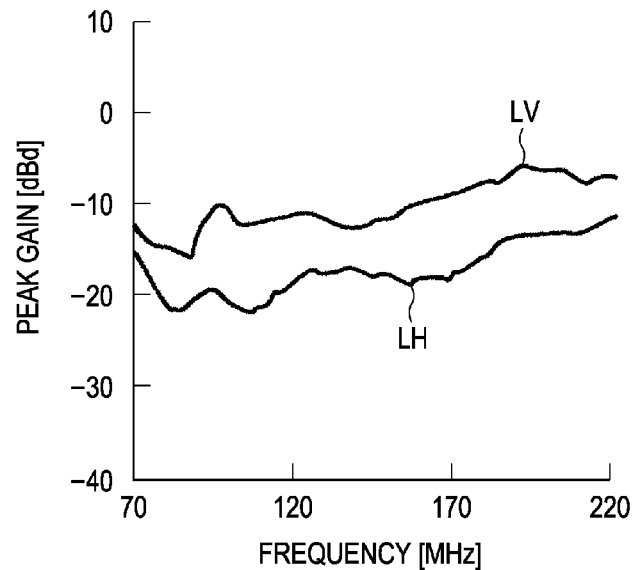
Figures 29A, 29B, 29C:
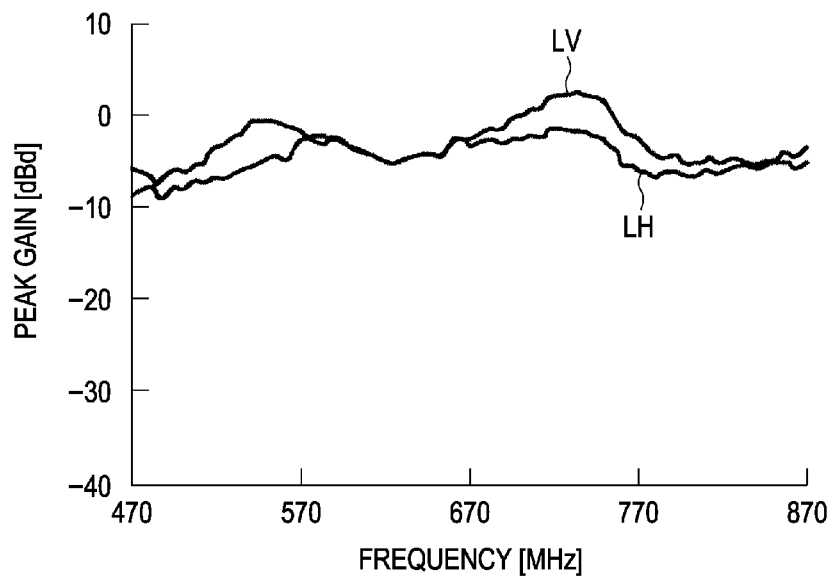
Figures 30A, 30B, 30C:
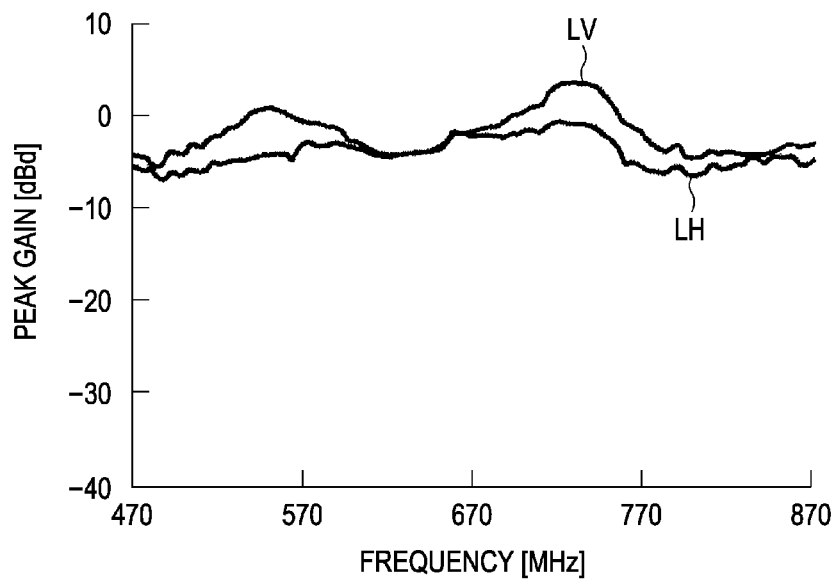
Figures 31A, 31B, 31C:
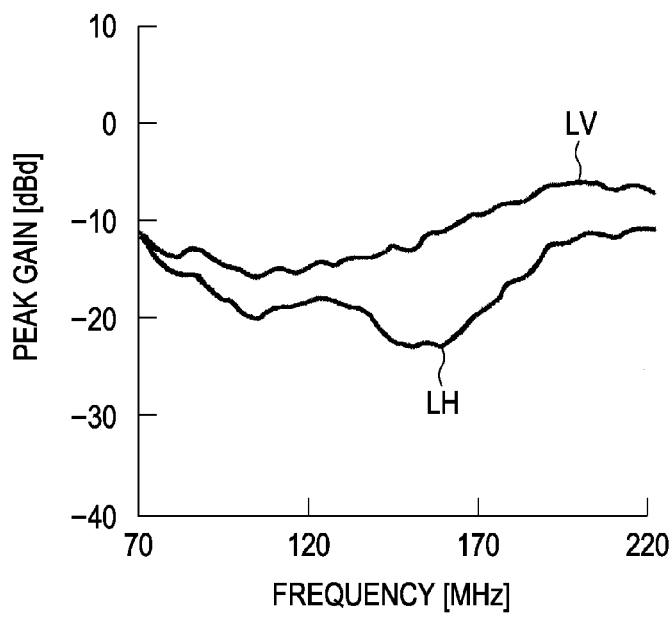
Figures 32A, 32B, 32C:
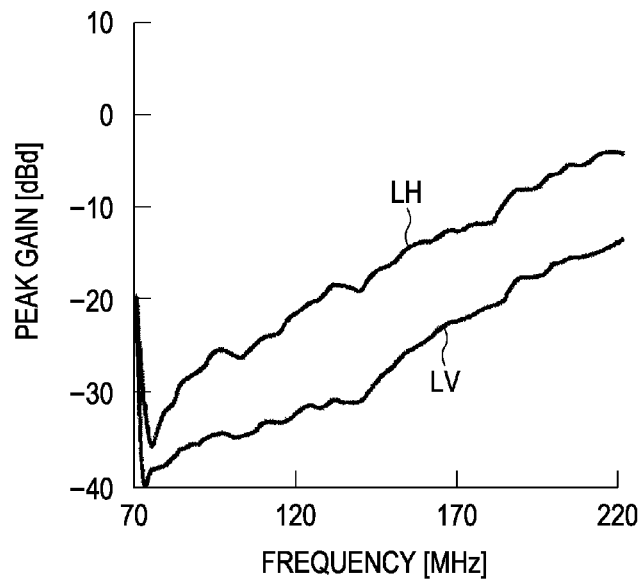
Figures 33A, 33B, 33C:
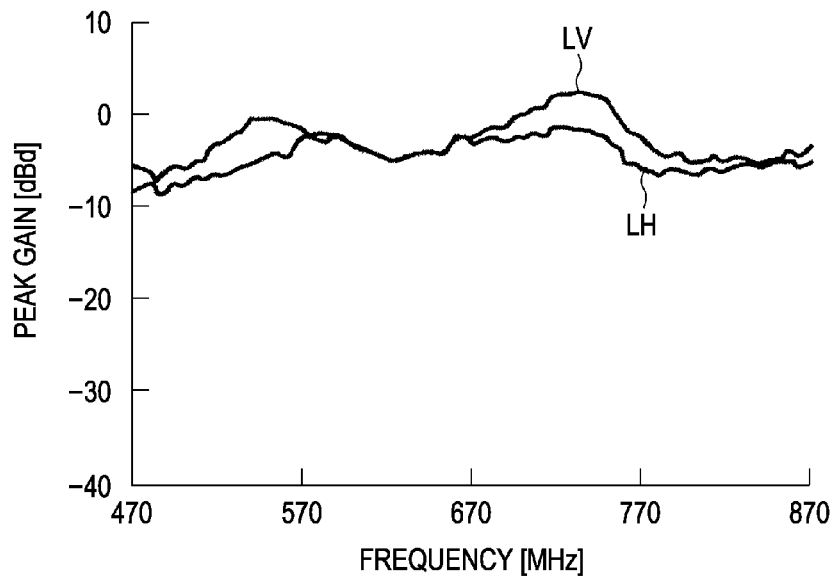
Figures 34A, 34B, 34C:
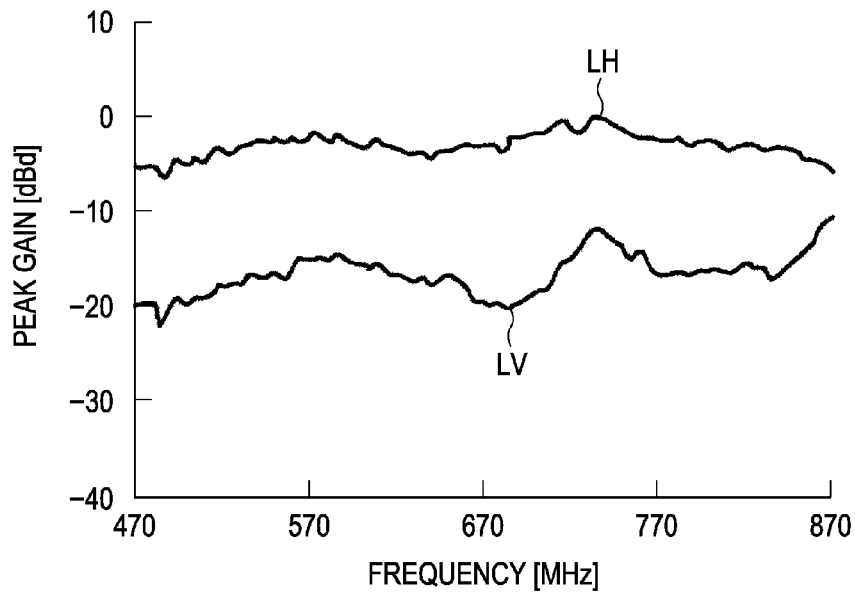

FIG. 24 is a diagram illustrating the configurations and connection relationship of the principal portions of the reception system according to a second embodiment of the present invention in detail in contrast with FIG. 3, FIG. 25 is a schematic cross-sectional view illustrating a configuration example of a power transmission cable according to the present second embodiment, and FIG. 26 is a diagram illustrating the power supply device in FIG. 24 in detail.

With this reception system 41, a cellular phone 42 and a power supply device 43 are applied instead of the cellular phone 2 and the power supply device 3. Note that, with the reception system 41 in FIG. 24, the same configurations as the reception system 1 are denoted with the corresponding reference numerals, and redundant description will be omitted.

Here, the cellular phone 42 is configured in the same way as the cellular phone 2 according to the first embodiment except that the power supply terminal on the cold side of the connector 5 is connected to a connection point between the inductor 12 and the capacitor 13, and is grounded via the inductor 12.

With the power supply device 43, a power transmission cable 44 is applied instead of the power transmission cable 4. The power supply device 43 is configured in the same way as the power supply device 3 according to the first embodiment except that the arrangement relating to the power transmission cable 44 differs.

Here, the power transmission cable 44 is, such as shown in FIG. 25 by taking the cross section thereof, formed of a so-called multi-core cable, and is fabricated by two core cables LL and LG being covered with a covered wire SS. Note that, with the power transmission cable 44, the core cables LL and LG are each fabricated by being covered with a twist wire including an aramid fiber, and are held integrally by being covered with an insulator 46 after being twisted. With the power transmission cable 44, the covered wire SS made up of a copper mesh wire is disposed so as to surround this insulator 46, and a sheath 47 is fabricated by the whole being covered with elastomer.

With the power supply device 43, the core cables LL and LG are assigned to the hot side power supply and the cold side power supply respectively. Accordingly, with the power supply device 43, such as shown in FIG. 26, the power supply unit 6 side ends of the core cables LL and LG are connected to the inductors 17L and 17G on the wiring board 15, and are connected to the power supply circuit 16 via the inductors 17L and 17G, respectively.

Also, the cellular phone 42 side ends of the core cables LL and LG are connected to the inductors 18L and 18G on the wiring board 19, and are connected to the power supply terminals 7L and 7G via the inductors 18L and 18G, respectively.

Also, with the power supply device 43, an antenna function is assigned to the covered wire SS, and the power supply unit 6 side end of the covered wire SS is not connected to any portion, and is set to a so-called open end.

Also, the cellular phone 42 side end of the covered wire SS is connected to an antenna input terminal 7A of the connector 7 on the wiring board 19.

With the power supply device 43, length L1 from the inductors 17L and 17G to the inductors 18L and 18G is set to the length of around ¾ wavelength as to the wavelength of a frequency of 190 MHz.

Thus, the reception system 41 in FIG. 24 controls the covered wire SS to serve as an antenna, and restricts the electric length of the core cables LL and LG to be combined with the covered wire in a high-frequency manner by the inductors 17L, 17G, 18L, and 18G.

FIGS. 27A through 27C and FIGS. 28A through 28C are diagrams illustrating the antenna properties of the VHF band with the reception system 41 in FIG. 24 regarding a case where no extension cord is connected, and a case where an extension cord is connected, respectively.

Also, FIGS. 29A through 29C and FIGS. 30A through 30C are diagrams illustrating the antenna properties of the UHF band with the reception system 41 in FIG. 24 regarding a case where no extension cord is connected, and a case where an extension cord is connected, respectively.

According to the measurement results of FIGS. 27A, 27B, and 27C through FIGS. 30A, 30B, and 30C, it can be found that the reception system 41 in FIG. 24 can secure sufficient gain with a wide frequency band by preventing deviations of antenna gain due to the extension cable sufficiently.

Also, it can be found that the reception system 41 in FIG. 24 can improve the antenna gain as compared to the reception system 1 according to the first embodiment with the UHF band by controlling the covered wire SS insulated from the core cables LL and LG to serve as an antenna.

Note that, with the power supply device 43, the power transmission cable 44 may be used by being bundled. In this case, there is a possibility that the antenna gain may decrease.

FIGS. 31A, 31B, and 31C through FIGS. 34A, 34B, and 34C are diagrams illustrating measurement results used for confirming the antenna gain in the case of the power transmission cable 44 being bundled.

FIGS. 31A through 31C and FIGS. 32A through 32C illustrate the measurement results of the VHF band in the case that the power transmission cable 44 is drooped vertically, and in the case that the power transmission cable 44 is bundled, respectively.

Also, FIGS. 33A through 33C and FIGS. 34A through 34C illustrate the measurement results of the UHF band in the case that the power transmission cable 44 is drooped vertically, and in the case that the power transmission cable 44 is bundled, respectively. Note that these are measurement results using the above evaluation board.

According to the measurement results of FIGS. 31A, 31B, and 31C through FIGS. 34A, 34B, and 34C, the following can be found. That is to say, with the reception system 41 according to the second embodiment, it can be found that, with the VHF band, deterioration in gain at a low frequency is marked by bundling the power transmission cable 44, but with the UHF band, even if the power transmission cable 44 is bundled, gain to be devoted sufficiently to practical use can be secured.

With the second embodiment, even in the case of using a multi-core coaxial cable as the power transmission cable, the same advantages as the first embodiment can be obtained.

3. Third Embodiment

Figure 35:
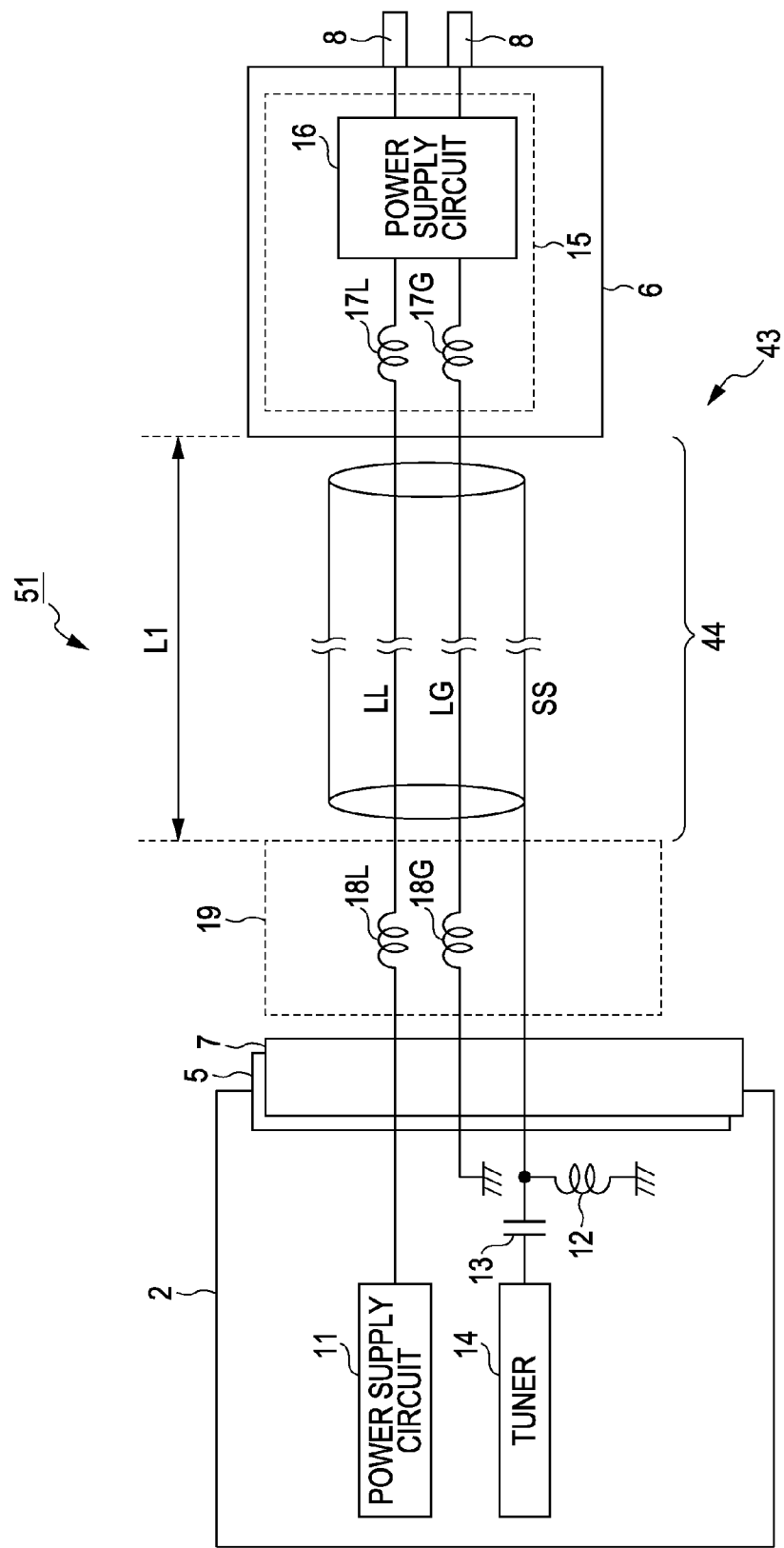
FIG. 35 is a diagram illustrating the configurations and connection relationship of the principal portions of the reception system according to a third embodiment in detail.

FIG. 35 is a diagram illustrating the configurations and connection relationship of the principal portions of the reception system according to a third embodiment of the present invention in detail in contrast with FIG. 24. The reception system 51 in FIG. 35 is configured in the same way as the reception system 41 according to the second embodiment except that the cellular phone 2 described in the first embodiment is applied instead of the cellular phone 42. Accordingly, with the reception system 51, the cold side core wire cable LG is physically separated from the covered wire SS, and is grounded within the cellular phone 2.

According to the third embodiment, the cold side core wire cable is physically separated from the covered wire, and is grounded, whereby isolation of a portion serving as an antenna can be improved markedly. Accordingly, the same advantages as the second embodiment can be obtained by reducing influence due to power supply noise or the like.

4. Fourth Embodiment

Figure 36:
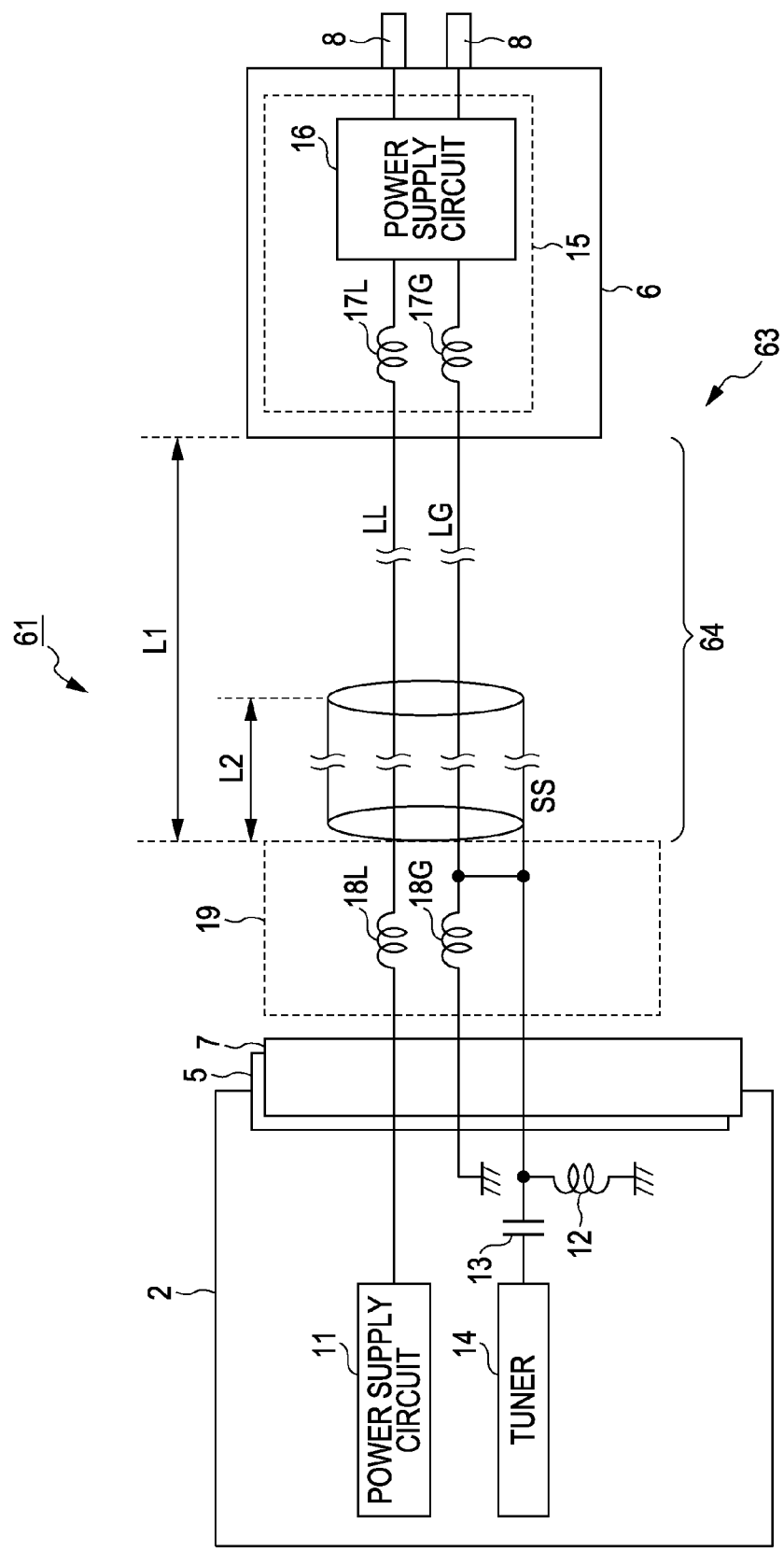
FIG. 36 is a diagram illustrating the configurations and connection relationship of the principal portions of the reception system according to a fourth embodiment in detail.

FIG. 36 is a diagram illustrating the configurations and connection relationship of the principal portions of the reception system according to a fourth embodiment of the present invention in detail in contrast with FIG. 35. The reception system 61 in FIG. 36 is configured in the same way as the reception system 51 according to the third embodiment except that a power supply device 63 is applied instead of the power supply device 43.

Here, the power supply device 63 is configured in the same way as the above power supply device 43 except that a power transmission cable 64 is applied instead of the power transmission cable 44, and the arrangement relating to this power transmission cable 64 differs.

Also, the power transmission cable 64 is configured in the same way as the power transmission cable 44 except that the arrangement relating to the covered wire SS differs.

With the power transmission cable 64, the covered wire SS is cut off at certain distance L2 from the connector 7, and is set to an open end. Also, the cold side core cable LG is connected to the covered wire SS on the wiring board 19. Thus, the power transmission cable 64 is configured so as to serve as an antenna of two cycles corresponding to each of the length L1 between the inductors 17L and 17G and the inductors 18L and 18G, and the length L2 of the covered wire SS.

With the present fourth embodiment, the antenna function according to the core cables LL and LG is supplemented with the antenna according to the covered wire SS, thereby preventing local decrease in antenna gain with the UHF band. Specifically, the length L2 of the covered wire SS is set so as to be odd multiple of ¼ wavelength as to a frequency wherein the UHF band is received by the core cables LL and LG alone, and the antenna gain is locally decreased, thereby preventing decrease in local antenna gain with the UHF band.

With the present fourth embodiment, the covered wire is configured so as to serve as an antenna of two cycles by being cut off partway, whereby the performance improves markedly, the same advantages as the above embodiments can be obtained.

5. Fifth Embodiment

Figure 37:
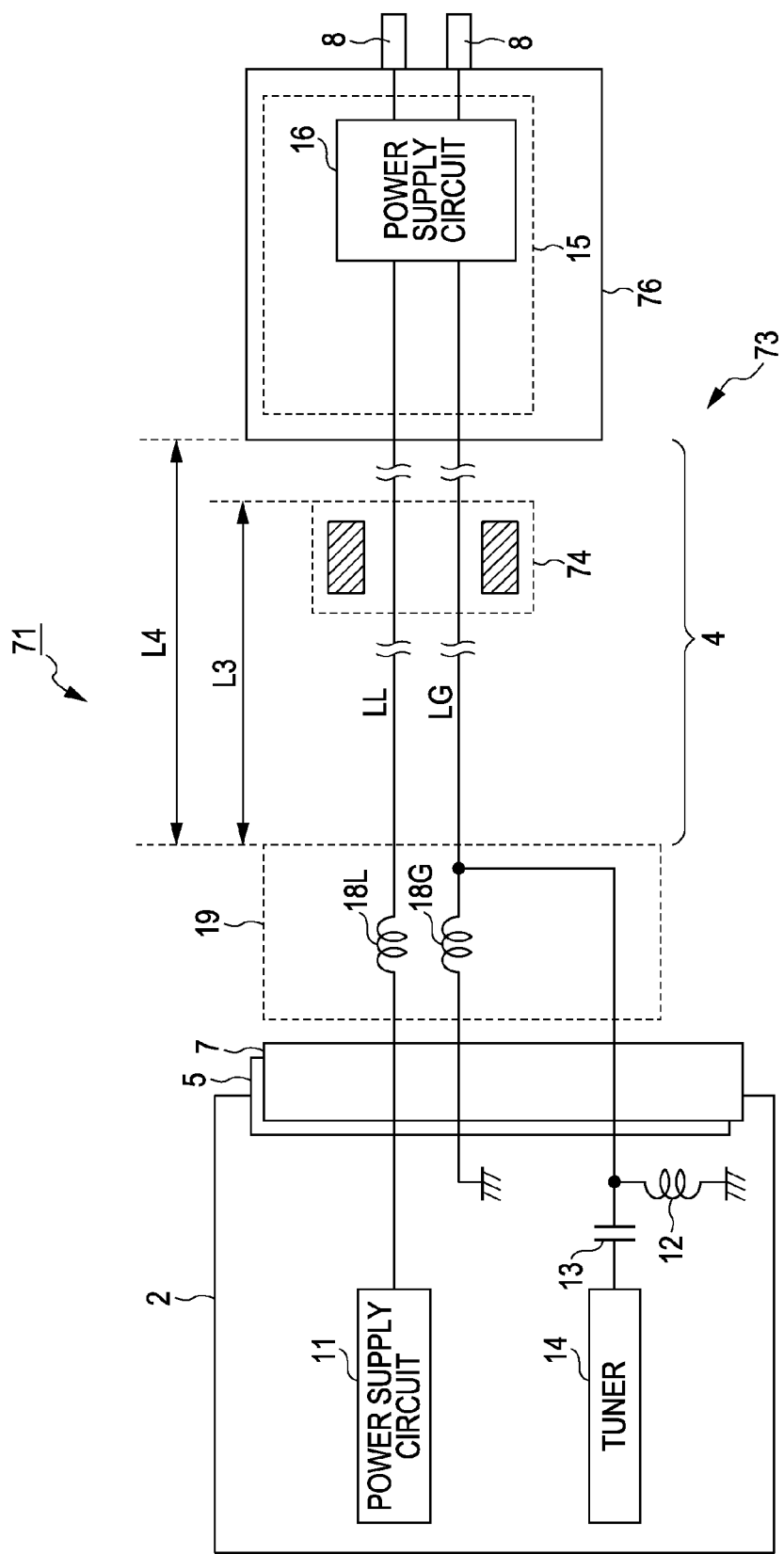
FIG. 37 is a diagram illustrating the configurations and connection relationship of the principal portions of the reception system according to a fifth embodiment in detail.

FIG. 37 is a diagram illustrating the configurations and connection relationship of the principal portions of the reception system according to a fifth embodiment of the present invention in detail in contrast with FIG. 3. The reception system 71 in FIG. 37 is configured in the same way as the reception system 1 according to the first embodiment except that a power supply device 73 is applied instead of the power supply device 3.

With the power supply device 73, a power supply unit 76 is configured by omitting the inductors 17L and 17G. Also, with the power supply device 73, a ferrite core 74 is disposed in the power transmission cable 4 instead of the inductors 17L and 17G, and an inductor is disposed in each of the transmission cables LL and LG by this ferrite core 74.

The power supply device 73 is configured in the same way as the power supply device 3 in FIG. 1 except that the arrangement relating to the inductors 17L and 17G differs. This ferrite core 74 is formed in a cylindrical shape.

Figure 38:
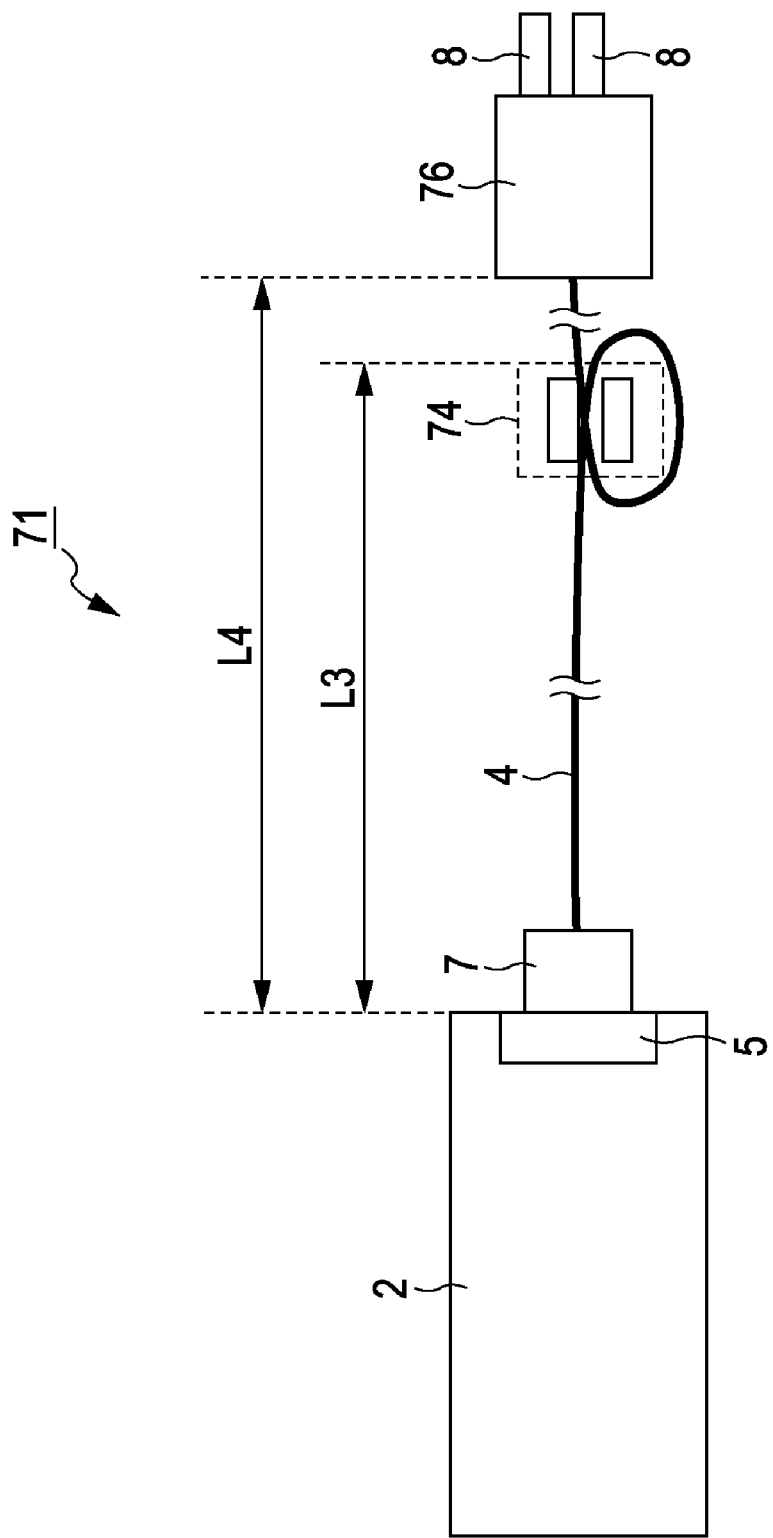
FIG. 38 is a diagram used for describing the layout of the ferrite core in FIG. 37.
Figures 39A, 39B, 39C:
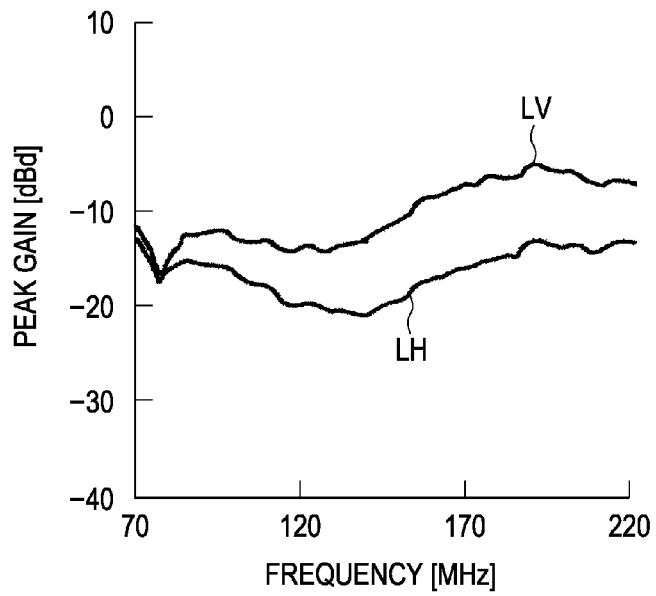
Figures 40A, 40B, 40C:
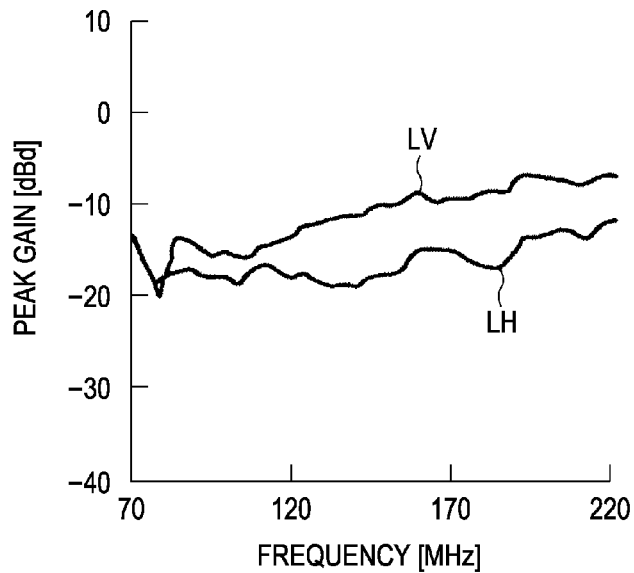
Figures 41A, 41B, 41C:
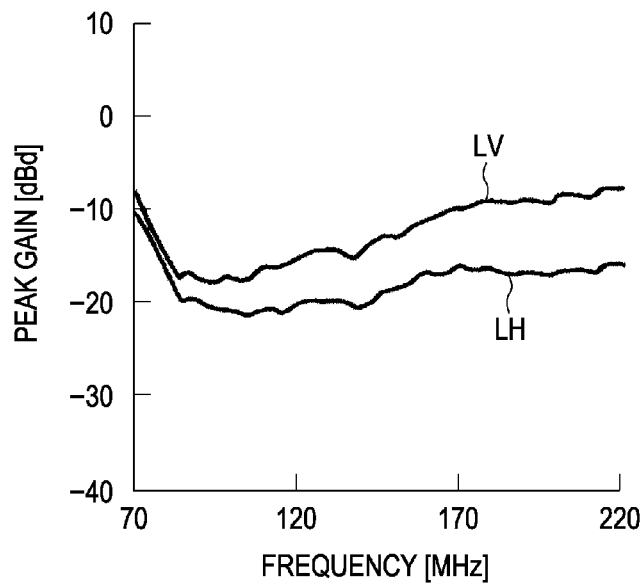
Figures 42A, 42B, 42C:
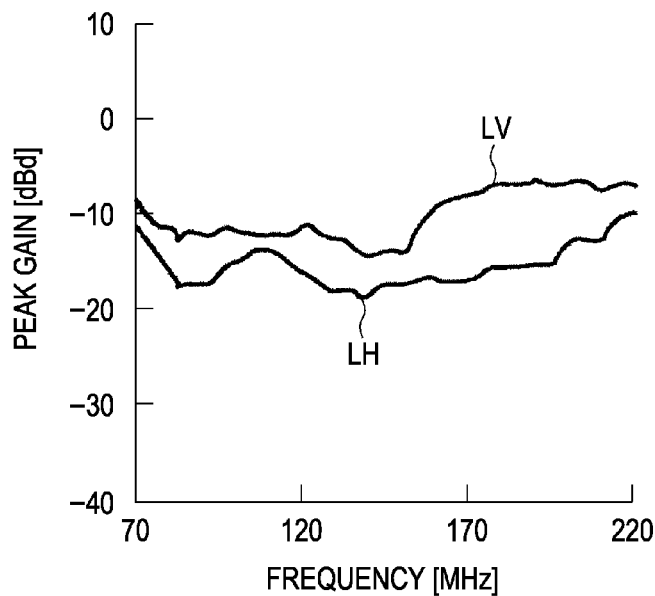

With the power supply device 73, such as shown in FIG. 38, the power transmission cable 4 is wound around the ferrite core 74 at a portion separated from the connector 7 by certain distance L3 once, and thus, the ferrite 74 is disposed. Note that the power transmission cable 4 may simply be inserted into the ferrite core 74 as appropriate.

FIGS. 39A through 39C and FIGS. 40A through 40C are diagrams illustrating the measurement results with the VHF band of the reception system 71 in FIG. 37 regarding a case where no extension cord is connected, and a case where an extension cord is connected, respectively. FIGS. 39A through 39C and FIGS. 40A through 40C are a case where the length of the power transmission cable 4 in this case is set to 1100 mm, and the ferrite core 74 is disposed on the power supply unit 76 side end.

Also, FIGS. 41A through 41C and FIGS. 42A through 42C are diagrams illustrating the measurement results with the VHF band of the reception system 71 in FIG. 37 regarding a case where no extension cord is connected, and a case where an extension cord is connected, respectively.

FIGS. 41A through 41C and FIGS. 42A through 42C are a case where the whole length L4 of the power transmission cable 4 in this case is set to 1600 mm, and distance L3 up to the portion where the ferrite core 74 is disposed is set to 1100 mm.

According to the measurement results of FIGS. 39A, 39B, and 39C through FIGS. 42A, 42B, and 42C, the following can be found.

That is to say, it can be found that even in the event that the inductors are disposed in the power transmission cable 4 by the ferrite core 74 instead of disposing an inductor as to each of the transmission cables LL and LG, sufficient antenna gain can be secured with a sufficiently wide frequency band.

According to the present fifth embodiment, even in the event that the inductors are disposed in the power transmission cable 4 by the ferrite core 74 instead of disposing an inductor as to each of the transmission cables LL and LG, the same advantages as the above embodiments can be obtained.

Also, the locating position of the ferrite core can be set variously as to the whole length of the power transmission cable, whereby ease of use can be improved by changing the length of the power transmission cable variously.

6. Sixth Embodiment

FIG. 43 is a diagram illustrating the configurations and connection relationship of the principal portions of the reception system according to a sixth embodiment of the present invention in detail in contrast with FIG. 35. With the reception system 81 in FIG. 43, the length of the power transmission cable 44 is set to a certain length L1, and the ferrite core 74 is disposed on the power supply unit 6 side end of the power transmission cable 44. Also, the core cables LL and LG are connected to the power supply circuit 16 via the inductors 17L and 17G.

Thus, the reception system 81 doubly prevents the entry of noise or a high-frequency signal on the power supply unit 6 side by the ferrite core 74 and the inductors 17L and 17G. Accordingly, influence of power supply noise of a frequency of 30 MHz or less can be reduced markedly.

With the present sixth embodiment, the ferrite core and the inductors are disposed on the power supply unit side, whereby the entry of noise or a high-frequency signal is prevented markedly, and the same advantages as the above embodiments can be obtained.

7. Seventh Embodiment

With the present seventh embodiment, the power generated at a power supply device is transmitted to a cellular phone via a relay cable. With the relay cable, connectors for connecting both ends of the power transmission cable and the connectors 5 and 7 are provided.

With the present seventh embodiment, the arrangement relating to the power transmission cable according to each of the above embodiments is applied to this relay cable, and thus, the relay cable is controlled to serve as an antenna.

According to the present seventh embodiment, even in the event that the power generated at a power supply device is transmitted to a cellular phone via a relay cable, the arrangement of each of the above embodiments is applied to this relay cable, and the relay cable is controlled to serve as an antenna, the same advantages as each of the above embodiments can be obtained.

8. Eighth Embodiment

With the present eighth embodiment, an amplifying circuit is disposed on the wiring board 19 provided to the connector 7, where a high-frequency signal induced at a portion serving as an antenna is amplified, and is output to a cellular phone. The present eighth embodiment is configured in the same way as the above embodiments except that the arrangement relating to this amplifying circuit differs.

With the present embodiment, a high-frequency signal is amplified at the amplifying circuit, whereby sensitivity is improved markedly, and the same advantages as each of the above embodiments can be obtained.

9. Ninth Embodiment

Figure 44:
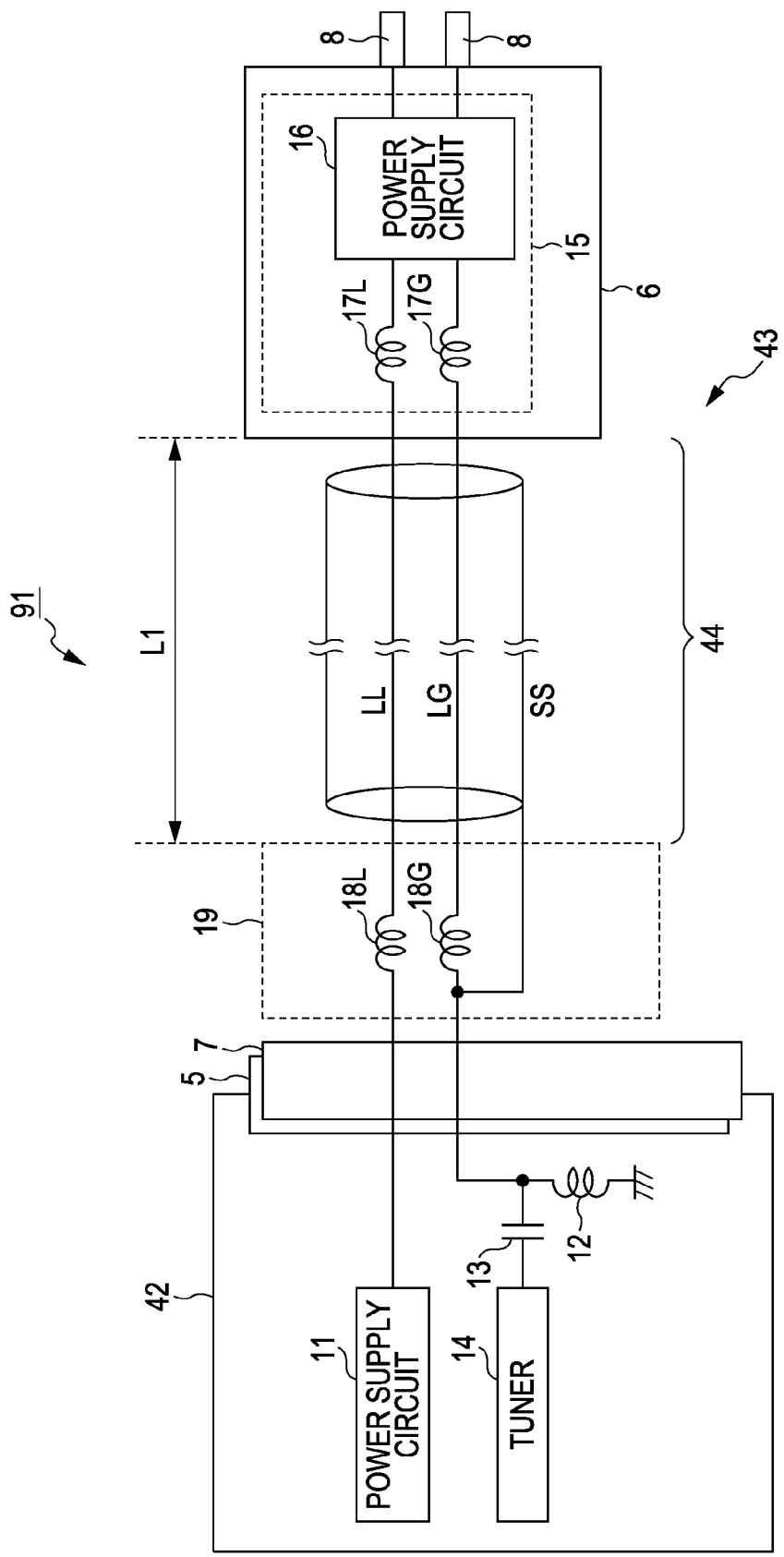
FIG. 44 is a diagram illustrating the configurations and connection relationship of the principal portions of the reception system according to a ninth embodiment in detail in contrast with FIG. 24.
Figure 45:
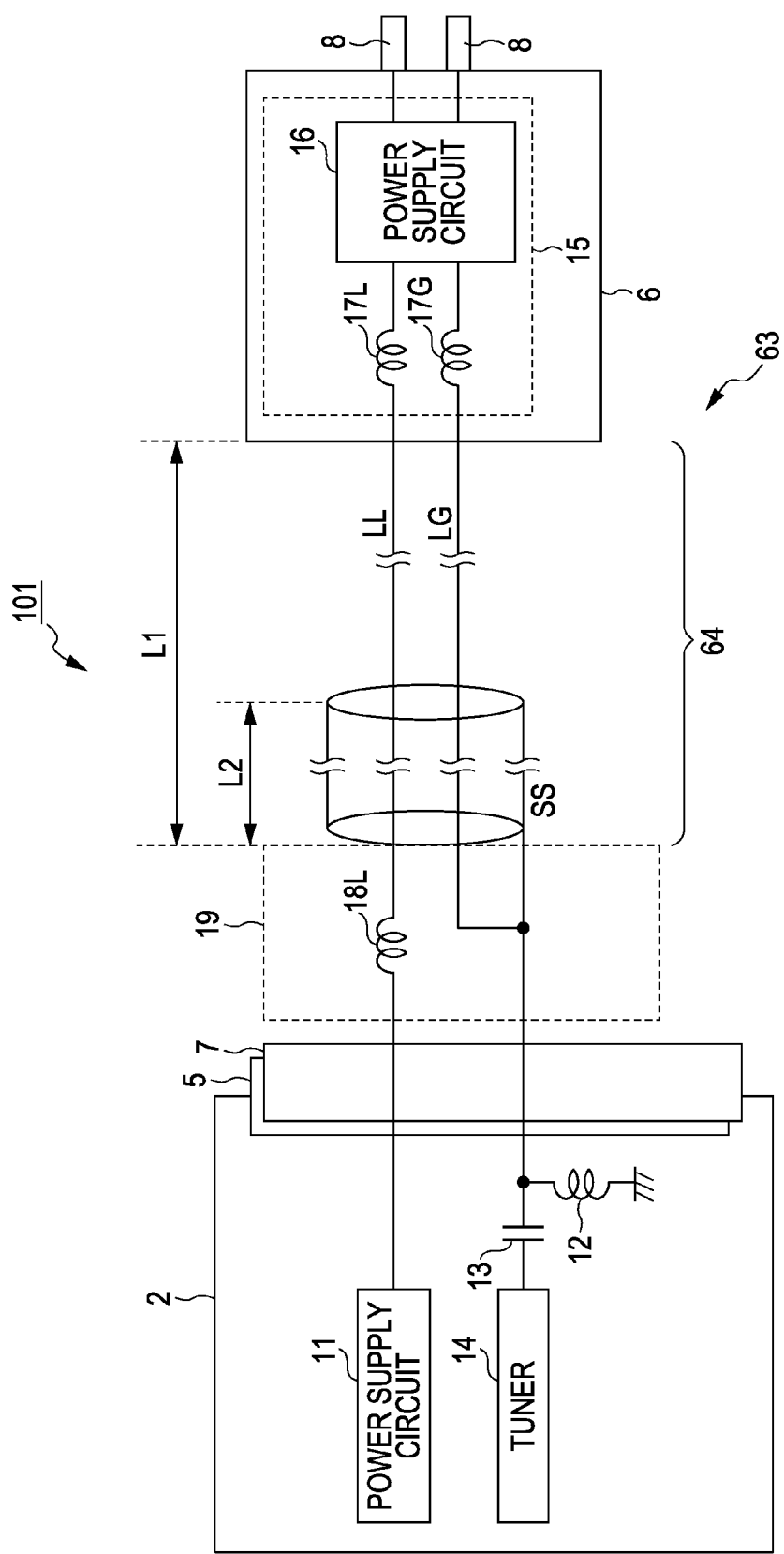
FIG. 45 is a diagram illustrating the configurations and connection relationship of the principal portions of the reception system according to the ninth embodiment in detail in contrast with FIG. 36.

With each of the above embodiments, description has been made regarding the case where a portion serving as an antenna is connected to the tuner via the antenna terminal of the connector. However, the present invention is not restricted to this, and for example, such as shown in FIGS. 44 and 45 in contrast with FIGS. 24 and 36, a portion serving as an antenna may be connected to the tuner via the power supply terminal.

Also, with the above embodiments, description has been made regarding the case where a portion serving as an antenna is set to the length of ¾ wavelength or ¼ wavelength as to the wavelength of the reception frequency. However, the present invention is not restricted to this, the length of odd multiple of ¼ wavelength as to the length of the reception frequency of the reception system may be set variously.

Also, with the above fifth embodiment, description has been made regarding the case where the cable of the power supply device is made up of a multi-core cable, but the present invention is not restricted to this, and may widely be applied to a case where the cable of the power supply device is made up of a multi-core coaxial cable.

Also, with the above sixth embodiment, description has been made regarding the case where the cable of the power supply device is made up of a multi-core coaxial cable, but the present invention is not restricted to this, and may widely be applied to a case where the cable of the power supply device is made up of a multi-core cable.

Also, with the above embodiments, the arrangement of the corresponding suitable reception system has been described, but the present invention is not restricted to this arrangement, and a reception system may be configured by combining the above arrangements as appropriate.

Also, with the above embodiments, description has been made regarding the case where the cable of the power supply device which generates power for charging is used as an antenna. However, the present invention is not restricted to this, may widely be applied to a case where an antenna is made up of a power cable to be connected to the mainframe, such as a power cord for transmitting commercial power supply to the mainframe, or the like.

Also, with the above embodiments, description has been made regarding the case where the present invention is applied to the cellular phone, but the present invention is not restricted to this, and may widely be applied to various types of portable devices having a reception function such as a case where the present invention is applied to a portable music player having a reception function.

With the above first through ninth embodiments, description has been made regarding the case where, as electronic equipment to which the power supply device, power cable, and reception device are applied, a cellular phone capable of receiving digital television broadcasting is used, for example.

With the first through ninth embodiments, with an arrangement wherein the power transmission cable is used as an antenna, a high-frequency cutoff circuit is disposed in each of the connector side end of the power transmission cable, and a portion separated from this connector by a predetermined length. Thus, with the first through ninth embodiments, the reception systems have been realized wherein broadcast waves can be received with a sufficiently wide frequency band as compared to an existing system, and sufficient gain.

Description will be made below regarding an embodiment wherein the power supply device, power cable, and reception device have been applied to electronic equipment other than cellular phones, e.g., a digital television receiver.

With the embodiment described below, let us say that the elements of a dipole antenna are formed using the power transmission cable, which can be connected to a connector for antennas of a television receiver via a coaxial cable or the like. Thus, portability relating to the antenna improves as compared to an existing system, and broadcast waves can be received with a wide frequency band and sufficient gain.

Figure 46:
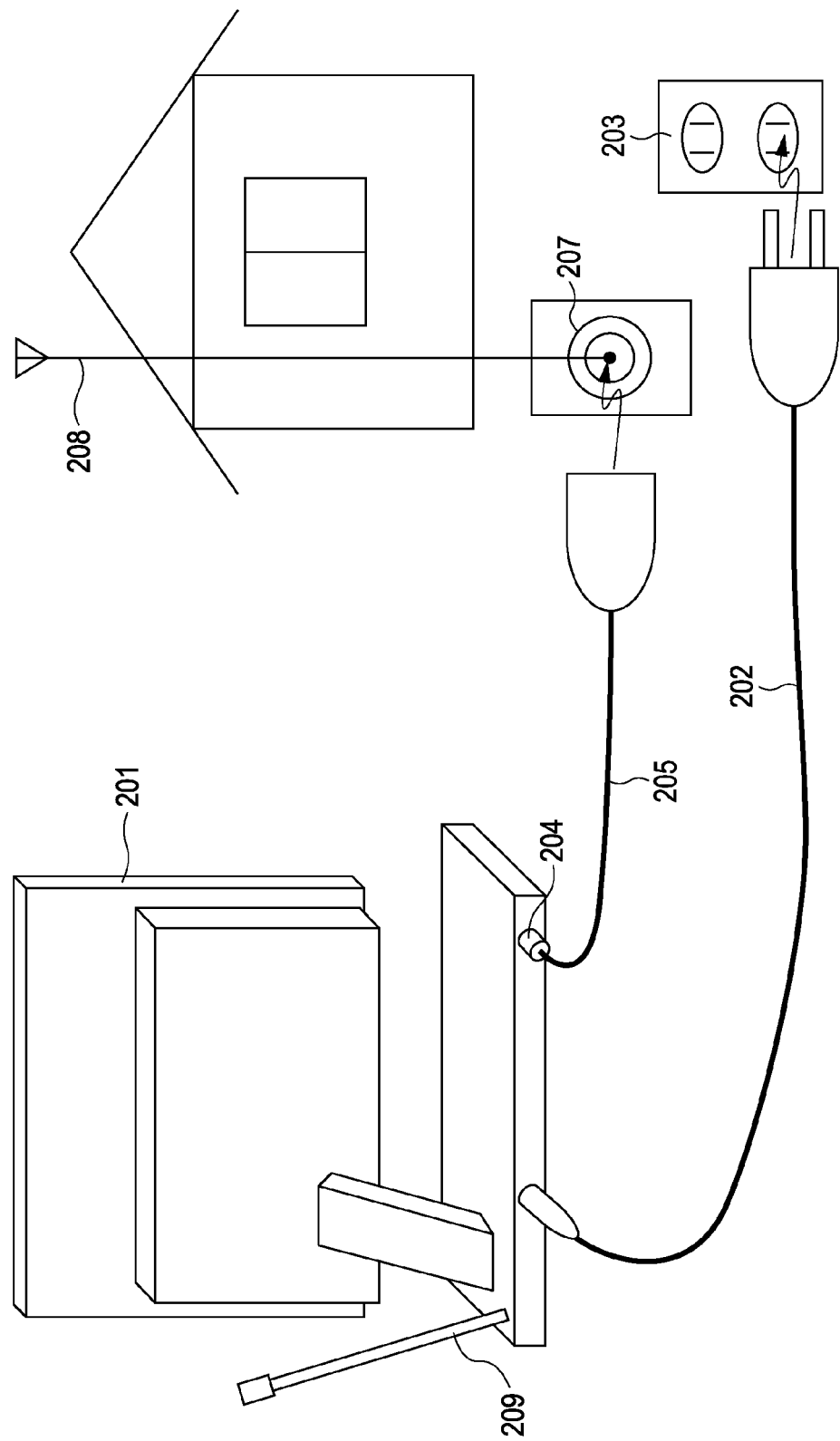
FIG. 46 is a diagram illustrating a common television receiver as viewed from the back side.

FIG. 46 is a view illustrating a common television receiver as viewed from the back thereof. A television receiver 201 inputs, as shown in FIG. 46 as viewed from the back, the power from commercial power supply by a power cable 202 which is extended from the back being connected to a home power outlet 203.

Also, with the television receiver 201, a connector for antennas 204 is provided to the back, and this connector for antennas 204 is connected to an outdoor antenna 208 via a home antenna power outlet 207 using a coaxial cable 205 to receive broadcast waves. Note that a reception antenna 209 made up of a rod antenna may be provided to the television receiver 201.

Incidentally, the television receiver 201 is carried and used at various places due to reduction in size, and reduction in weight. For example, there is a case where the television receiver 201 is used at a place where the home antenna power outlet 207 for antenna connection is not provided, such as a kitchen or the like.

In this case, the coaxial cable has to be extended from a room where a home antenna power outlet is provided, and connected to the television receiver 201. Also, even in the event that the television receiver 201 is used within a room where a home antenna power outlet is provided, the coaxial cable has to be drawn around to be connected to the television receiver 201 again. As a result thereof, with the television receiver, portability relating to the antenna may suffer regardless of improvement in portability due to reduction in size, and reduction in weight.

Also, with a notebook-type PC or the like having a reception function of television broadcasting, portability relating to the antenna may suffer in the same way as the case of receiving television broadcasting.

Therefore, with the following embodiments, to handle such a situation, a power cable (power cord) is configured so as to serve as a dipole antenna, and broadcast waves are received with this power cable.

10. Tenth Embodiment

Arrangement of Embodiment

Figure 47:
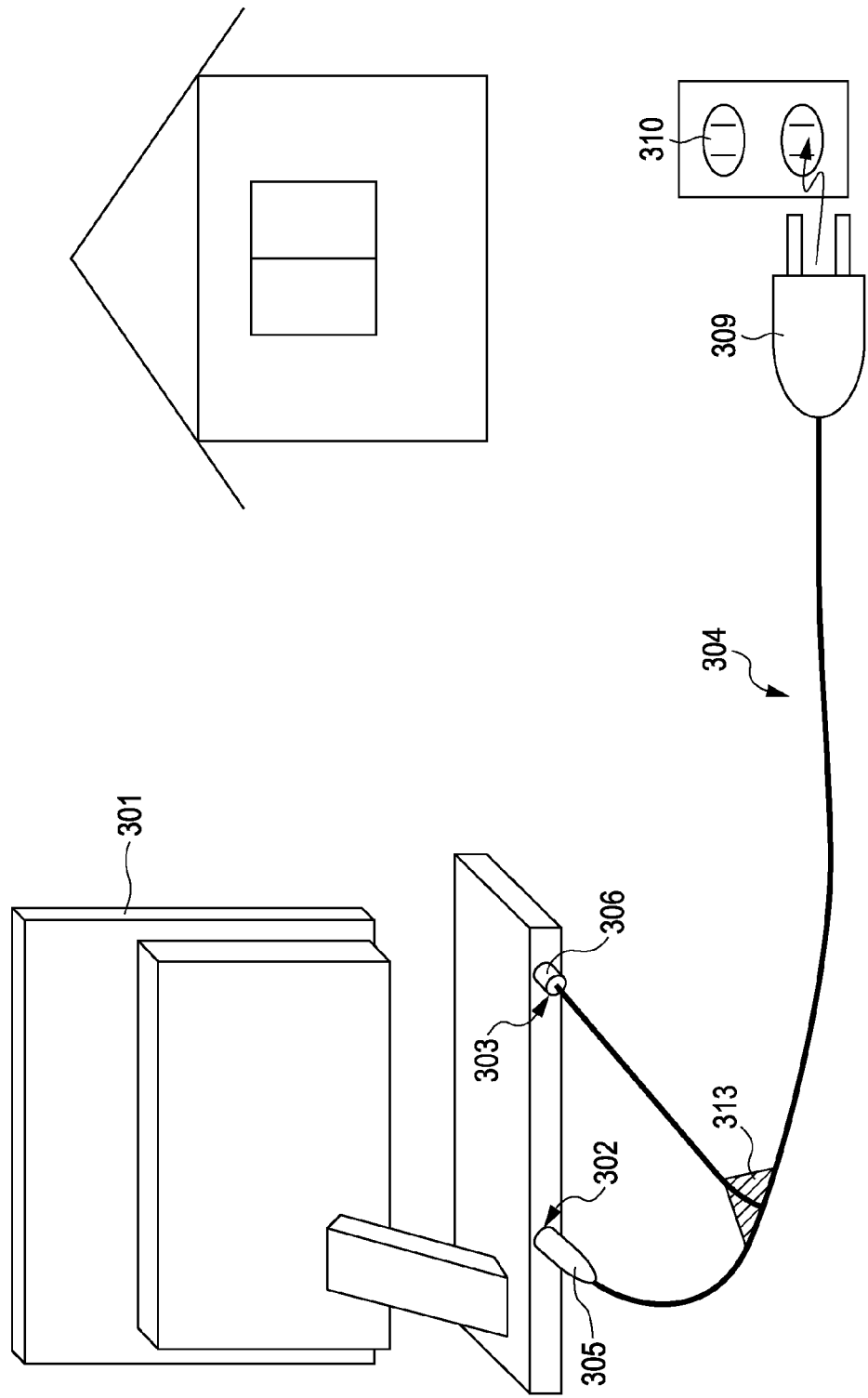
FIG. 47 is a diagram illustrating a reception device including a television receiver and a power supply device serving as electronic equipment according to a tenth embodiment of the present invention as viewed from the back side.

FIG. 47 is a diagram illustrating a reception device including a television receiver and a power cable serving as electronic equipment according to a tenth embodiment of the present invention as viewed from the back.

With this television receiver 301, a power outlet 302 and a connector for antennas 303 are provided to the back. With the television receiver 301, the power cable 304 is connected to the power plug 302 and the connector for antennas 303, commercial power supply is input by connecting to commercial power supply via this power cable 304, and also broadcast waves are received at this power cable 304.

The power cable 304 is a cable which branches to two forks on the television receiver 301 side, and a power supply jack 305 is disposed on the tip on one side branched to two forks. Also, a high-frequency connector 306 is disposed on the tip on the other side branched to two forks. Also, a plug 309 is disposed on the opposite side end of the television receiver 301 side, and this plug is connected to a home power outlet 310. The power cable 304 is connected to the television receiver 301 by the power supply jack 305 and the high-frequency connector 306 being connected to the power plug 302 and the connector for antennas 303 respectively.

Figure 48:
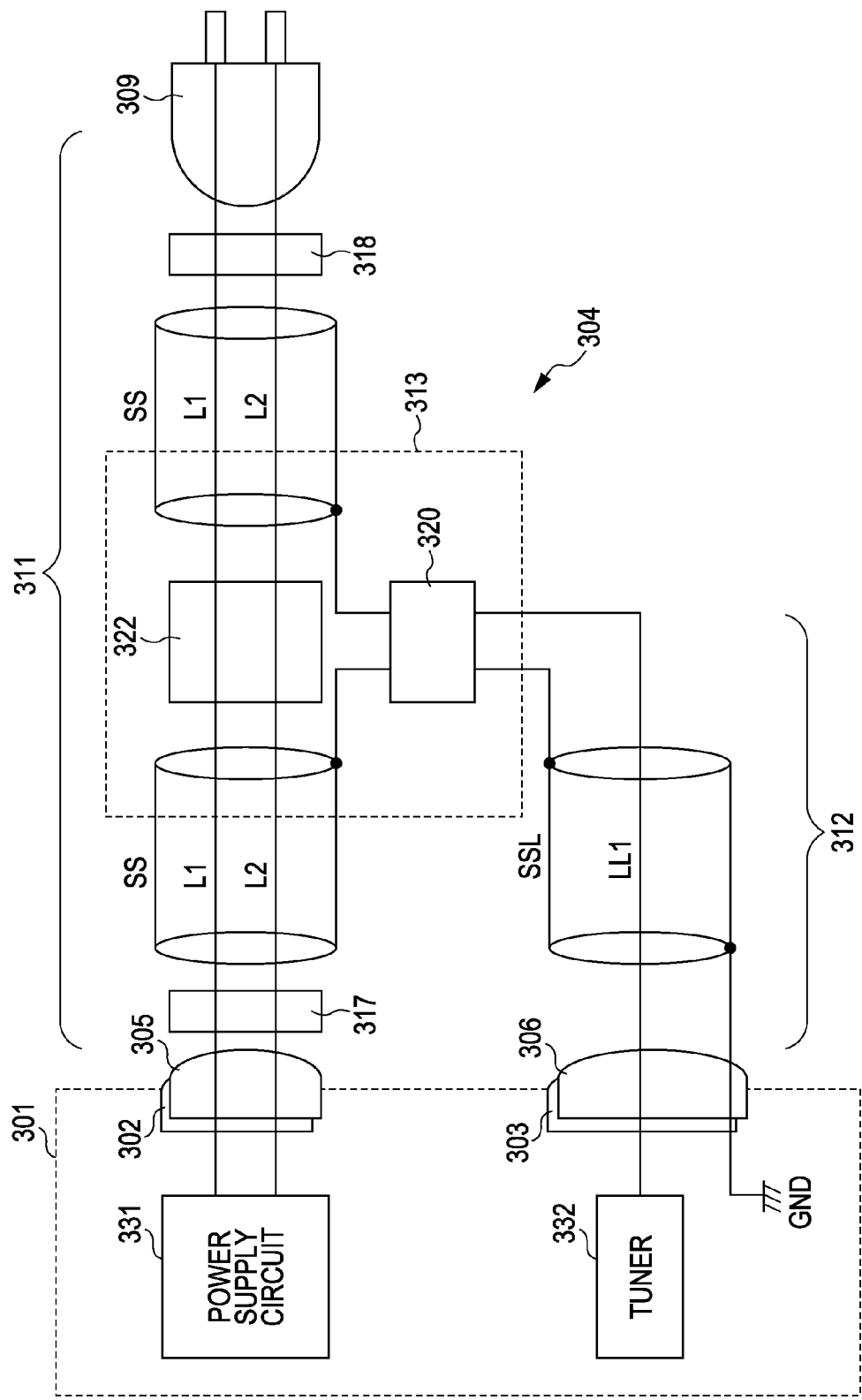
FIG. 48 is a diagram illustrating the configurations and connection relationship of the principal portions of the television receiver and power cable according to the present tenth embodiment in detail.

FIG. 48 is a diagram illustrating the configurations and connection relationship of the principal portions of the television receiver and power cable according to the tenth embodiment of the present invention in detail.

The power cable 304 is fabricated by connecting a signal transmission cable 312 partway along a power transmission cable 311. Hereafter, a portion where the signal transmission cable 312 is connected to the power transmission cable 311 will be referred to as a relay portion, and denoted with reference numeral 313.

Figure 49:
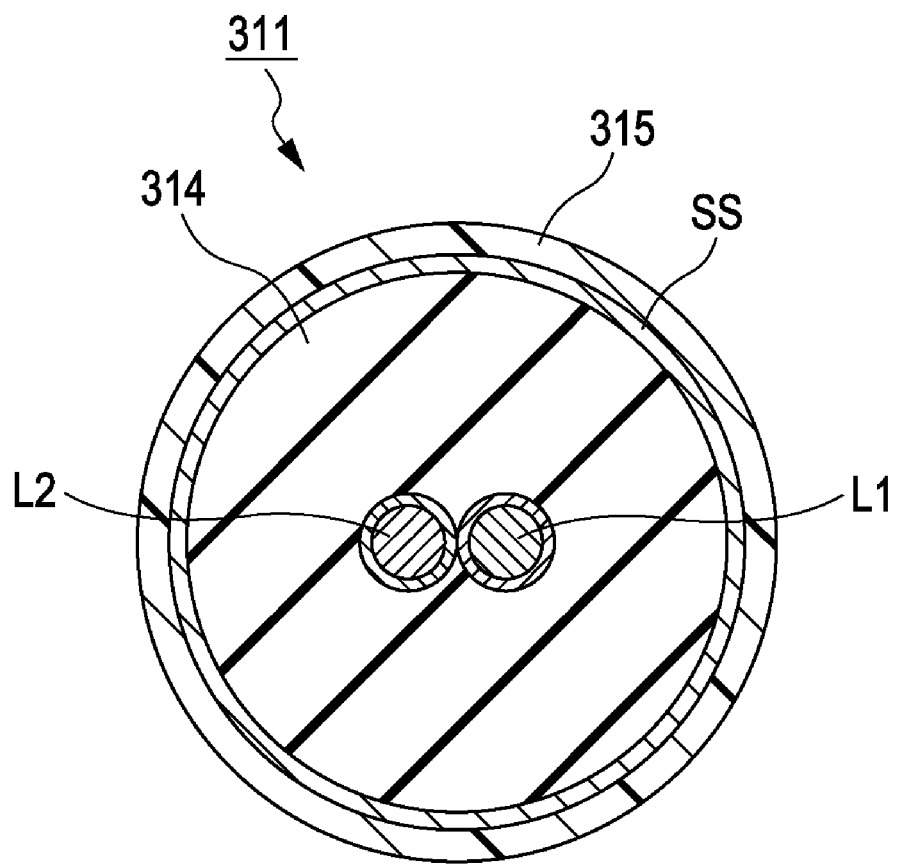
FIG. 49 is a schematic cross-sectional view illustrating a configuration example of the power transmission cable in FIG. 48.

FIG. 49 is a schematic cross-sectional view illustrating a configuration example of the power transmission cable in FIG. 48 according to the present tenth embodiment.

The power transmission cable 311 is, such as shown in FIG. 49 by taking a cross section thereof, a so-called multi-core coaxial cable, and is fabricated by covering two core wire cables L1 and L2 with a covered wire SS. With the power transmission cable 311, the core wire cables L1 and L2 are each fabricated by being covered with a twist wire including an aramid fiber, and are held integrally by being covered with an insulator 314. The covered wire SS made up of a copper mesh wire is disposed so as to surround this insulator 314, and a sheath 315 is fabricated by the whole being covered with elastomer. The core wire cables L1 and L2 are assigned to transmission of commercial power, and are each connected the corresponding terminals of the power supply jack 305 and the plug 309. A portion where the covered wire SS is not disposed locally is formed on the power supply jack 305 side end and the plug 309 side end. In the portions where the covered wire SS is not disposed, ferrite cores 317 and 318 are disposed, and inductors for suppressing the high-frequency signals of the wire core cables L1 and L2 are provided.

The ferrite cores 317 and 318 are formed in a cylindrical shape, and are disposed by the power transmission cable 311 being inserted into or being wound around the ferrite cores 317 and 318. With the power transmission cable 311, a relay portion 313 is disposed between the ferrite cores 317 and 318.

With the power transmission cable 311, a portion where the covered wire SS is not disposed locally is formed on the relay portion. Accordingly, with the power transmission cable 311, the covered wire SS is divided into a portion from the ferrite core 317 to the relay portion 313, and a portion from the ferrite core 318 to the relay portion 313.

With the power cable 304, the elements of a dipole antenna which receive broadcast waves are configured of the covered wire SS from the ferrite core 317 to the relay portion 313, and the covered wire SS from the ferrite core 318 to the relay portion 313.

With the power transmission cable 311, the ferrite core 317 side end and the ferrite core 318 side end of each portion of the covered wire SS are each set to an open end not to be connected to any portion. Also, with the power transmission cable 311, the relay portion 313 side end of each portion of the covered wire SS is connected to the signal transmission cable 312 via a balun 320.

Here, the balun 320 has a balance/unbalance signal conversion function of which the conversion ratio is 1:1.

Note that the signal transmission cable 312 is formed of a coaxial cable, and a high-frequency connector 306 is disposed on one end thereof.

More specifically, with the power transmission cable 311, the covered wire SS on the power supply jack 305 side and the covered wire SS on the plug 309 side are connected to a covered wire SSL and a core wire LL1 of the signal transmission cable 312 via the balun 320, respectively. A ferrite core 322 is disposed between the covered wire SS on the power supply jack 305 side and the covered wire SS on the plug 309 side as well as the ferrite cores 317 and 318, and the inductors for suppressing the high-frequency signals of the core wire cables L1 and L2 are disposed. The core wire cables L1 and L2 are separated into a portion on the power supply jack 305 side and a portion on the plug 309 side in a high-frequency manner by the ferrite core 322.

Note that, in FIG. 48, reference numeral 331 denotes a power supply circuit which generates power supply for operation of the television receiver 1 from commercial power supply, and reference numeral 332 denotes a tuner which receives broadcast waves.

FIG. 50 is a diagram illustrating a configuration example of the relay portion 313 (branch portion) according to the present tenth embodiment, and FIG. 51 is a diagram for describing the length of a portion serving as an antenna.

With the relay portion 313, the balun 320 is mounted on a wiring board 324, the covered wire SS on the power supply jack 305 side and the covered wire SS on the plug 309 side are connected to the balun 320 on the wiring board 324. Also, the signal transmission cable 312 is connected to the balun 320 on the wiring board 324. Subsequently, the whole of the relay portion 313 is subjected to molding with a resin such as shown in a dashed line.

As shown in FIG. 51, with the power transmission cable 311, the relay portion 313 is disposed in a position biased toward the television receiver 301 side from the center of the power transmission cable 311.

As a result thereof, with the power transmission cable 311, the covered wire SS on the power supply jack 305 side is set to, for example, the length of ¼ wavelength as to the wavelength of the center frequency of the VHF band.

On the other hand, the covered wire SS on the plug 309 side is set so as to be longer than the covered wire SS on the power supply jack 305 side. More specifically, with the present tenth embodiment, the covered wire SS on the power supply jack 305 side is set to a length of 150 mm, and the covered wire SS on the plug 309 side is set to a length of 1000 mm. Note that the whole length of the power cable (power cord) is 1200 mm.

Operation of Tenth Embodiment

With the above arrangement, with the television receiver 301 (FIG. 47), the power cable 304 is connected to the power supply plug 302 provided to the back, and this power cable 304 is inserted into a commercial power supply power outlet. Thus, the television receiver 301 is operated by the commercial power supply supplied via the power cable 304. Also, with the television receiver 301, the connector for antennas 303 is provided to the back, a coaxial cable is connected to this connector for antennas 303 to connect to an outdoor antenna, whereby a desired channel can be received by receiving broadcast waves.

However, as described above, in the case that the television receiver 301 is moved and used at a place where no home antenna power outlet is provided, for example, such as a kitchen or the like, the following work has to be performed. That is to say, the coaxial cable has to be extended from a room where a home antenna power outlet is provided, and connected to the connector for antennas 303. Also, even in the case that the television receiver 301 is used within a room where a home antenna power outlet is provided, the coaxial cable has to be drawn around and connected thereto again. As a result thereof, with the television receiver 301, portability relating to the antenna is markedly restricted regardless of improvement in portability due to reduction in size, and reduction in weight.

Now, an arrangement can be conceived to receive broadcast waves with a built-in antenna. However, in the case of a built-in antenna, the size of the device increases by an amount equivalent to the size of the built-in antenna to be included, and consequently, portability is restricted. Also, constraint on design occurs, and accordingly, design is complicated.

On the other hand, it can also be conceived to apply an arrangement wherein a power cable is used as an antenna. Note however, this case has a disadvantage in that sufficient gain with a sufficient wide frequency band is not readily secured. That is to say, the arrangement disclosed in Japanese Unexamined Patent Application Publication No. 2002-151932 and Japanese Patent No. 4105078 is applied, and for example, in the case of receiving the VHF band, the length of the cable for antennas has to be set to 1 m or more.

However, in this case, a null point of antenna gain occurs at frequencies of 470 through 770 MHz that are the UHF band. Conversely, upon the length of the cable for antennas being set to a length suitable for the UHF band, antenna gain runs short with the VHF band. Accordingly, consequently, sufficient gain is not readily secured with a sufficient wide frequency band.

Also, in the case of the arrangement disclosed in Japanese Unexamined Patent Application Publication No. 2005-341067, the power cable on the side where an LC resonance circuit is provided, and the power cable on the side where no LC resonance circuit is provided are combined in a high-frequency manner, and consequently, the LC resonance circuit does not exhibit the function thereof sufficiently. Also, upon the frequency keeping away from the resonance frequency, the LC resonance circuit itself has difficulty in exhibiting the function thereof. Accordingly, consequently, sufficient gain is not readily secured with a sufficient wide frequency band.

Therefore, with the present tenth embodiment, the power cable 304 is configured so as to serve as a dipole antenna, and broadcast waves are received at this power cable 304. That is to say, with the power cable 304, such as shown in FIG. 48, commercial power is transmitted by the core wire cables L1 and L2.

The covered wire SS which covers the core wire cables L1 and L2 is separated into a portion on the television receiver 301 side, and a portion on the plug 309 side at the relay portion 313, and the elements of a dipole antenna is made up of the covered wire SS.

Also, each element is connected to the tuner 332 of the television receiver 301 via the signal transmission cable 312. As a result thereof, with the present tenth embodiment, broadcast waves can be received by arranging the power cable 304 so as to serve as a dipole antenna, and broadcast waves can be received with a wide frequency band and sufficient gain as compared to an existing technique.

Further, with the power cable 304, the ferrite cores 317 and 318 are disposed on the television receiver 301 side end and the plug 309 side end of the covered wire SS, respectively. The electric lengths of the core wire cables L1 and L2 to be combined with the covered wire SS are restricted by the ferrite cores 317 and 318 in a high-frequency manner.

As a result thereof, with the power cable 304, deviation of antenna gain due to the internal wiring and indoor wiring of the television receiver 301 can be avoided effectively, and broadcast waves can be received in a stable manner. Also, contamination of noise from commercial power supply can be prevented, and influence of the internal noise of the television receiver 301 can be avoided, and thus, broadcast waves can be received in a stable manner.

Further, with the power cable 304, the ferrite core 322 is disposed in the relay portion 313, and according to this ferrite core 332, the core wire cables L1 and L2 are separated into a portion on the television receiver 301 side and a portion on the plug 309 side in a high-frequency manner.

As a result thereof, with the power cable 304, deterioration in antenna gain can be prevented by preventing antiresonance due to higher harmonic of even multiples, and thus, broadcast waves can be received with a wide frequency band and sufficient gain as compared to an existing technique. Also, influence of noise from the television receiver 301 can be avoided by connecting the signal transmission cable 312 to the covered wire SS via the balun 320, and thus, broadcast waves can be received with a wide frequency band and sufficient gain. Also, the length of the covered wire SS on the plug 309 side is set so as to differ from the length of the covered wire SS on the television receiver 301 side, whereby broadcast waves can be received with a wide frequency band and sufficient gain.

Figures 52A, 52B, 52C:
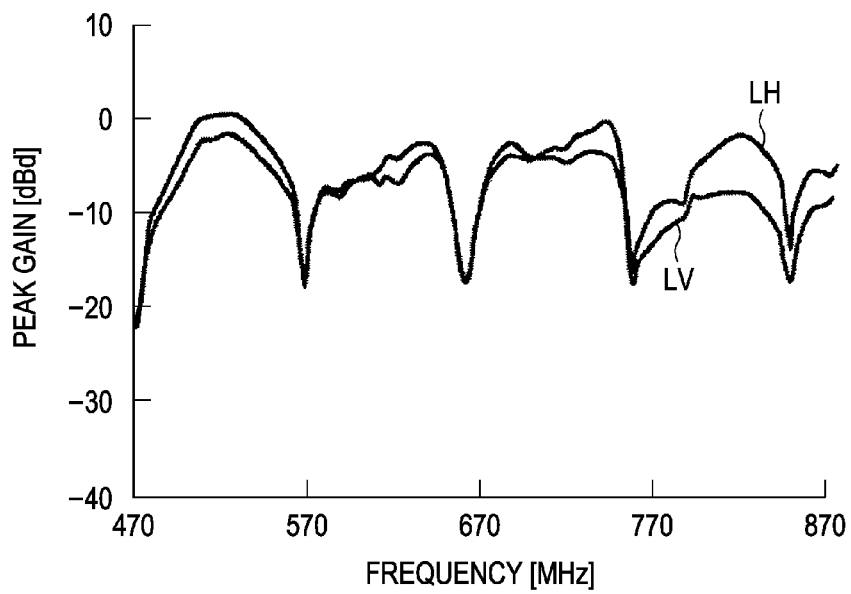

FIGS. 52A through 52C are diagrams illustrating the antenna properties according to the arrangement disclosed in Japanese Unexamined Patent Application Publication No. 2002-151932. FIGS. 52A through 52C illustrate the antenna properties of an arrangement wherein an LC resonance circuit is provided partway along the power cord to restrict the electric length of the power cord in a high-frequency manner, and broadcast waves are received at a portion where this electric length is restricted.

FIG. 52A is a diagram illustrating the antenna gain property of the UHF band. FIG. 52B is a diagram illustrating the vertical polarization property in the property view of FIG. 52A. FIG. 52C is a diagram illustrating the horizontal polarization property in the property view of FIG. 52A.

Note that measurement has been performed wherein an evaluation board of which the ground size is 300×300 mm assuming a small television receiver is used, and the length of a cable serving as an antenna is set to 1 m. Note that reference symbols LH and LV in FIG. 52A denote the properties of horizontal polarization and vertical polarization, respectively.

According to FIGS. 52A through 52C, periodical decrease in antenna gain is seen, and accordingly, it can be found that broadcast waves are not readily received with a wide frequency band and sufficient gain.

Figures 53A, 53B, 53C:
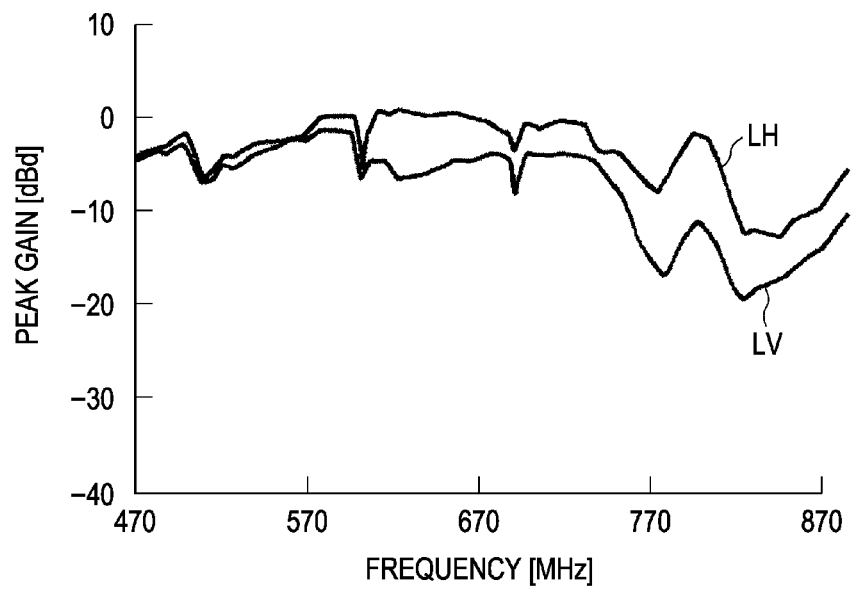

On the other hand, FIGS. 53A through 53C are diagrams illustrating the measurement results of the antenna properties of the power cable 304 according to the present tenth embodiment. FIG. 53A is a diagram illustrating the antenna gain property of the UHF band, FIG. 53B is a diagram illustrating the vertical polarization property in the property diagram in FIG. 53A, and FIG. 53C is a diagram illustrating the horizontal polarization property in the property diagram in FIG. 53A. According to FIGS. 53A through 53C, it can be found that the antenna gain of around −5 dB can be secured as the whole frequency bands, and broadcast waves can be received with a wide frequency band and sufficient gain. Note that the measurement conditions thereof are the same as the measurement results shown in FIGS. 42A through 42C.

Advantages of Tenth Embodiment

According to the above arrangement, the elements of a dipole antenna are formed using the power transmission cable, and are connected to the connector for antennas of the television receiver via the coaxial cable. Thus, according to the tenth embodiment, portability relating to the antenna improves as compared to existing technology, and broadcast waves can be received with a wide frequency band and sufficient gain.

Further, an inductor for suppressing the high-frequency signal of a wire core cable is provided to each of the television receiver side end and the plug side end of a portion equivalent to the elements, whereby deterioration in properties due to the wire core cables can be prevented.

Also, this inductor is formed with a ferrite core into which the power transmission cable is inserted, whereby deterioration in properties due to the wire core cables can be prevented with a simple arrangement.

Also, an inductor for suppressing the high-frequency signal of a wire core cable is provided to the relay portion, whereby deterioration in properties due to antiresonance can be prevented.

Also, the covered wire is connected to the signal transmission cable which is a coaxial cable via the balun, whereby deterioration in properties due to the television receiver can be prevented.

Also, a portion on the television receiver side of the covered wire, and a portion on the plug side are set to a different length, whereby broadcast waves can be received with markedly wide frequency band and sufficient gain.

11. Eleventh Embodiment

FIG. 54 is a diagram illustrating the configurations and connection relationship of the principal portions of the television receiver and power cable according to the present eleventh embodiment of the present invention in detail in contrast with FIG. 48.

With this power cable 334, an amplifying circuit 335 is provided to the relay portion 313, a high-frequency signal induced from the covered wire SS is amplified at this amplifying circuit 335, and is output. Note that power is supplied to the amplifying circuit 335 via the signal transmission cable 312, for example. Accordingly, a component relating to power transmission such as a capacitor or the like is provided to the signal transmission cable 312 as appropriate. The power cable 334 is configured in the same way as the power cable according to the tenth embodiment except that the arrangement relating to this amplifying circuit differs.

With the present eleventh embodiment, the amplifying circuit is provided to the relay portion, a high-frequency signal induced from the covered wire is amplified at this amplifying circuit, and is output, whereby the same advantages as those of the tenth embodiment can be obtained by improving the antenna gain markedly.

12. Twelfth Embodiment

FIG. 55 is a diagram illustrating the configurations and connection relationship of the principal portions of the television receiver and power cable according to the present twelfth embodiment of the present invention in detail in contrast with FIG. 48.

With this power cable 344, only the covered wire SS on the television receiver 301 side is connected to the signal transmission cable 312 via the balun 320. Also, with the power cable 344, the ferrite core 318 on the plug 309 side is omitted. The power cable 344 is configured in the same way as the power cable 304 according to the tenth embodiment except that the arrangement relating to connection of the balun 320 differs. Note that only the covered wire SS on the plug 309 side may be connected to the balun 320 instead of the covered wire SS on the television receiver 301 side.

With the present twelfth embodiment, even in the event that only the covered wire on the television receiver side or only the covered wire on the plug side is connected to the signal transmission cable, the same advantages as those of the tenth embodiment can be obtained.

13. Thirteenth Embodiment

FIG. 56 is a diagram illustrating the configurations and connection relationship of the principal portions of the television receiver and power cable according to the present thirteenth embodiment of the present invention in detail in contrast with FIG. 48.

With this power cable 354, the balun 320 is omitted, and the covered wire SS is directly connected to the signal transmission cable 312. The power cable 354 is configured in the same way as the power cable 304 according to the tenth embodiment except that the arrangement relating to connection of the balun 320 differs.

With the present thirteenth embodiment, the balun is omitted, whereby the same advantages as those of the first embodiment can be obtained by simplifying the arrangement.

14. Fourteenth Embodiment

Figure 57:
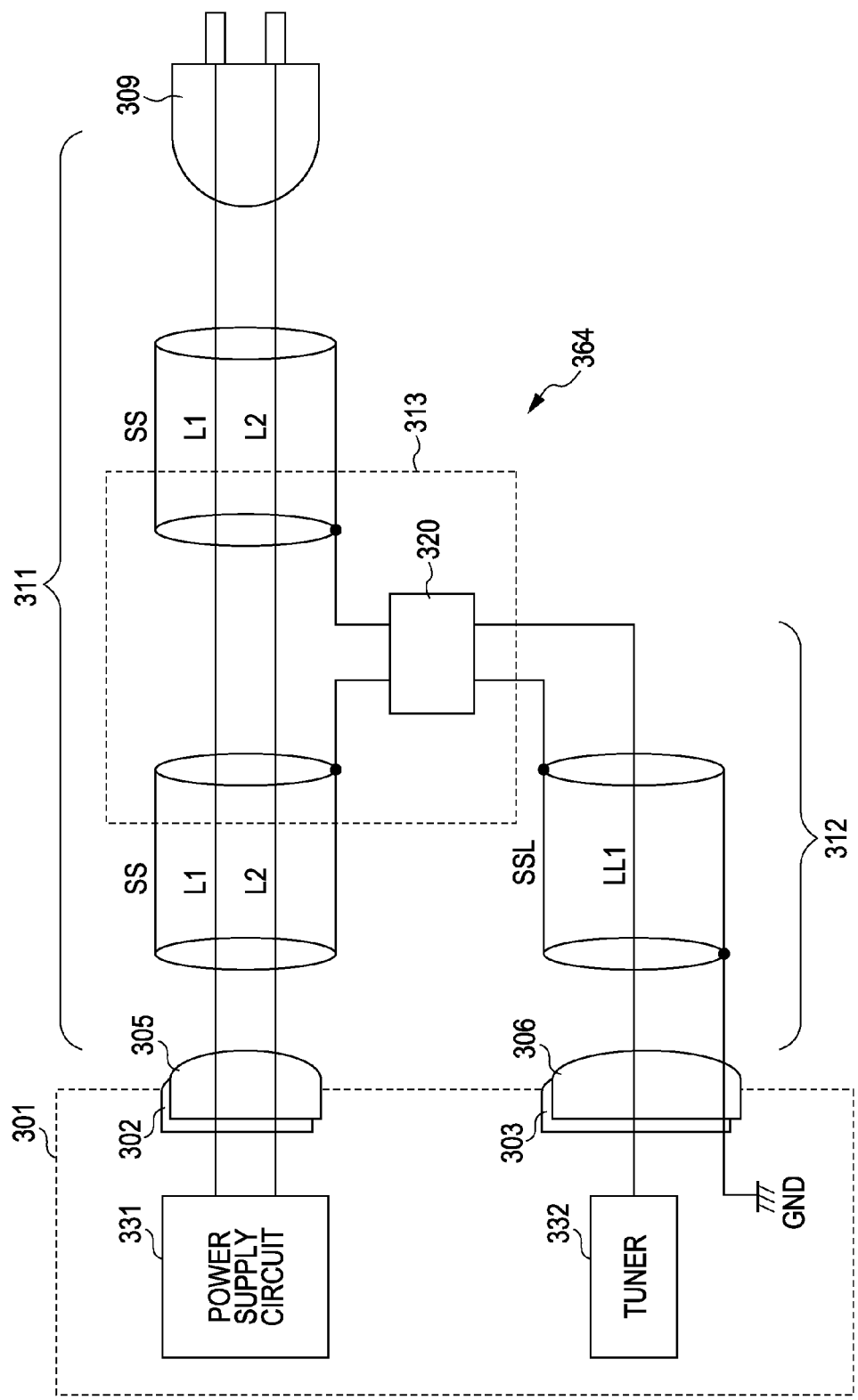
FIG. 57 is a diagram illustrating the configurations and connection relationship of the principal portions of the television receiver and power cable according to a fourteenth embodiment of the present invention in detail.

FIG. 57 is a diagram illustrating the configurations and connection relationship of the principal portions of the television receiver and power cable according to the present fourteenth embodiment of the present invention in detail in contrast with FIG. 48.

With this power cable 364, the ferrite cores 318, 317, and 322 of the power supply plug 309 side end, the television receiver 301 side end, and the relay portion 313 are omitted. The power cable 364 is configured in the same way as the power cable 304 according to the tenth embodiment except that the arrangement relating to the ferrite cores 318, 317, and 322 differs.

With the present fourteenth embodiment, the ferrite cores are omitted, whereby the same advantages as those of the first embodiment can be obtained by simplifying the arrangement.

15. Fifteenth Embodiment

Figure 58:
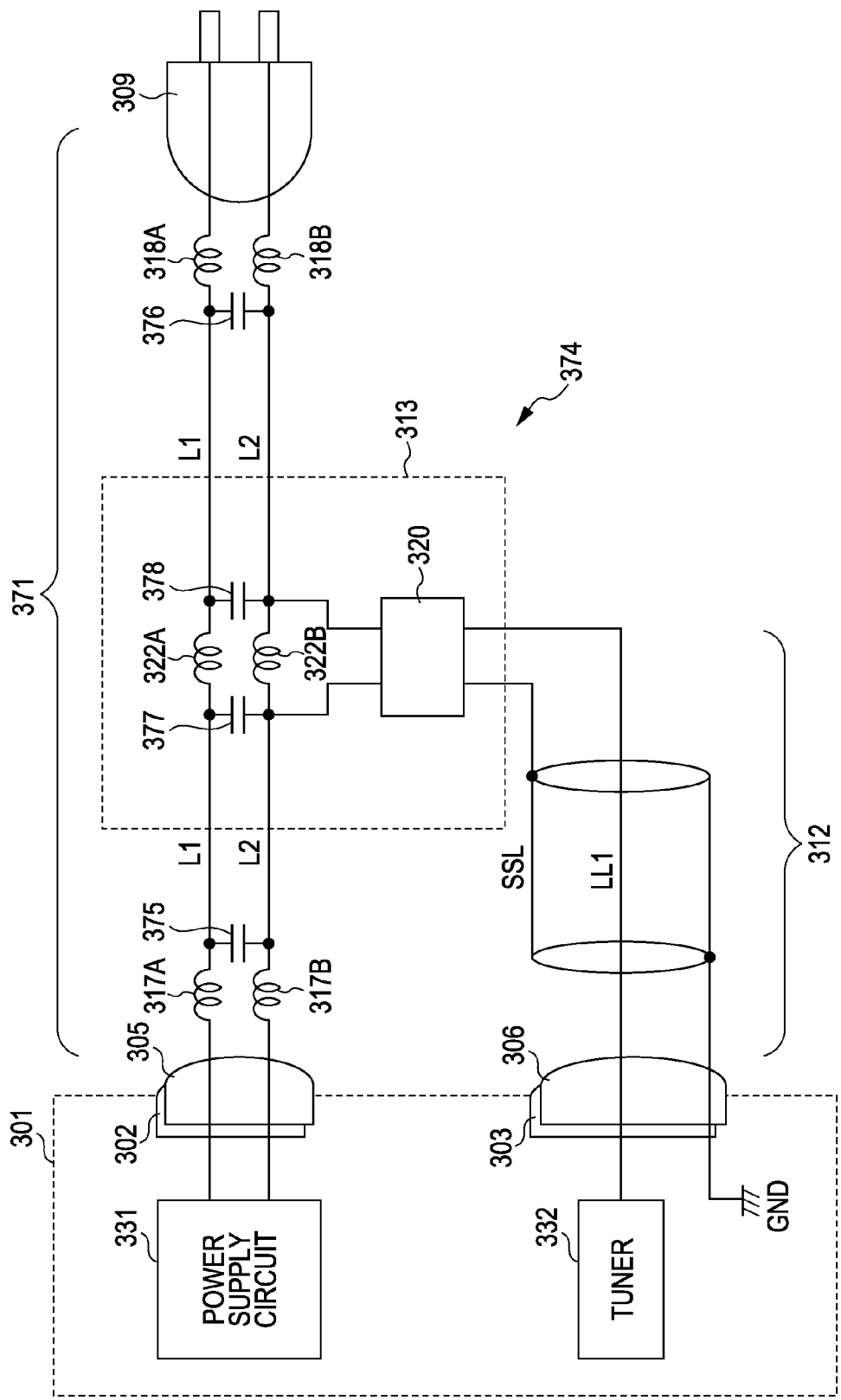
FIG. 58 is a diagram illustrating the configurations and connection relationship of the principal portions of the television receiver and power cable according to a fifteenth embodiment of the present invention in detail.

FIG. 58 is a diagram illustrating the configurations and connection relationship of the principal portions of the television receiver and power cable according to the present fifteenth embodiment of the present invention in detail in contrast with FIG. 48.

With this power cable 374, a power transmission cable 371 is applied instead of the power transmission cable 311. The power cable 374 is configured in the same way as the power cable 304 according to the tenth embodiment except that the arrangement relating to this power transmission cable 371 differs.

Figure 59:
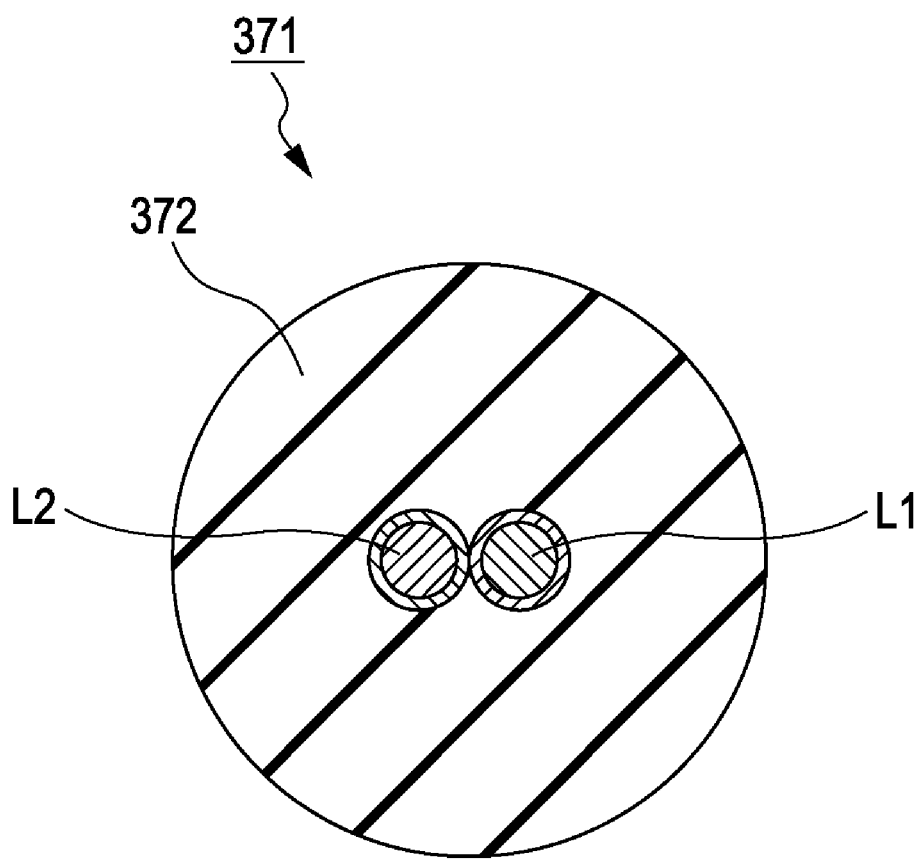
FIG. 59 is a schematic cross-sectional view illustrating a configuration example of the power transmission cable in FIG. 58 according to the fifteenth embodiment.

FIG. 59 is a schematic cross-sectional view illustrating a configuration example of the power transmission cable in FIG. 58 according to the fifteenth embodiment. The power transmission cable 371 is, such as shown in FIG. 59 by taking a cross section thereof, a multi-core coaxial cable which is held integrally by covering two cables L1 and L2 with an insulator 372.

With the power transmission cable 371, the two cables L1 and L2 are assigned to transmission of commercial power, and are each connected the corresponding terminals of the power supply jack 305 and the plug 309.

With the cables L1 and L2, inductors 317A and 317B, and inductors 318A and 318B are disposed in the bases of the power supply jack 305 and the plug 309, and the cables L1 and L2 are each connected to the corresponding terminal of the power supply jack 305 and the plug 309 via the corresponding inductors 317A and 317B, and the inductors 318A and 318B.

Note that the inductors 317A, 317B, 318A, and 318B are made up of, for example, a ferrite bead, but may be made up of a chip inductor, or further in the same way as the above embodiment, a ferrite core common to the cables L1 and L2 may be disposed.

With the cables L1 and L2, the relay portion 313 side ends of the inductors 317A, 317B, 318A, and 318B are each connected to capacitors 375 and 376, and are set to a short-circuit state in a high-frequency manner. Also, with the cables L1 and L2, inductors 322A and 322B are disposed in the relay portion 313 respectively, and according to the inductors 322A and 322B, the cables L1 and L2 are separated into a portion on the power supply jack 305 side and a portion on the plug 309 side in a high-frequency manner.

Also, both ends of the inductors 322A and 322B are connected by the capacitors 377 and 378, and are set to a short-circuit state in a high-frequency manner. Also, both ends of the inductor 322B disposed in one cable L2 are connected to the balun 320. Thus, with the power transmission cable 371, the cables L1 and L2 which transmit commercial power are separated into a portion on the power supply jack 305 side and a portion on the plug 309 side in a high-frequency manner, thereby making up the elements of a dipole antenna. Also, each of the elements is connected to the tuner 332 to receive broadcast waves.

Note that, with regard to the inductors 322A and 322B as well, in the same way as the above embodiment, a ferrite core common to the cables L1 and L2 may be disposed and fabricated.

According to the present fifteenth embodiment, even in the event that the cables which transmit commercial power are separated in a high-frequency manner to make up the elements of a dipole antenna, the same advantages as those of the tenth embodiment can be obtained.

16. Sixteenth Embodiment

With the present sixteenth embodiment, the present invention is applied to a power supply device which generates DC power from commercial power supply.

That is to say, the power supply device according to the present sixteenth embodiment generates DC power from commercial power supply at a power supply unit, and supplies this DC power to a mainframe such as a computer or the like via a power cable. With this power supply device, the arrangement of each of the above embodiments is applied to this power cable.

According to the present embodiment, even in the event that of applying the present embodiment to a power supply device which supplies DC power to a mainframe, the same advantages as those of each of the above embodiments can be obtained.

17. Seventeenth Embodiment

Note that, with the above tenth embodiment and the like, description has been made regarding the case where an inductor is disposed in the power supply jack 5 side end and the plug 9 side end.

However, the present invention is not restricted to this, and an arrangement may be made as a seventeenth embodiment wherein the cables L1 and L2 for power transmission are further extended from portions where the inductors are disposed, where the power supply jack 305 and the plug 309 are disposed, for example. In this case, the whole length of the power cord may be set to various lengths.

Also, with the above tenth embodiment and the like, description has been made regarding the case where the covered core SS is provided between the ferrite core 317 and the relay portion 318, and between the relay portion 313 and the ferrite core 318.

However, the present invention is not restricted to this, a portion separated from the ferrite 317 or ferrite 318 toward the relay portion 313 side by predetermined distance may be set to be an end portion of the ferrite cores 317 and 318 sides of each of the covered wires SS. In this case, the electric length of the core wire cable of the corresponding portion may be set to be longer as to the length of the covered wire SS in a high-frequency manner. Accordingly, the antenna properties may be set so as to handle a further markedly wide band.

Also, with the above tenth embodiment and the like, description has been made regarding the case where inductors due to a ferrite core are disposed.

However, the present invention is not restricted to this, similar to the fifteenth embodiment, a chip inductor or the like may be disposed in each of the cables.

Also, with the above embodiment, description has been made regarding the case where the power cord is detachably connected to the television receiver via each of the connectors.

However, the present invention is not restricted to this, and may be applied widely to a case where a power cord is connected to a television receiver in a built-in manner.

Also, with the above fifteenth embodiment, description has been made regarding the case where the relay portion side ends of the inductors 317A and 317B and the inductors 318A and 318B, and both ends of the inductors 322A and 322B are connected by capacitors.

However, in the case that properties sufficient for practical use can be secured, the capacitors and inductors may be omitted.

Also, with the above embodiments, description has been made regarding the case where a high-frequency signal induced at the cables is input to the tuner by connecting the coaxial cable to the relay portion.

However, the present invention is not restricted to this, and a parallel feeder which is a parallel cable may be applied instead of the coaxial cable.

Also, with the above embodiments, description has been made regarding the case where the inductor is provided to the cable side of the connector.

However, the present invention is not restricted to this, and an inductor may be provided to the inner side of a cellular phone, the inner side of a power supply device, or the like.

Also, with the above embodiments, description has been made regarding the case where each of the covered wire and the power transmission cable is controlled to serve as an antenna.

However, the present invention is not restricted to this, and another signal transmission cable, or a free cable which has not been used for transmission of any signal or power may be controlled to serve as an antenna.

Also, with the above embodiments, each suitable arrangement has been described, but the present invention is not restricted to these arrangements, the above arrangements may be combined as appropriate.

Specifically, for example, an arrangement may be made wherein the tenth through fourteenth embodiments are applied to from the relay portion to the mainframe side, and the fifteenth embodiment is applied to from the relay portion to the plug 309 side.

Also, with the above embodiments, description has been made regarding the case where the present invention is applied to the television receiver, but the present invention is not restricted to this, and may be applied widely to various types of reception device such as a video disk device, a radio, or the like, and the power cord of a reception device.

Figure 60:
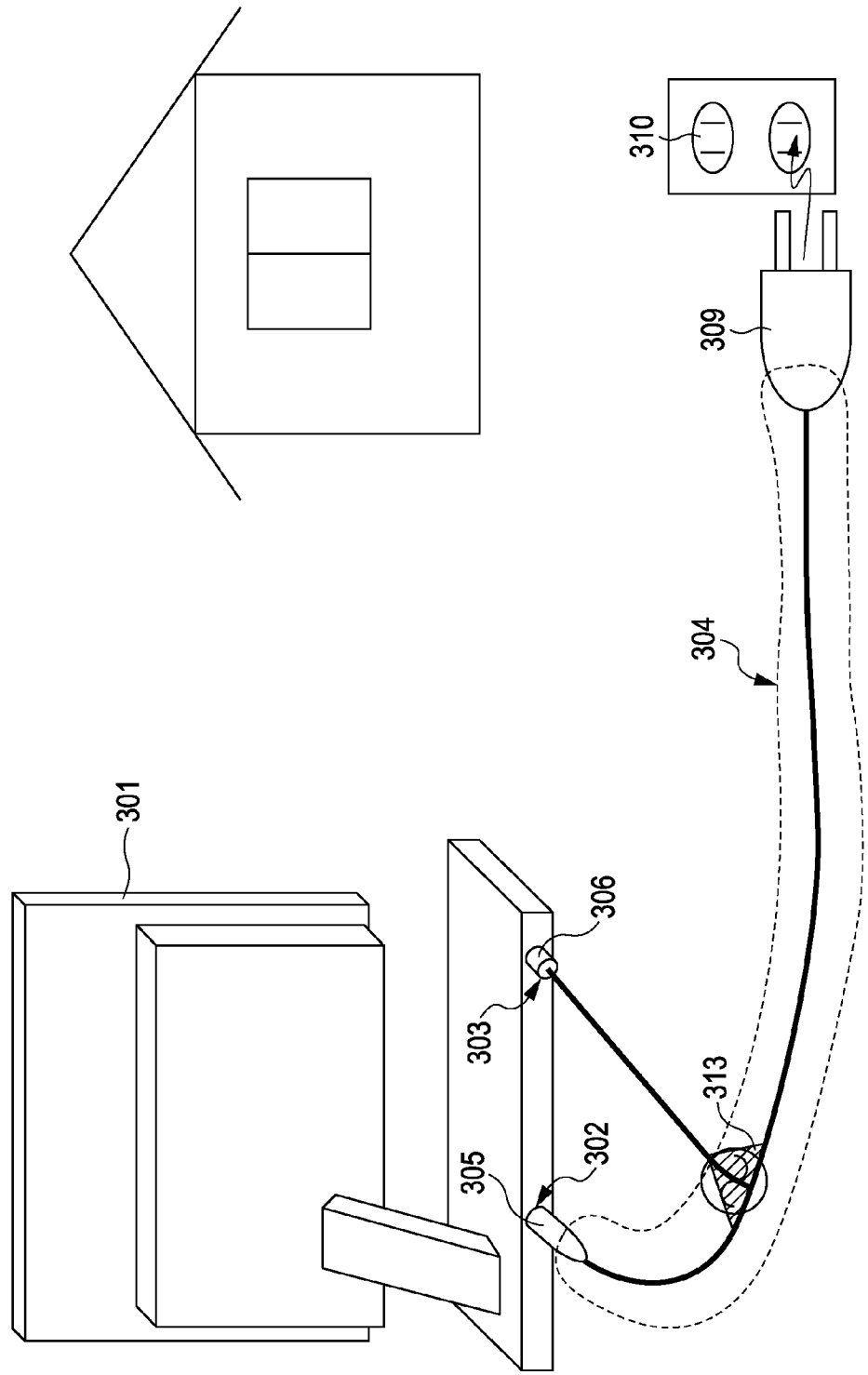
FIG. 60 is a diagram for describing the antenna properties of a system wherein a power cable is configured so as to serve as a dipole antenna, and broadcast waves are received at this power cable, with the tenth through seventeenth embodiments.

Incidentally, with the tenth through seventeenth embodiments, such as shown in FIG. 60, the power cable (power cord) is configured so as to serve as a dipole antenna, and broadcast waves are received with this power cable.

With the tenth through seventeenth embodiments, the power cable 304 is branched to two forks at the relay portion 313, but the whole of this relay portion 313 is subjected to molding using a resin, as described in a manner related with FIG. 5.

However, in the case of simply fixing the whole of the relay portion 313 by molding, the shape of the power cable is apt to be deformable, and the antenna properties are changed according to the installation shape of the power cable, and accordingly, there is a possibility that it may be difficult to readily obtain the optimal properties constantly.

Also, in the case of assuming that reception of television broadcast signals is executed at a vehicle, the shape of the power cable is deformable, and accordingly, there is a possibility that it may be very difficult to attach the power cable onto a dashboard having a relatively good radio wave environment.

Therefore, description will be made below regarding an antenna cable which can suppress deviation of the antenna properties as the eighteenth through twenty-fifth embodiments.

18. Eighteenth Embodiment

Arrangement of Embodiment

Figure 61:
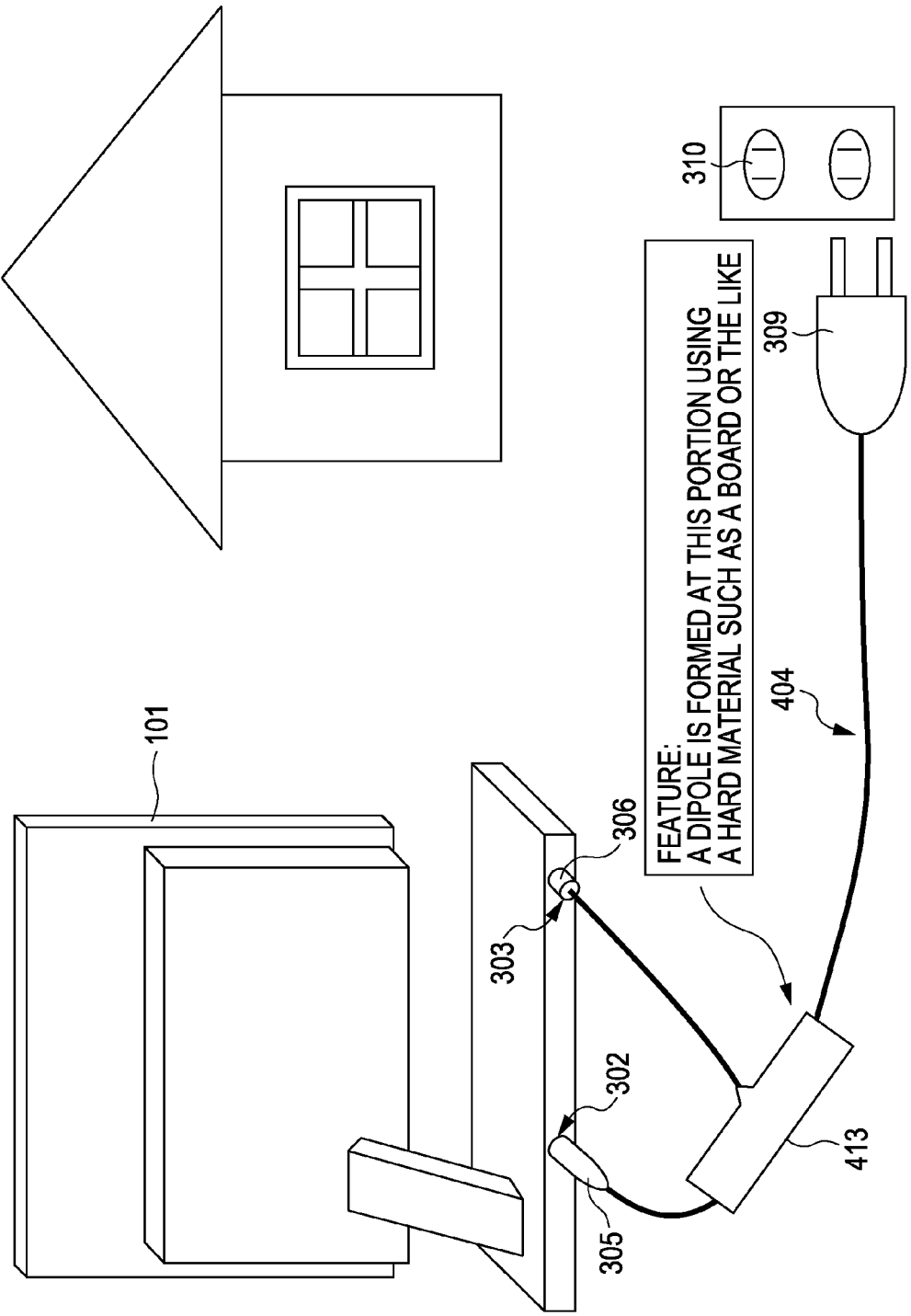
FIG. 61 is a diagram illustrating a reception device including a television receiver and a power supply device serving as electronic equipment according to an eighteenth embodiment of the present invention as viewed from the back side.
Figure 62:
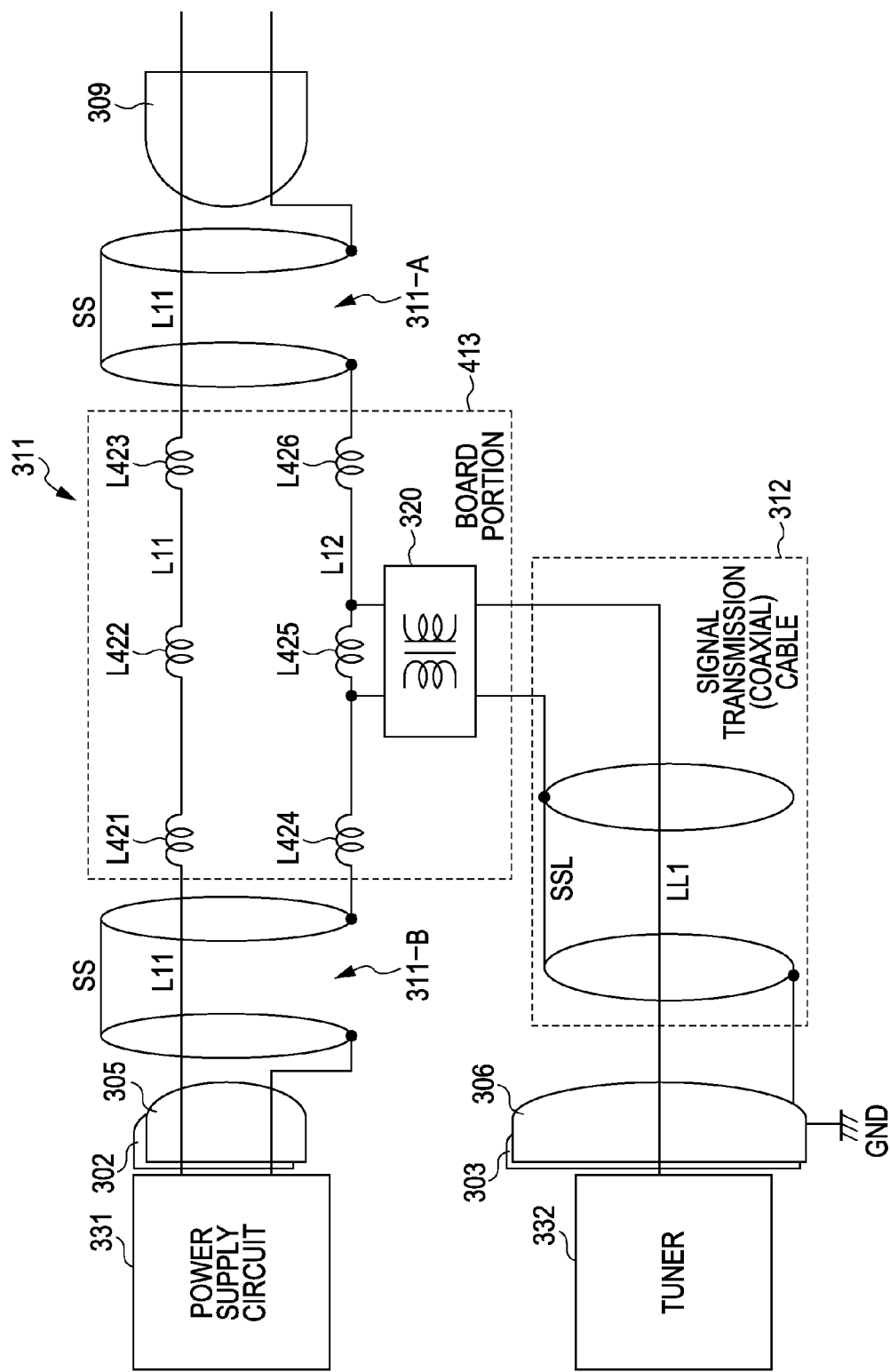
FIG. 62 is a diagram illustrating the configurations and connection relationship of the principal portions of the television receiver and power cable according to the present eighteenth embodiment in detail.
Figure 63:
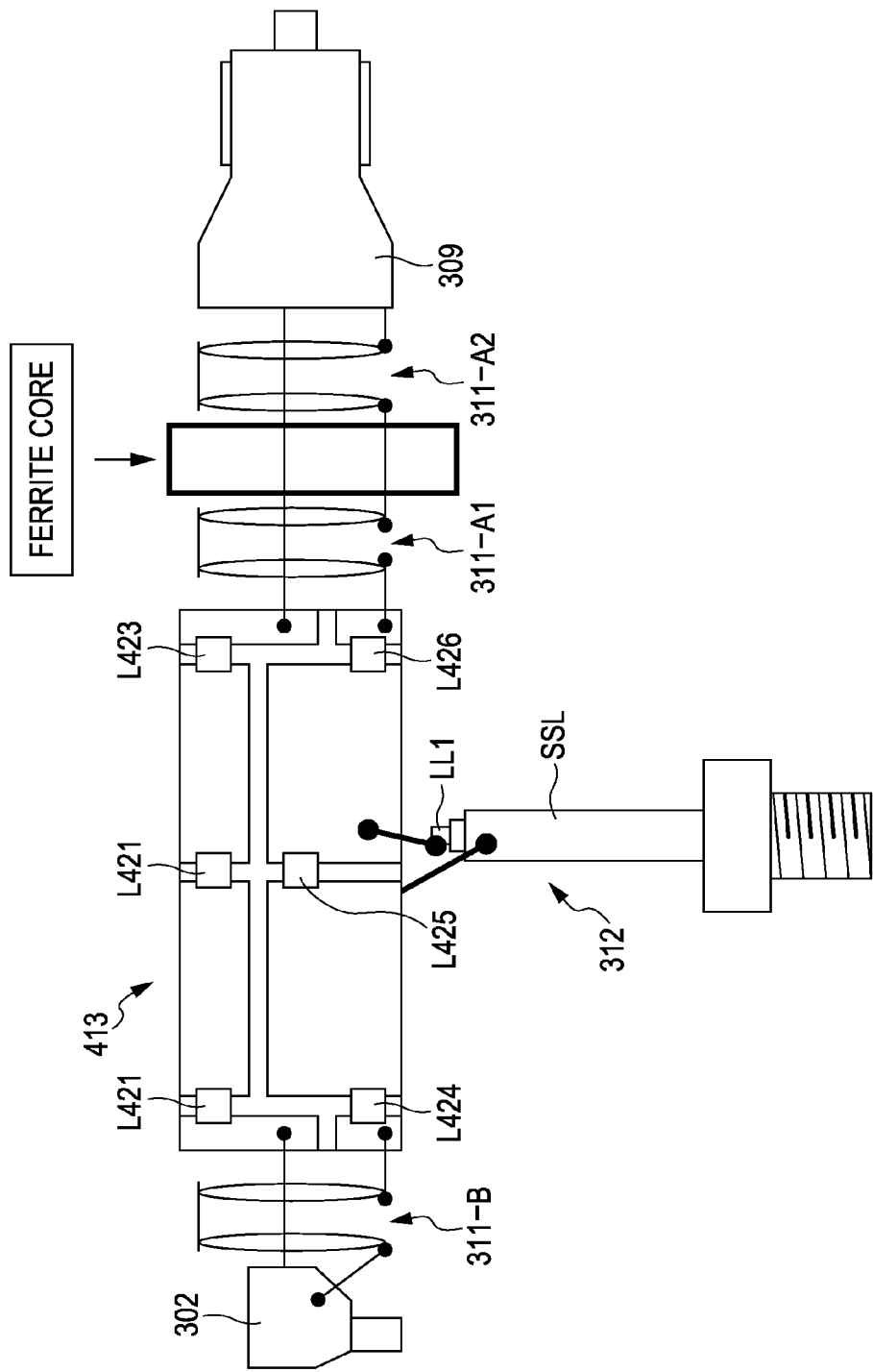
FIG. 63 is a diagram illustrating a mounting configuration example of the board portion according to the present eighteenth embodiment.

FIG. 61 is a diagram illustrating the reception device including a television receiver and a power supply device serving as electronic equipment according to an eighteenth embodiment of the present invention as viewed from the back side, FIG. 62 is a diagram illustrating the configurations and connection relationship of the principal portions of the television receiver and power cable according to the present eighteenth embodiment in detail, FIG. 63 is a diagram illustrating a mounting configuration example of the board portion according to the present eighteenth embodiment. Note that FIG. 63 exemplifies the arrangement for multi resonance according to a later-described twenty-third embodiment.

With the arrangements in FIGS. 61 and 62, the relay portion of a power cable 404 is formed of a board portion 413 for power transmission and antennas of a hard material which can fix a power transmission cable including a core wire so as to prevent deviation of the shape of the cable making up a dipole antenna.

The lines L11 and L12 including a core wire, of which the covered wire SS and sheath are peeled at an intermediate portion of the power transmission cable 311 having a function as an antenna cable are fixed to the board portion 413 for power transmission and antennas so as to be in parallel.

The balun 320 is disposed and fixed onto the board portion 413 for power transmission and antennas.

Further, with the board portion 413 for power transmission and antennas, a configuration is formed wherein inductors L421 through L423, and inductors L424 through L426 which serve as a high-frequency cutoff portion are disposed in the lines L11 and L12, and the lines L11 and L12 serve as an antenna at a desired frequency.

The signal transmission cable 312 which is a high-frequency coaxial cable from the board portion 413 is connected to the tuner 332 of the reception terminal of the television receiver 101 to make up an antenna configuration, thereby transmitting a received signal.

Also, an arrangement may be made wherein this antenna cable is connected to an audio circuit of the reception terminal, and an audio output device such as an earphone or the like, thereby transmitting an audio signal. The outer shape of the board portion 413 has a size of $\lambda/2$ or more of the frequency used.

With the board pattern of the board portion 413, two lines L11 and L12 are formed in a DC manner, and high-frequency cutoff inductors L421 through L423, and L424 through L426 are disposed with an interval of the $\lambda/4$ length of the band used as an antenna. The balun 320 is connected onto the line 12 to be connected to the ground GND of the power supply circuit. Each of the ports is connected so as to form a dipole antenna on the line L12 divided by the inductor L425 in a high-frequency manner, and the signal transmission coaxial cable 312 for antenna signal transmission is connected to the opposite side thereof.

With power transmission cables 311-A and 311-B to be connected to the board portion 413, the line L11 serves as a core wire, and the end portion of the line L12 of the board portion 413 is connected to each of the covered wires SS. The covered wire SS of the power transmission cable 311-A is connected to the power supply plug 309. Also, the covered wire SS of the power transmission cable 311-B is connected to the power supply jack 305.

Figure 64:
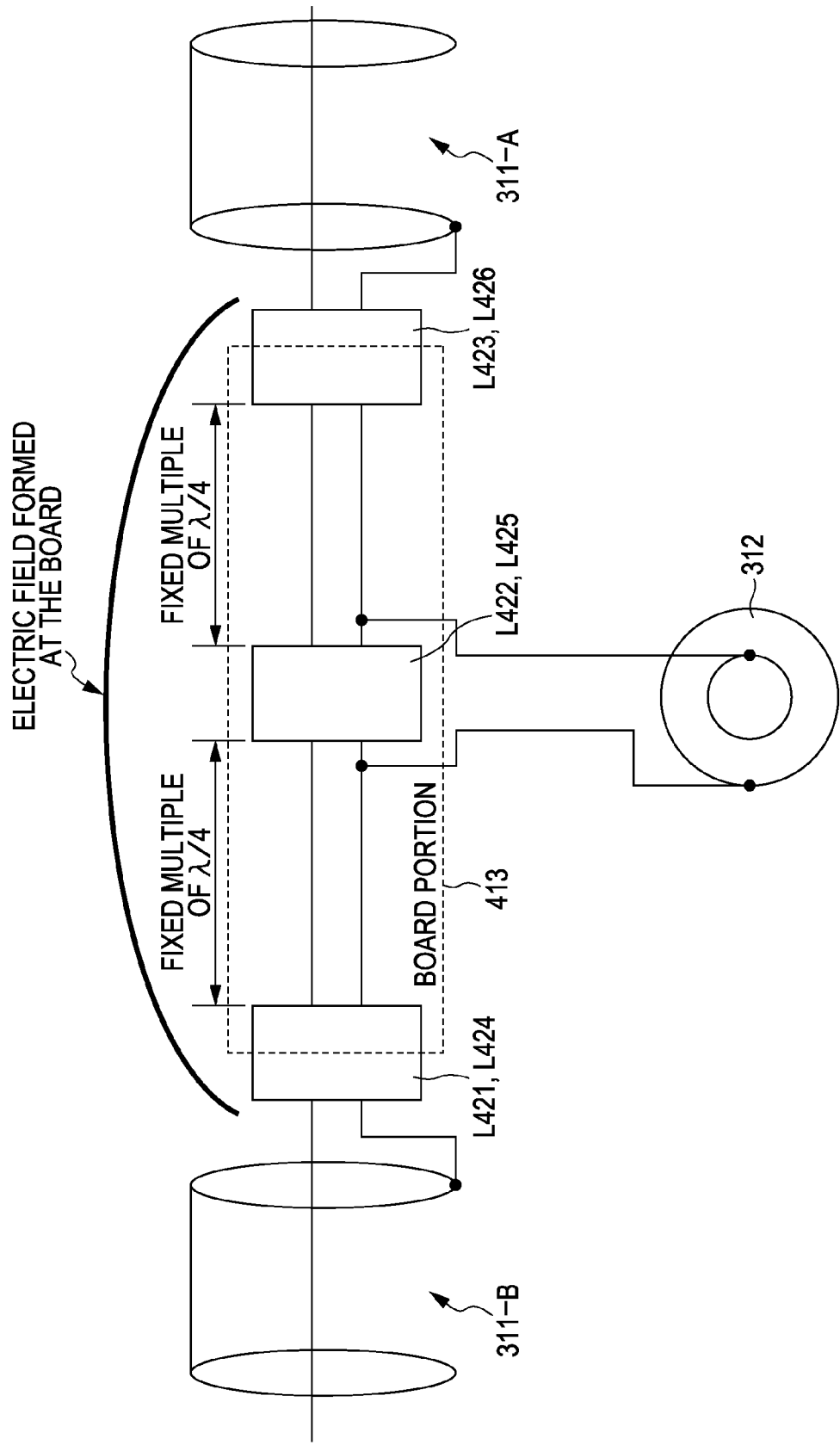
FIG. 64 is a first view for describing the principle as the antenna according to the eighteenth embodiment.
Figure 65:
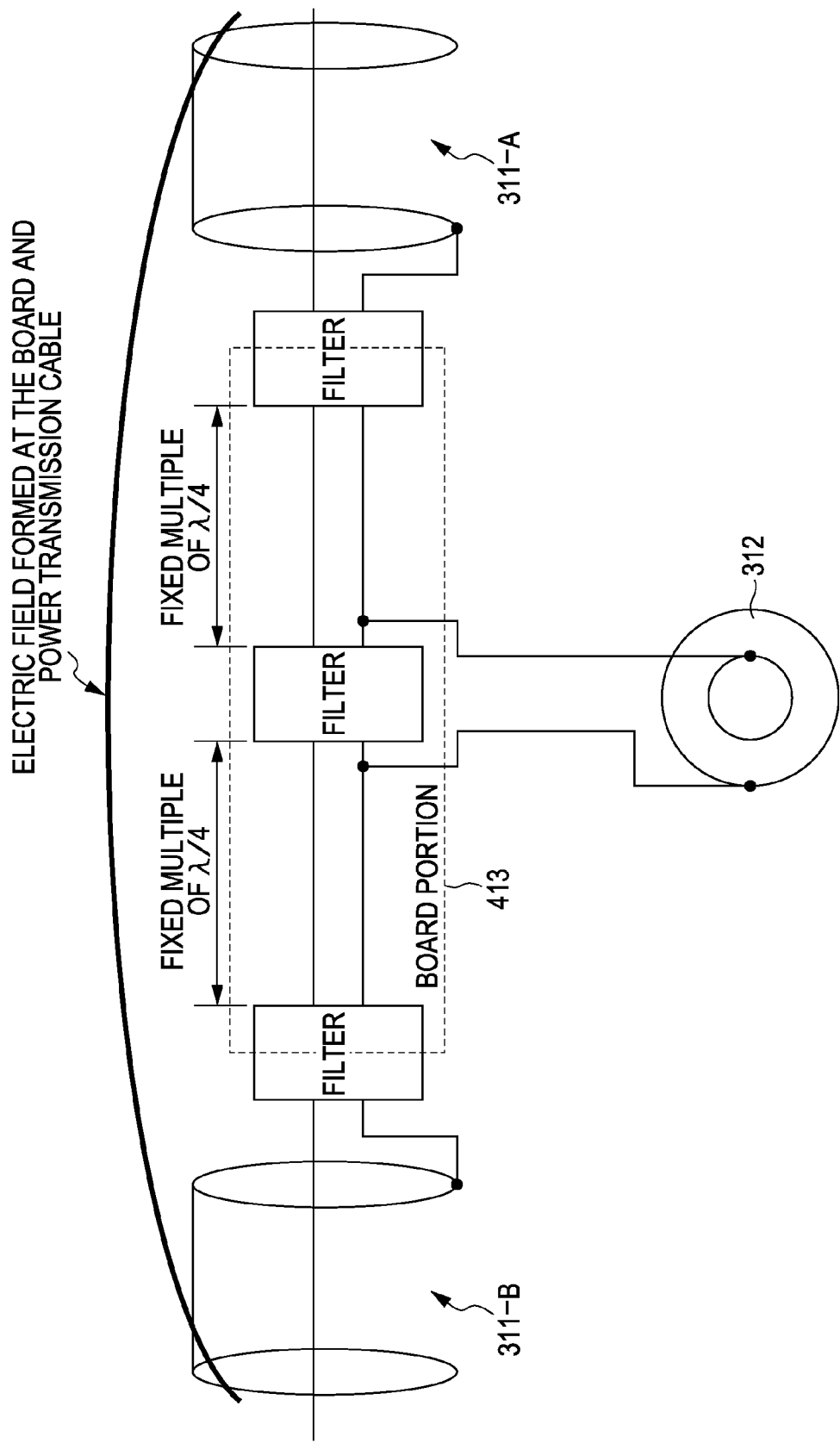
FIG. 65 is a second view for describing the principle as the antenna according to the eighteenth embodiment.

FIG. 64 is a first view for describing the principle as the antenna according to the eighteenth embodiment, and FIG. 65 is a second view for describing the principle as the antenna according to the eighteenth embodiment.

With the present example, the power transmission lines L11 and L12 provided to the board portion 413 are used as the elements of the antenna, and the length thereof is, such as shown in FIG. 64, λ/4 on one side, and power is supplied to the elements via the balun 320, thereby forming a dipole antenna. Also, influence from the set is reduced. Also, the impedance of the inductors L421 through L426 is adjusted, such as shown in FIG. 65, whereby the power transmission cables 311-A and 311-B can also be used as antenna elements, and multi-resonance can be handled.

Figures 66A, 66B, 66C:
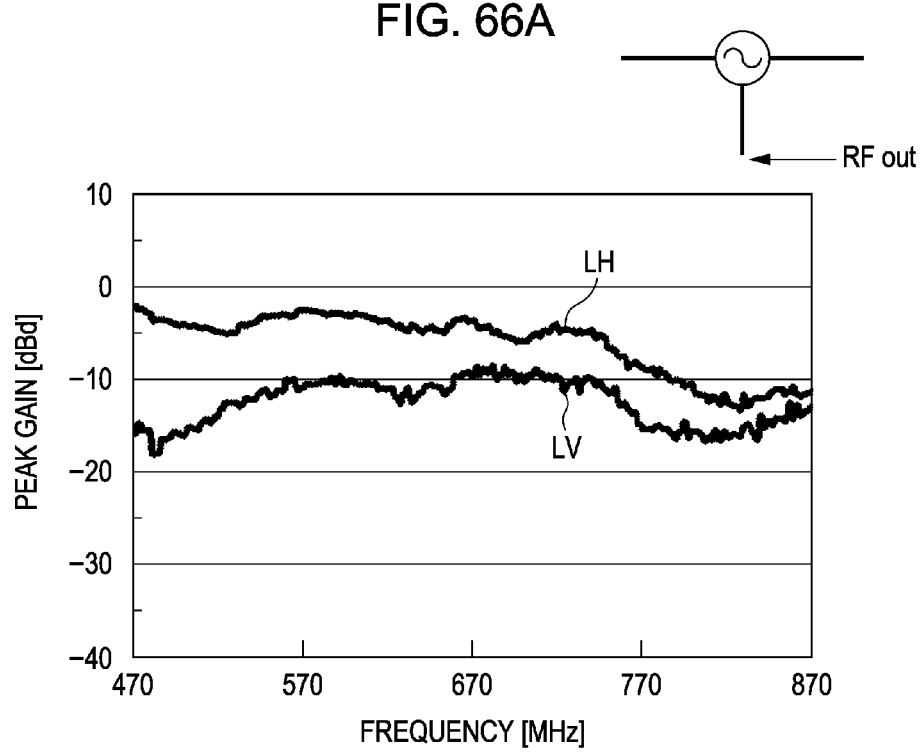

FIGS. 66A through 66C are diagrams illustrating the antenna properties of the UHF band in a state in which the power cable in the case of including no board portion is extended straightly (ideal state). FIG. 66A is a diagram illustrating the antenna gain property of the UHF band. FIG. 66B is a diagram illustrating the vertical polarization property in the property diagram in FIG. 66A. FIG. 66C is a diagram illustrating the horizontal polarization property in the property diagram in FIG. 66A. In FIG. 66A, the horizontal axis denotes a frequency, and the vertical axis denotes antenna gain. Note that reference numerals LH and LV in FIG. 66A denote horizontal polarization and vertical polarization, respectively.

Figures 67A, 67B, 67C:
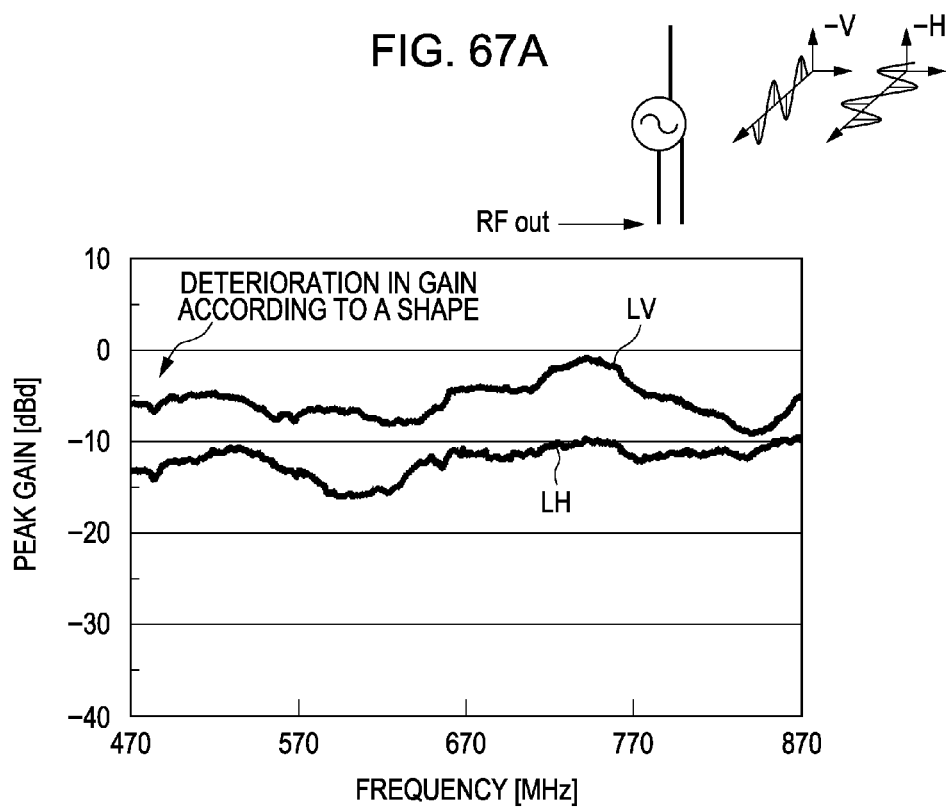

FIGS. 67A through 67C are diagrams illustrating the antenna properties of the UHF band in a state in which the power cable in the case of including no board portion is folded by half. FIG. 67A is a diagram illustrating the antenna gain property of the UHF band, FIG. 67B is a diagram illustrating the vertical polarization property in the property diagram in FIG. 67A, and FIG. 67C is a diagram illustrating the horizontal polarization property in the property diagram in FIG. 67A. In FIG. 67A, the horizontal axis denotes a frequency, and the vertical axis denotes antenna gain.

As shown in FIGS. 66A through 66C, the comparison results as to a dipole which is an ideal antenna indicate that the higher the peak gain is, the more excellent the property is. As shown in FIGS. 67A through 67C, the shape of the cable is deformed, whereby the principal polarization of the antenna is changed, and the gain is also deteriorated.

Figures 68A, 68B, 68C:
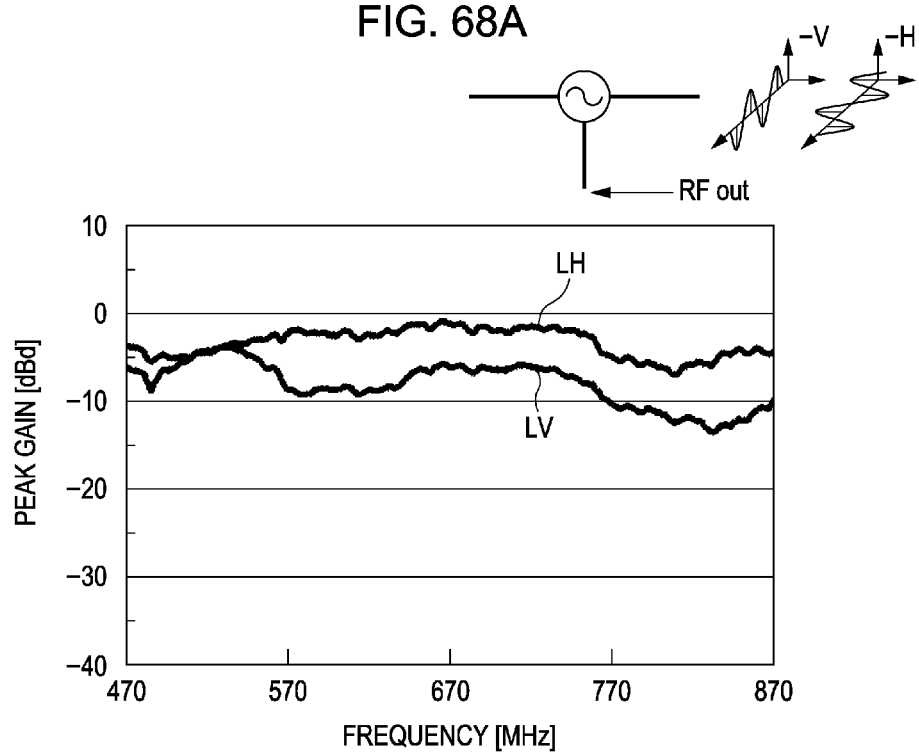

FIGS. 68A through 68C are diagrams illustrating the antenna properties of the UHF band of the power cable according to the eighteenth embodiment including the board portion.

FIG. 68A is a diagram illustrating the antenna gain property of the UHF band. FIG. 68B is a diagram illustrating the vertical polarization property in the property diagram in FIG. 68A. FIG. 68C is a diagram illustrating the horizontal polarization property in the property diagram in FIG. 68A. In FIG. 68A, the horizontal axis denotes a frequency, and the vertical axis denotes antenna gain.

With the present eighteenth embodiment, the shape is not changed by using the board portion 413, and accordingly, such as shown in FIGS. 68A through 68C, deviation of the properties is very small.

19. Nineteenth Embodiment

Figure 69:
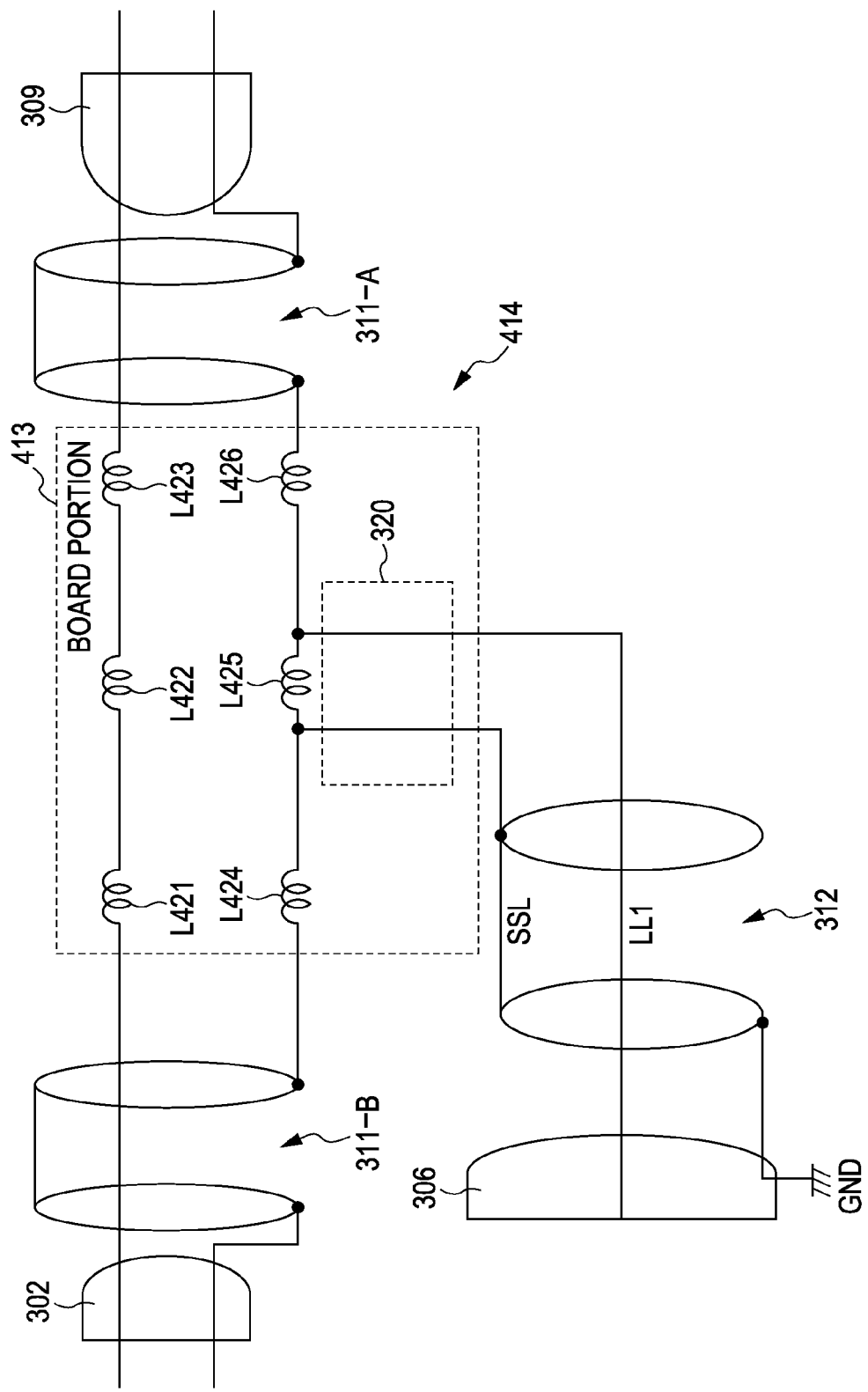
FIG. 69 is a diagram illustrating the configurations and connection relationship of the principal portions of the television receiver and power cable according to a nineteenth embodiment of the present invention in detail.

FIG. 69 is a diagram illustrating the configurations and connection relationship of the principal portions of the television receiver and power cable according to the present nineteenth embodiment of the present invention in detail in contrast with FIG. 62.

With this power cable 414, the balun 320 of the board portion 413 is omitted, the covered wire SS is directly connected to the signal transmission cable 312. The power cable 404 is configured in the same way as the power cable 404 according to the eighteenth embodiment except that the arrangement relating to connection of the balun 320 differs.

With the present nineteenth embodiment, reduction in cost is realized by omitting the balun, and accordingly, the same advantages as those in the eighteenth embodiment can be obtained while simplifying the arrangement.

20. Twentieth Embodiment

Figure 70:
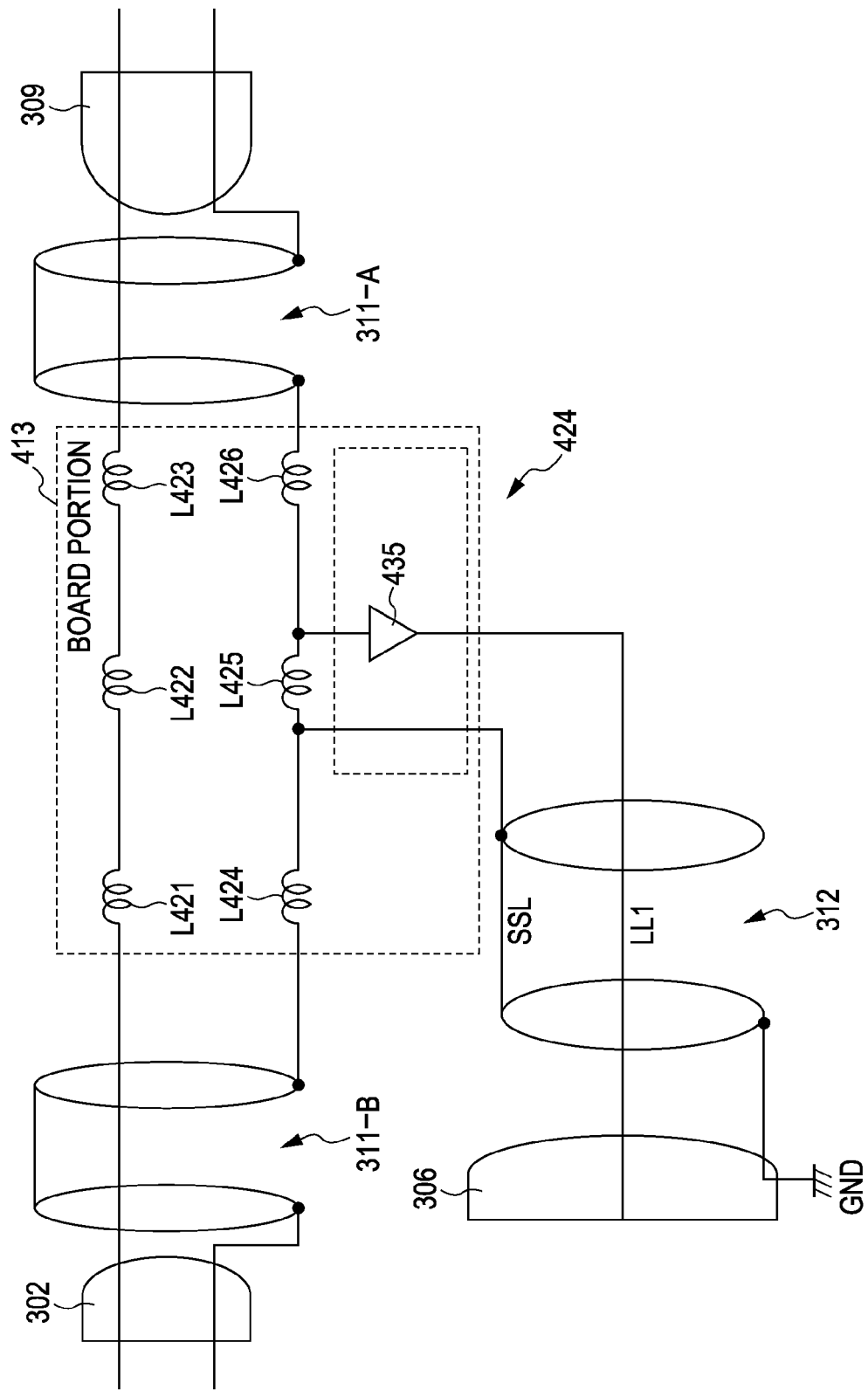
FIG. 70 is a diagram illustrating the configurations and connection relationship of the principal portions of the television receiver and power cable according to a twentieth embodiment of the present invention in detail.

FIG. 70 is a diagram illustrating the configurations and connection relationship of the principal portions of the television receiver and power cable according to the present twentieth embodiment of the present invention in detail in contrast with FIG. 69.

With this power cable 424, an amplifying circuit 435 is provided to the board portion 413, and a high-frequency signal induced at the covered wire SS is amplified and output by this amplifying circuit 435. Note that power is supplied to the amplifying circuit 435 via the signal transmission cable 312, for example. Accordingly, components relating to power transmission such as a capacitor and the like are provided to the signal transmission cable 312. The power cable 424 is configured in the same way as the power cable 414 according to the nineteenth embodiment except that the arrangement relating to this amplifying circuit differs.

With the present twentieth embodiment, the amplifying circuit 435 is provided to the board portion 413, a high-frequency signal induced at the covered wire is amplified and output by this amplifying circuit, whereby the same advantages as those in the eighteenth and nineteenth embodiments can be obtained by improving the antenna gain markedly.

21. Twenty-First Embodiment

Figure 71:
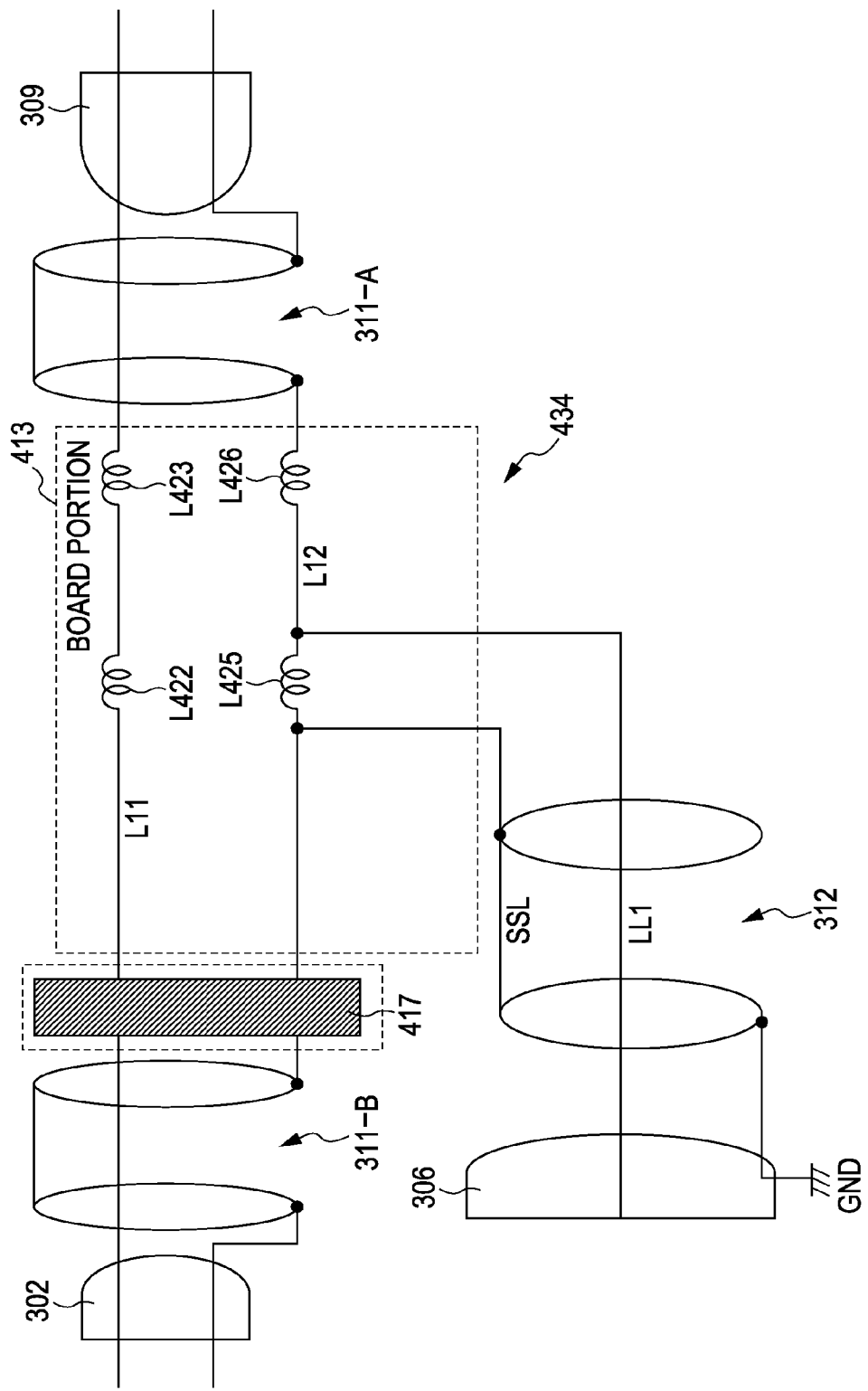
FIG. 71 is a diagram illustrating the configurations and connection relationship of the principal portions of the television receiver and power cable according to a twenty-first embodiment of the present invention in detail.

FIG. 71 is a diagram illustrating the configurations and connection relationship of the principal portions of the television receiver and power cable according to the present twenty-first embodiment of the present invention in detail in contrast with FIG. 69.

With this power cable 434, the inductors L421 and L422 are eliminated from the board portion 413, and instead, a ferrite core 417 is disposed between the power transmission cable 311-B and the board portion 413. The power cable 434 is configured in the same way as the power cable 414 according to the nineteenth embodiment except that the arrangement differs wherein the ferrite core is disposed instead of a part of the inductors.

With the present twenty-first embodiment, the same advantages as those of the eighteenth and nineteenth embodiments can be obtained.

22. Twenty-Second Embodiment

Figure 72:
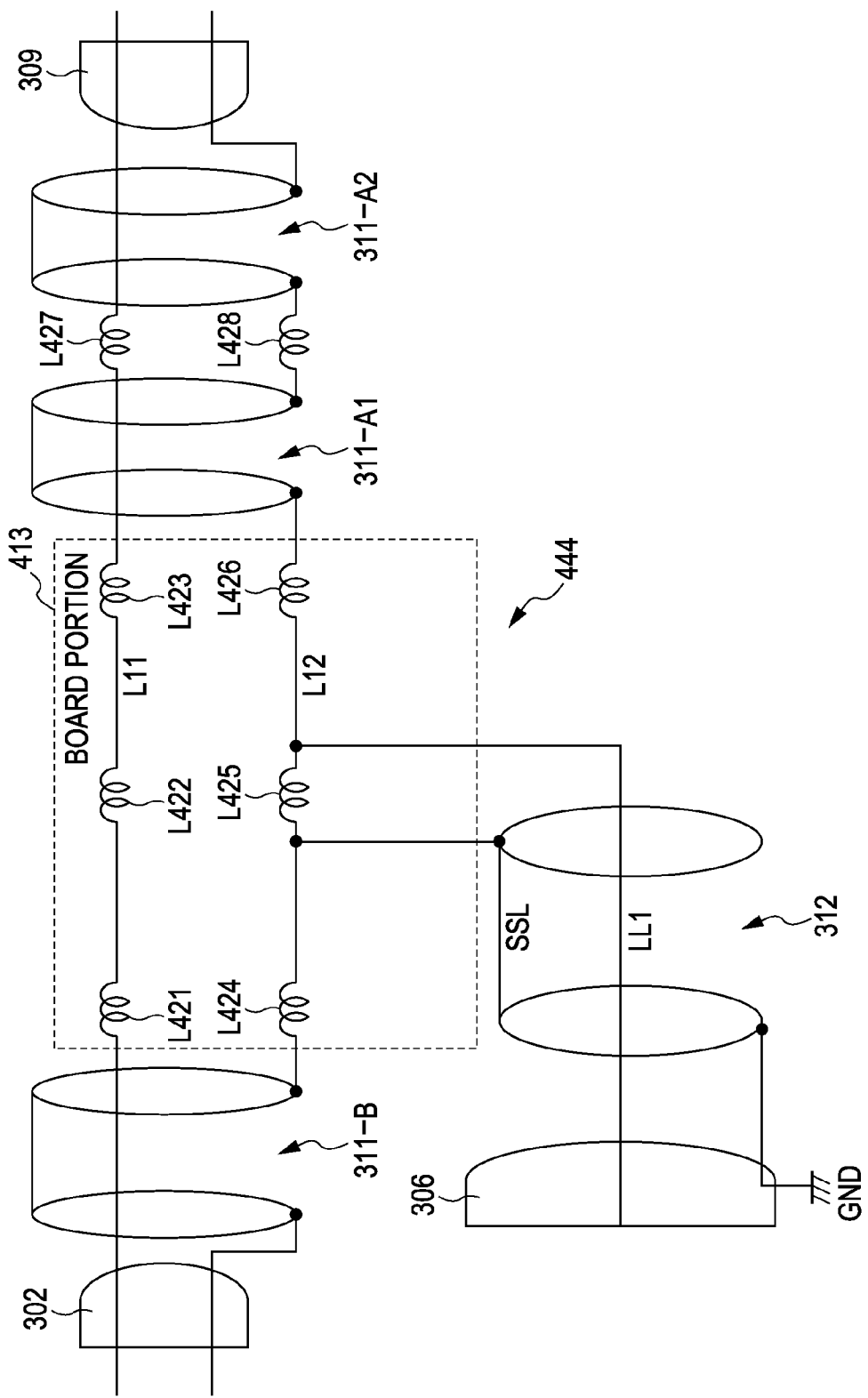
FIG. 72 is a diagram illustrating the configurations and connection relationship of the principal portions of the television receiver and power cable according to a twenty-second embodiment of the present invention in detail.

FIG. 72 is a diagram illustrating the configurations and connection relationship of the principal portions of the television receiver and power cable according to the present twenty-second embodiment of the present invention in detail in contrast with FIG. 69.

This power cable 444 is an example wherein multi-resonance is realized by further providing inductors L427 and L428 between the power transmission cable 311-A1 and 311-A2. The power cable 444 is configured in the same way as the power cable 414 according to the nineteenth embodiment except that the arrangement differs wherein multi-resonance is realized outside the board portion 413.

With the present twenty-second embodiment, the same advantages as those of the eighteenth and nineteenth embodiments can be obtained.

23. Twenty-Third Embodiment

Figure 73:
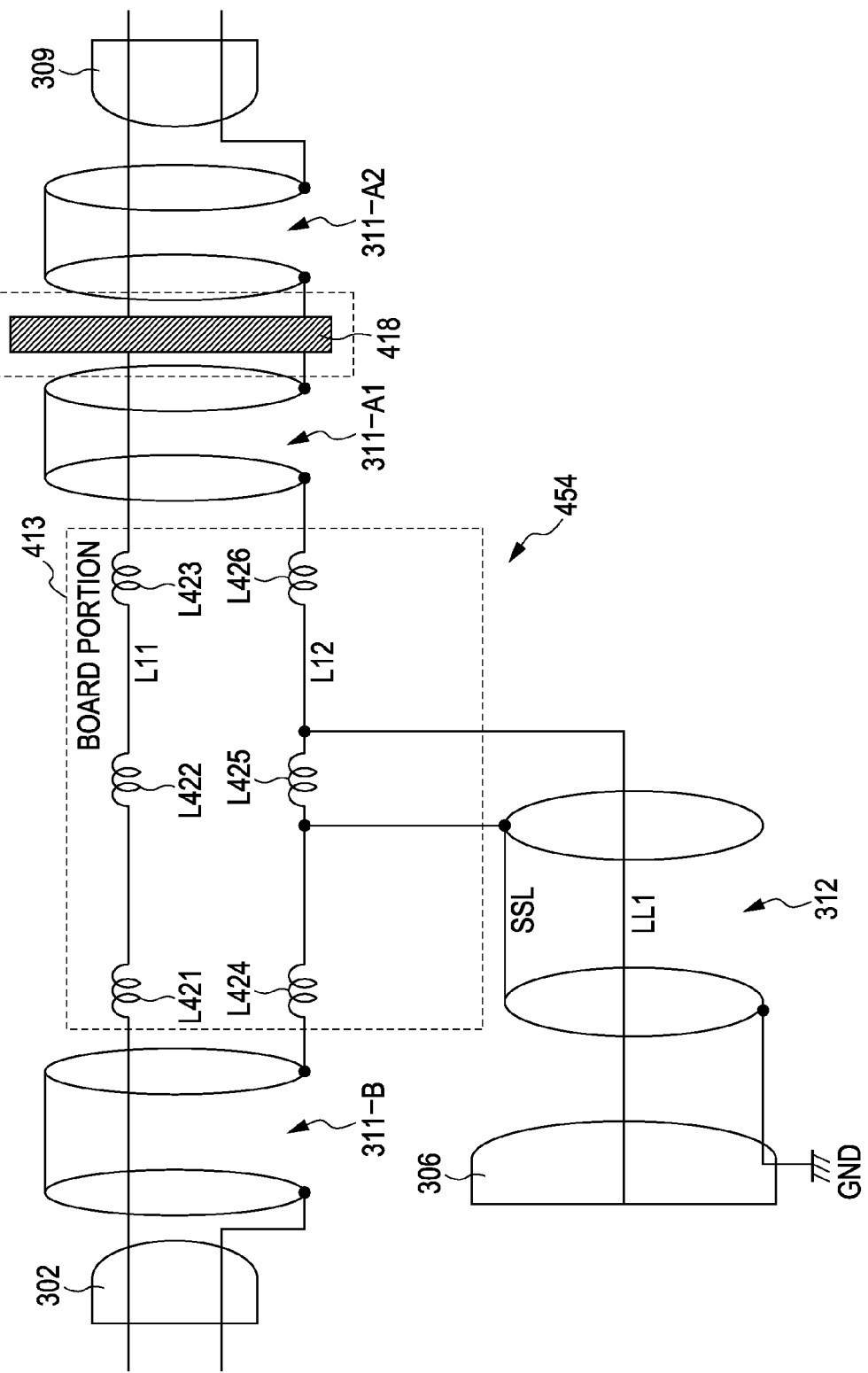
FIG. 73 is a diagram illustrating the configurations and connection relationship of the principal portions of the television receiver and power cable according to a twenty-third embodiment of the present invention in detail.

FIG. 73 is a diagram illustrating the configurations and connection relationship of the principal portions of the television receiver and power cable according to the present twenty-third embodiment of the present invention in detail in contrast with FIG. 72.

With this power cable 454, the disposed inductors L427 and L428 for multi-resonance are eliminated, and instead, a ferrite core 418 is disposed.

The power cable 454 is configured in the same way as the power cable 444 according to the twenty-second embodiment except that the arrangement differs wherein the ferrite core is disposed instead of a part of the inductors.

With the present twenty-third embodiment, the same advantages as those in the eighteenth and twenty-second embodiments can be obtained while realizing reduction in manufacturing cost.

24. Twenty-Fourth Embodiment

Figure 74:
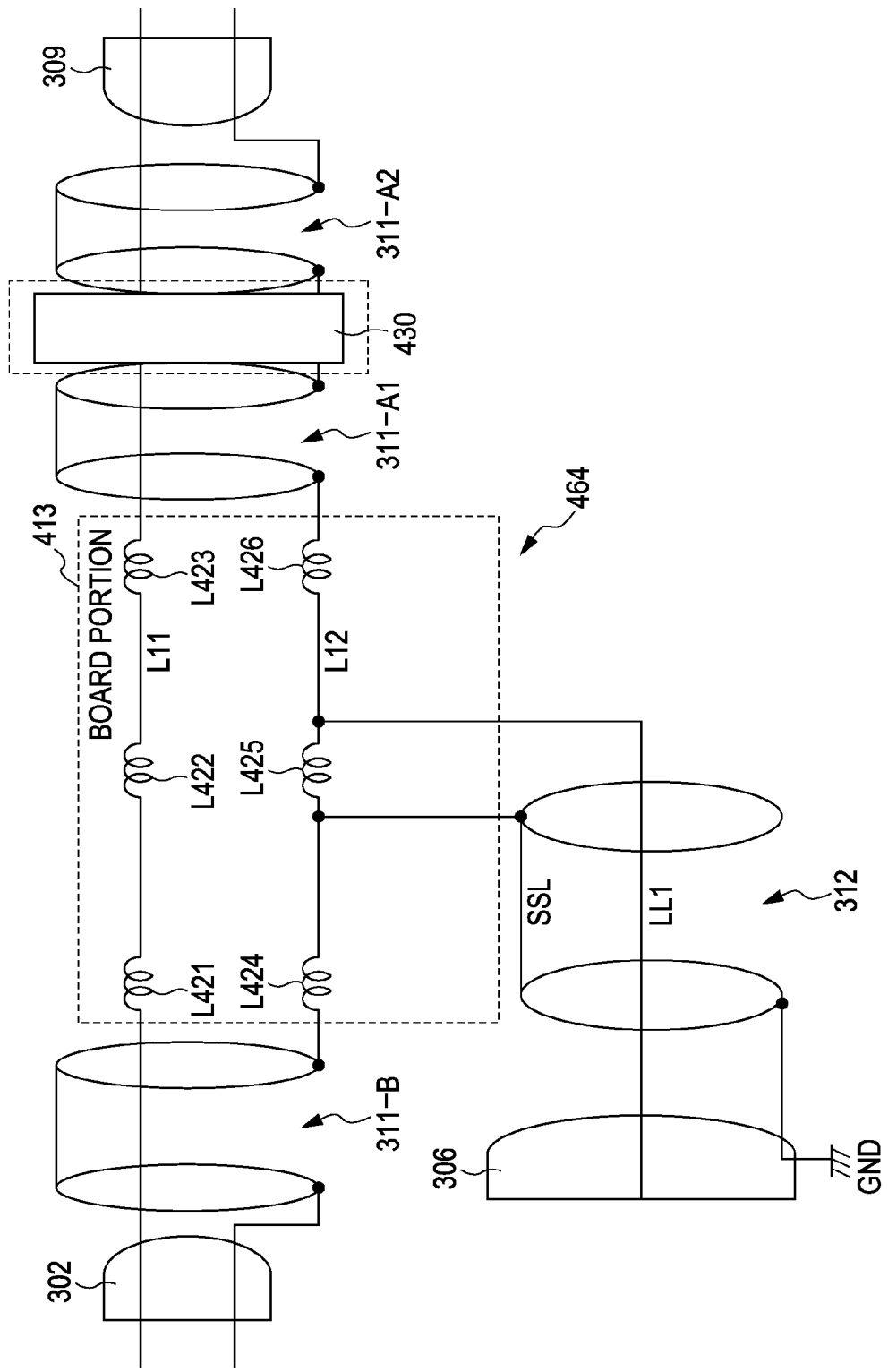
FIG. 74 is a diagram illustrating the configurations and connection relationship of the principal portions of the television receiver and power cable according to a twenty-fourth embodiment of the present invention in detail.

FIG. 74 is a diagram illustrating the configurations and connection relationship of the principal portions of the television receiver and power cable according to the present twenty-fourth embodiment of the present invention in detail in contrast with FIG. 73.

With this power cable 464, a power supply unit 430 which converts AC to DC or DC to DC to supply power supply to the reception terminal is disposed instead of the ferrite core disposed for multi-resonance.

The power cable 464 is configured in the same way as the power cable 454 according to the twenty-third embodiment except that the arrangement differs wherein the power supply unit is disposed instead of the ferrite core.

With the present twenty-fourth embodiment, the same advantages as those in the eighteenth and twenty-third embodiments can be obtained while realizing reduction in manufacturing cost.

25. Twenty-Fifth Embodiment

Figure 75:
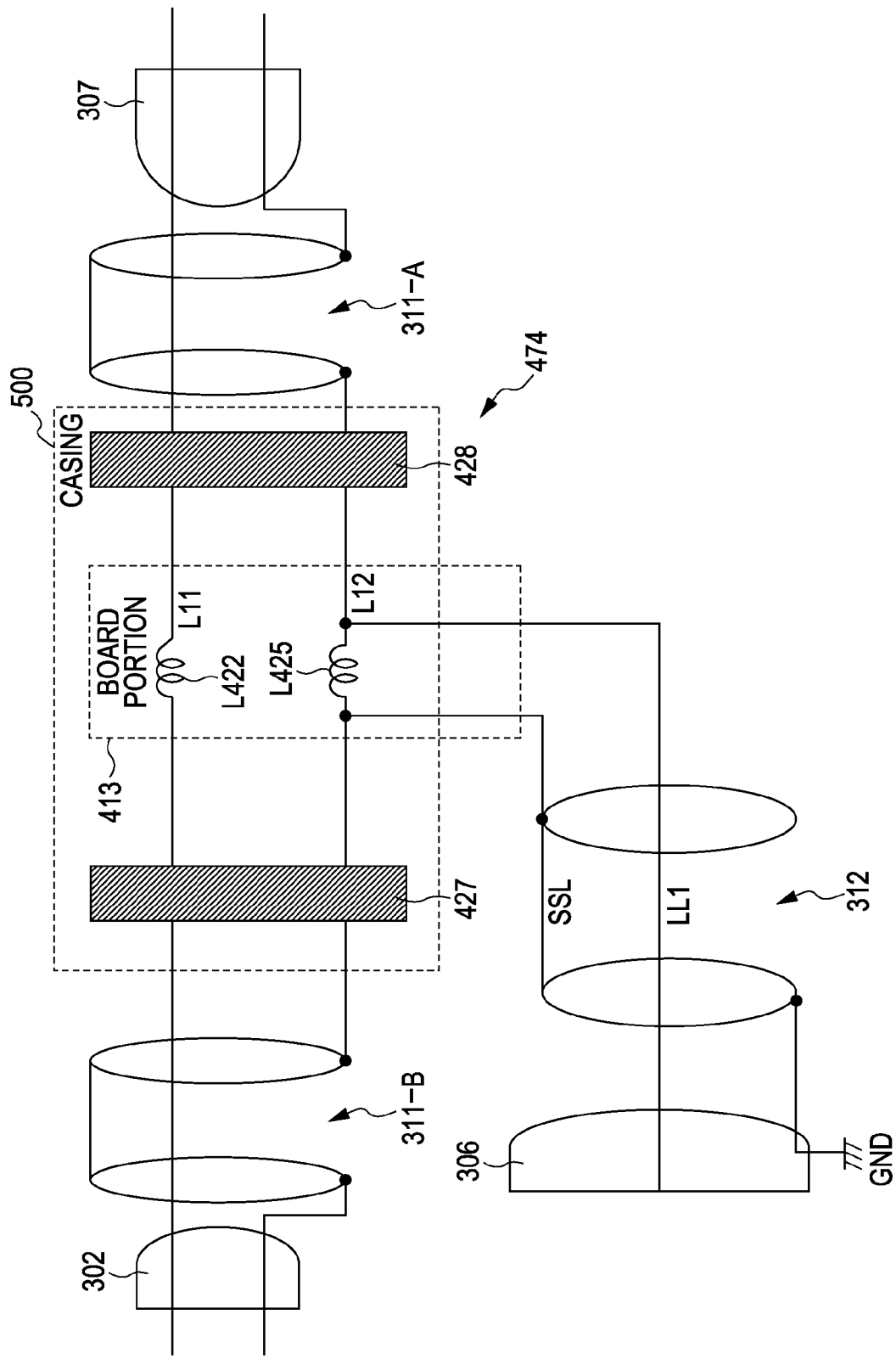
FIG. 75 is a diagram illustrating the configurations and connection relationship of the principal portions of the television receiver and power cable according to a twenty-fifth embodiment of the present invention in detail.

FIG. 75 is a diagram illustrating the configurations and connection relationship of the principal portions of the television receiver and power cable according to the present twenty-fifth embodiment of the present invention in detail in contrast with FIG. 69.

With this power cable 474, only the inductors L422 and L425 remain, a ferrite core 427 is disposed instead of the inductors L421 and L424, and a ferrite core 428 is disposed instead of the inductors L423 and 426, on the board portion 413. Stabilization of the shape is realized by holding the lines L11 and L12, the board portion 413, and the ferrite cores 427 and 428 in a casing 500. The power cable 474 is configured in the same way as the power cable 414 according to the nineteenth embodiment except that the arrangement differs wherein the ferrite core is disposed instead of a part of the inductors, and is fixed with the casing.

With the present twenty-fifth embodiment, the same advantages as those in the eighteenth and nineteenth embodiments can be obtained while suppressing deviation of the antenna properties.

According to the eighteenth through twenty-fifth embodiments, the antenna element shape of the power cable serving as an antenna cable is fixed with the board portion or the like, thereby realizing improvement in the antenna gain, and accordingly, an antenna location can clearly be transmitted to the user. As a result thereof, portability and convenience of the reception terminal can be enhanced by prompting installation to a place having a relatively excellent radio wave environment.

The present application contains subject matter related to that disclosed in Japanese Priority Patent Applications JP 2008-310695 and JP 2008-310840 filed in the Japan Patent Office on Dec. 5, 2008, and Japanese Priority Patent Application JP 2009-223406 filed in the Japan Patent Office on Sep. 28, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A power supply device comprising:
   a power supply unit configured to output power for a mainframe; and
   a power transmission cable configured to supply the power output from said power supply unit to the mainframe via a connector;
   wherein said power transmission cable comprises:
      a mainframe side high-frequency cutoff portion disposed between a power supply terminal of said connector,
      a power supply unit side high-frequency cutoff portion, which is disposed on said power supply unit side at a predetermined length from said connector, configured to restrict a length of a portion serving as an antenna,
      a first transmission line used for power supply to said mainframe via said mainframe side high-frequency cutoff portion, and
      a second transmission line to be connected to a tuner of said mainframe via said connector.

2. The power supply device according to claim 1, wherein said second transmission line also serves as a transmission line used for said power supply via said mainframe side high-frequency cutoff portion in pairs with said first transmission line.

3. The power supply device according to claim 1, wherein said power transmission cable is configured as a multi-core coaxial cable comprising:
   a plurality of core wires serving as said first transmission lines, and
   a covered wire for covering said plurality of core wires; and
   wherein said covered wire of which said power supply unit side end is an open end, to be connected to said tuner as said second transmission line.

4. The power supply device according to any one of claims 1 through 3, wherein said predetermined length is set to an odd multiple length of a ¼ wavelength as to the wavelength of a fundamental frequency to be received at said tuner; and wherein said tuner receives the band of said fundamental frequency, and the higher harmonic band of said fundamental frequency.

5. The power supply device according to claim 1, wherein said power supply unit side high-frequency cutoff portion is formed with an inductor inserted into each wire of said transmission cable.

6. The power supply device according to claim 1, wherein said power supply unit side high-frequency cutoff portion is formed with said power transmission cable inserted into a ferrite core.

7. The power supply device according to claim 1, wherein an amplifying circuit configured to amplify a high-frequency signal induced at said portion serving as an antenna is disposed in said connector.

8. A reception device comprising:
   a mainframe comprising a connector to be connected to a power supply device and configured to receive desired broadcast waves using a built-in tuner; and
   said power supply device, which is connected to said mainframe via said connector, configured to supply power of said mainframe to said mainframe;

wherein said power supply device includes
a power supply unit configured to output the power of the mainframe, and
a power transmission cable configured to transmit the power to be output from said power supply unit to the mainframe via the connector disposed on one end thereof;
said power transmission cable includes a plurality of transmission cables configured to transmit the power of said mainframe, connected to the mainframe via the power supply terminal of said connector;
with said plurality of transmission cables, a mainframe side high-frequency cutoff portion is disposed between said power supply terminal corresponding to each thereof;
with said power transmission cable, a power supply unit side high-frequency cutoff portion configured to restrict a length of a portion serving as an antenna is disposed on said power supply unit side at a predetermined length from said connector;
and at least one of said transmission cables is connected to a tuner of said mainframe via said connector.

9. The reception device according to claim 8, wherein said power transmission cable is connected to said mainframe via the power supply terminal of said second connector, and is formed of a multi-core coaxial cable comprising:
a plurality of core wire cables configured to transmit the power of said mainframe, and
a covered wire configured to cover said core wire cables;
wherein, with said core wire cables, a mainframe side high-frequency cutoff portion is disposed between said power supply terminal corresponding to each thereof;
with said power transmission cable, a power supply unit side high-frequency cutoff portion configured to restrict the length of said portion serving as the antenna is provided to said power supply unit side at a predetermined length from said connector; and with said covered wire, said power supply unit side high-frequency cutoff portion side end is formed as an open end, and is connected to said tuner of said mainframe via said connector.

10. A power cable comprising:
a power transmission cable configured to transmit power between a mainframe and an external device;
a mainframe side connector, which is disposed on one end side of said power transmission cable, configured to connect said power transmission cable to said mainframe; and
an external device side connector, which is disposed on the other end side of said power transmission cable, configured to connect said power transmission cable to said external device;
wherein said power transmission cable includes a plurality of transmission cables, which are connected to the mainframe via the power supply terminal of said mainframe side connector, configured to transmit the power of said mainframe;
with said plurality of transmission cables, a mainframe side high-frequency cutoff portion is disposed between said power supply terminal corresponding to each thereof;
with said power transmission cable, an external device side high-frequency cutoff portion configured to restrict a length of a portion serving as an antenna is disposed on said external device side at a predetermined length from said mainframe side connector; and at least one of said transmission cables is connected to the antenna input end of a built-in tuner of said mainframe via said mainframe side connector.

11. The power cable according to claim 10, wherein said power transmission cable is connected to said mainframe via the power supply terminal of said mainframe side connector, and is formed of a multi-core coaxial cable comprising:
a plurality of core wire cables configured to transmit the power of said mainframe, and
a covered wire configured to cover said core wire cables;
wherein, with said core wire cables, a mainframe side high-frequency cutoff portion is disposed between said power supply terminal corresponding to each thereof;
with said power transmission cable, an external device side high-frequency cutoff portion configured to restrict the length of a portion serving as the antenna is disposed on said external device side at a predetermined length from said mainframe side connector; and with said covered wire, said external device side high-frequency cutoff portion side end is formed as an open end, and is connected to a built-in tuner of said mainframe via said mainframe side connector.

12. A reception device comprising:
a power cable configured to supply power; and
a built-in tuner configured to receive broadcast waves;
wherein said power cable includes a power transmission cable including a plurality of transmission cables configured to transmit said power;
at least one of said transmission cables included in said power transmission cable is separated into a first portion and a second portion at a partway relay portion in a high-frequency manner; and with at least one of said transmission cables included in said power transmission cable,
a first side of said first portion, and a second side of said second portion are insulated from other portions in a high-frequency manner, and
at least one of said first relay portion side of said first portion and said second relay portion side of said second portion is connected to said tuner via a coaxial cable or parallel cable.

13. The reception device according to claim 12, wherein, with said power transmission cable,
an inductor configured to suppress a high-frequency signal is disposed on the first side opposite to said first relay portion side of said first portion and the second side opposite to said second relay portion side of said second portion, and
the first side opposite to said first relay portion side of said first portion and the second side opposite to said second relay portion side of said second portion are insulated from other portions in a high-frequency manner by said inductor.

14. The reception device according to claim 12, wherein, with said power transmission cable,
an inductor configured to suppress a high-frequency signal is disposed on said relay portion, and
said power transmission cable is separated into a first portion and a second portion in a high-frequency manner by said inductor.

15. The reception device according to any one of claims 12 through 14, wherein at least one of said first relay portion side of said first portion and said second relay portion side of said second portion is connected to said coaxial cable or parallel cable via a balun.

16. A reception device comprising:
a power cable configured to supply power; and
a built-in tuner configured to receive broadcast waves;
wherein said power cable includes a power transmission cable comprising:

a plurality of core wire cables configured to transmit said power, and a covered wire configured to cover said plurality of core wire cables;

wherein said covered wire is separated into a first portion and a second portion at a partway relay portion of said power transmission cable; and wherein, with said covered wire, a first side of said first portion and a second side of said second portion are formed as an open end, at least one of said first relay portion side of said first portion and said second relay portion side of said second portion is connected to said tuner via a coaxial cable or parallel cable.

17. The reception device according to claim 16, wherein, with said power transmission cable, an inductor configured to suppress the high-frequency signal of said core wire cable is disposed on the first side opposite to said first relay portion side of said first portion and the second side opposite to said second relay portion side of said second portion.

18. The reception device according to claim 16, wherein, with said power transmission cable, an inductor configured to suppress the high-frequency signal of said core wire cable is disposed on said relay portion.

19. The reception device according to any one of claims 16 through 18, wherein said covered wire is connected to said coaxial cable or parallel cable via a balun.

20. The reception device according to any one of claims 13, 14, 17, and 18, wherein said inductor is formed of a ferrite core into which said power transmission cable is inserted.

21. The reception device according to any one of claims 12, 13, 14, 16, 17 and 18 wherein, with said covered wire, said first portion and said second portion are set to a different length.

22. A power cable comprising:

a power transmission cable including a plurality of transmission cables configured to transmit power to a mainframe;

wherein at least one of said plurality of transmission cables included in said power transmission cable is separated into a first portion and a second portion at a partway relay portion in a high-frequency manner;

and wherein, with at least one of said plurality of transmission cables included in said power transmission cable, a first side of said first portion and a second side of said second portion are insulated from other portions in a high-frequency manner, and at least one of said first relay portion side of said first portion and said second relay portion side of said second portion is connected to a tuner of said mainframe via a coaxial cable or parallel cable.

23. A power cable comprising:

a power transmission cable comprising:

a plurality of core wire cables configured to transmit said power, and a covered wire configured to cover said plurality of core wire cables;

wherein said covered wire is separated into a first portion and a second portion at a partway relay portion of said power transmission cable;

and wherein, with said covered wire, a first of said first portion and a second side of said second portion are formed as an open end, and at least one of said first relay portion side of said first portion and said second relay portion side of said second portion is connected to a tuner of said mainframe via a coaxial cable or parallel cable.

24. A power supply device comprising:

a power supply unit configured to generate the power of a mainframe; and a power transmission cable including a plurality of transmission cables configured to transmit the power of said power supply unit to said mainframe;

wherein at least one of said plurality of cables included in said power transmission cable is separated into a first portion and a second portion at a partway relay portion in a high-frequency manner;

and wherein, at least one of said plurality of cables included in said power transmission cable, a first side of said first portion and a second side of said second portion are insulated from other portions in a high-frequency manner, and at least one of said first relay portion side of said first portion and said second relay portion side of said second portion is connected to a tuner of said mainframe via a coaxial cable or parallel cable.

25. A power supply device comprising:

a power supply unit configured to generate the power of a mainframe; and a power transmission cable including a plurality of core wire cables configured to transmit the power source of said power supply unit to said mainframe, and a covered wire configured to cover said plurality of core wire cables;

wherein said covered wire is separated into a first portion and a second portion at a partway relay portion of said power transmission cable;

and wherein, with said covered wire, a first side of said first portion and a second side of said second portion are formed as an open end, and at least one of said first relay portion side of said first portion and said second relay portion side of said second portion is connected to a tuner of said mainframe via a coaxial cable or parallel cable.

26. A power cable comprising:

a power transmission cable including a plurality of transmission cables configured to transmit power to a framework; and a board portion disposed so as to fix said plurality of transmission cables at an intermediate portion of said power transmission cable;

wherein, with said board portion, a high-frequency cutoff portion is disposed in said transmission cables, and one of said transmission cables cut off at said high-frequency cutoff portion in a high-frequency manner is connected to a tuner of said mainframe via a coaxial cable or parallel cable so as to form a dipole antenna.

27. The power cable according to claim 26, wherein, with said board portion, the length of said board has a length equal to or greater than $\lambda/2$ of a useable frequency.

28. The power cable according to claim 26 or 27, wherein said board portion is connected to said coaxial cable or parallel cable via a balun mounted on said board.

29. The power cable according to claim 26 or 27, wherein, with said board portion, said high-frequency cutoff portion is disposed with an interval of the $\lambda/4$ length of a band used as an antenna.

30. A power supply device comprising:
a power supply unit configured to generate the power of a mainframe;
a power transmission cable including a plurality of transmission cables configured to transmit the power of said power supply unit to said mainframe; and
a board portion disposed so as to fix said plurality of transmission cables at an intermediate portion of said power transmission cable;
wherein, with said board portion,
   a high-frequency cutoff portion is disposed in said transmission cable, and
   one of said transmission cables cut off by said high-frequency cutoff portion in a high-frequency manner is connected to a tuner of said mainframe via a coaxial cable or parallel cable so as to form a dipole antenna.

31. A reception device comprising:
a power cable configured to supply power; and
a built-in tuner configured to receive broadcast waves;
wherein said power cable comprises:
   a power transmission cable including a plurality of transmission cables configured to transmit the power of said power supply unit to said mainframe, and
   a board portion disposed so as to fix said plurality of transmission cables at an intermediated portion of said power transmission cable;
wherein, with said board portion,
   a high-frequency cutoff portion is disposed in said transmission cable, and
   one of said transmission cables cut off by said high-frequency cutoff portion in a high-frequency manner is connected to a tuner of said mainframe via a coaxial cable or parallel cable so as to form a dipole antenna.

\* \* \* \* \*